United States Patent
Labbe

(10) Patent No.: US 9,839,914 B2
(45) Date of Patent: *Dec. 12, 2017

(54) BRUSH CUTTING HEAD

(71) Applicant: Gyro-Trac Corporation, Summerville, SC (US)

(72) Inventor: Etienne Labbe, Sainte-Marie (CA)

(*) Notice: Subject to any disclaimer, the term of this patent is extended or adjusted under 35 U.S.C. 154(b) by 953 days.

This patent is subject to a terminal disclaimer.

(21) Appl. No.: 14/146,077

(22) Filed: Jan. 2, 2014

(65) Prior Publication Data

US 2014/0261889 A1    Sep. 18, 2014

Related U.S. Application Data

(63) Continuation of application No. 12/870,170, filed on Aug. 27, 2010, now abandoned, which is a continuation of application No. 11/431,748, filed on May 11, 2006, now Pat. No. 7,810,531.

(51) Int. Cl.
*B02C 18/18* (2006.01)
*A01G 23/00* (2006.01)

(52) U.S. Cl.
CPC .......... *B02C 18/184* (2013.01); *A01G 23/00* (2013.01); *Y10T 407/1936* (2015.01); *Y10T 407/1958* (2015.01)

(58) Field of Classification Search
CPC ...... A01F 7/02; A01F 7/04; A01F 7/06; A01F 12/40; A01D 91/00; A01D 91/04; A01D 41/00; A01D 41/02; A01D 41/04; A01D 41/06; A01D 41/142; A01D 34/8355; A01D 34/835; A01L 339/085; A01L 339/08; B02C 18/06; B02C 18/062; A01G 23/00; A01G 23/06; A01G 23/062; A01G 23/08; A01G 23/067

See application file for complete search history.

(56) References Cited

U.S. PATENT DOCUMENTS 6,802,176 B2 * 10/2004 Gaudreault .......... A01D 34/535
                                                              144/34.1
6,848,244 B2 *  2/2005 Northcutt ............... A01G 3/002
                                                              56/249.5

* cited by examiner

*Primary Examiner* — Matthew G Katcoff
(74) *Attorney, Agent, or Firm* — Southeast IP Group, LLC.; Thomas L. Moses

(57) ABSTRACT

The present invention relates to a brush cutting head for a brush cutter. The brush cutter head includes a cylindrical support body that has a first end, an opposed second end and an intermediate portion extending therebetween. The intermediate portion has a curved surface that defines the circular cross-section of the cylindrical support body. A plurality of collars is mounted to the cylindrical support body at spaced intervals along the intermediate portion. Each collar extends radially from the curved surface of the cylindrical support body. Additionally, each collar cooperates with an adjacent collar to define a mounting station between the adjacent collars. The brush cutter head further includes a plurality of cutting tooth assemblies carried on the outer surface of the cylindrical support body. Each cutting tooth assembly has a cutting tooth for placement within the mounting station and a mounting assembly engageable with the adjacent collars to secure the cutting tooth in the mounting station.

9 Claims, 40 Drawing Sheets

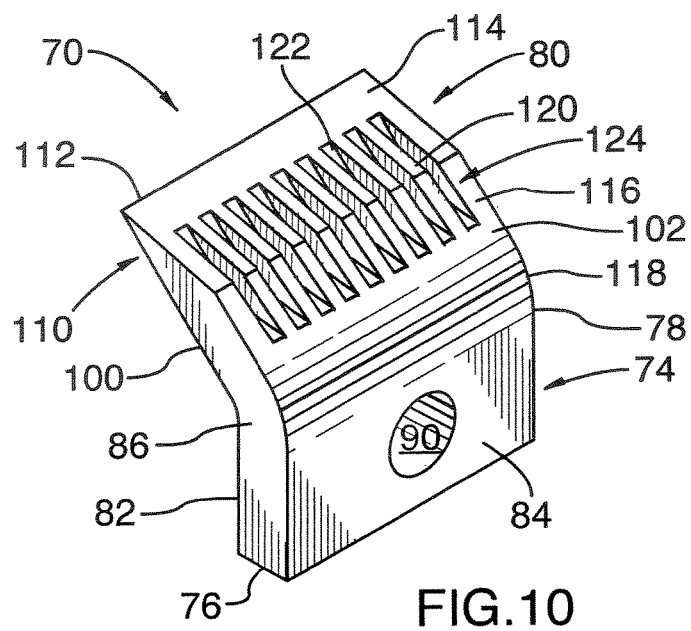
FIG.10
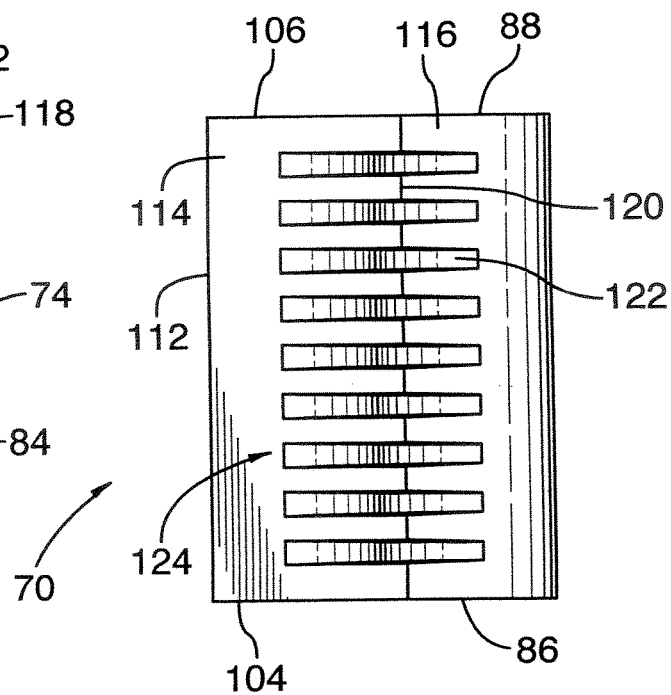
FIG.11
FIG.12

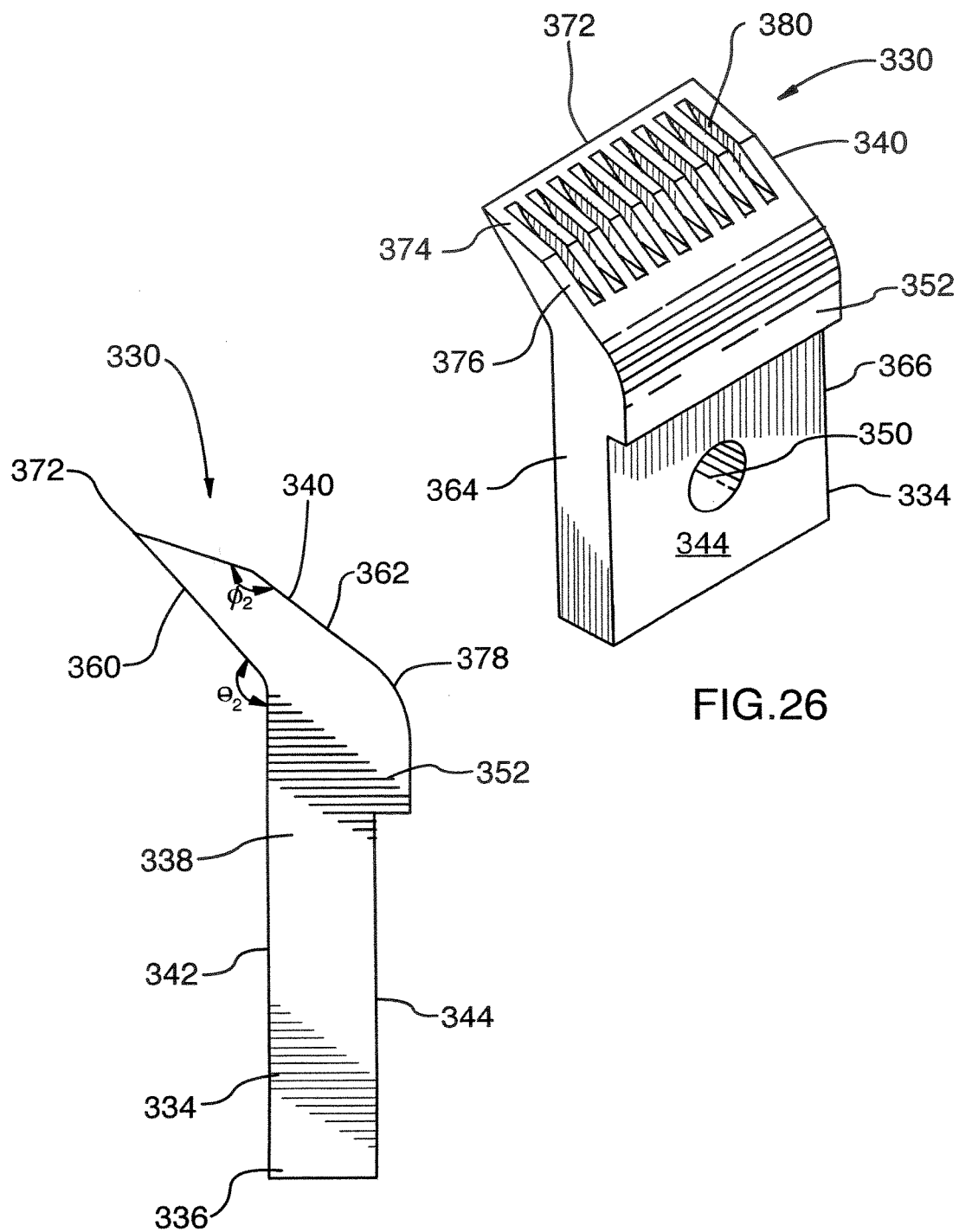

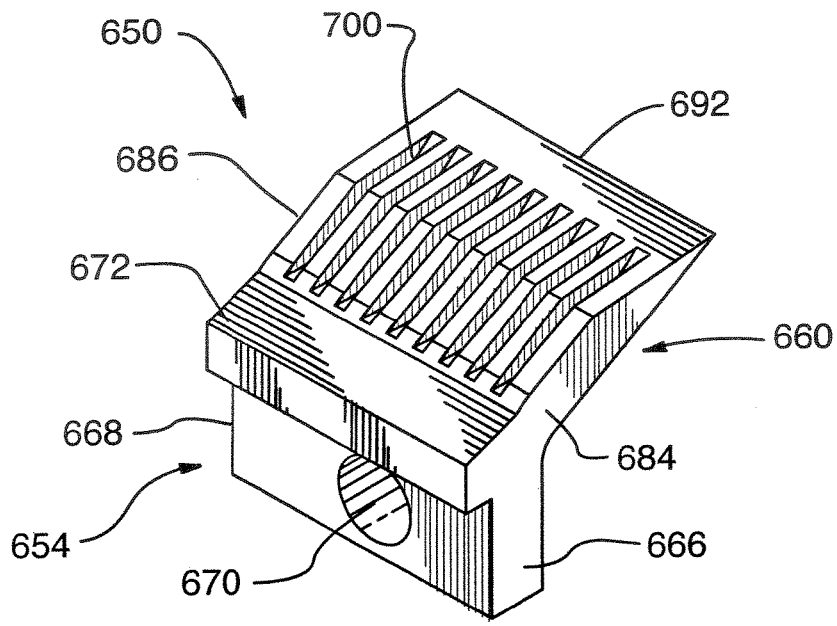
FIG. 42
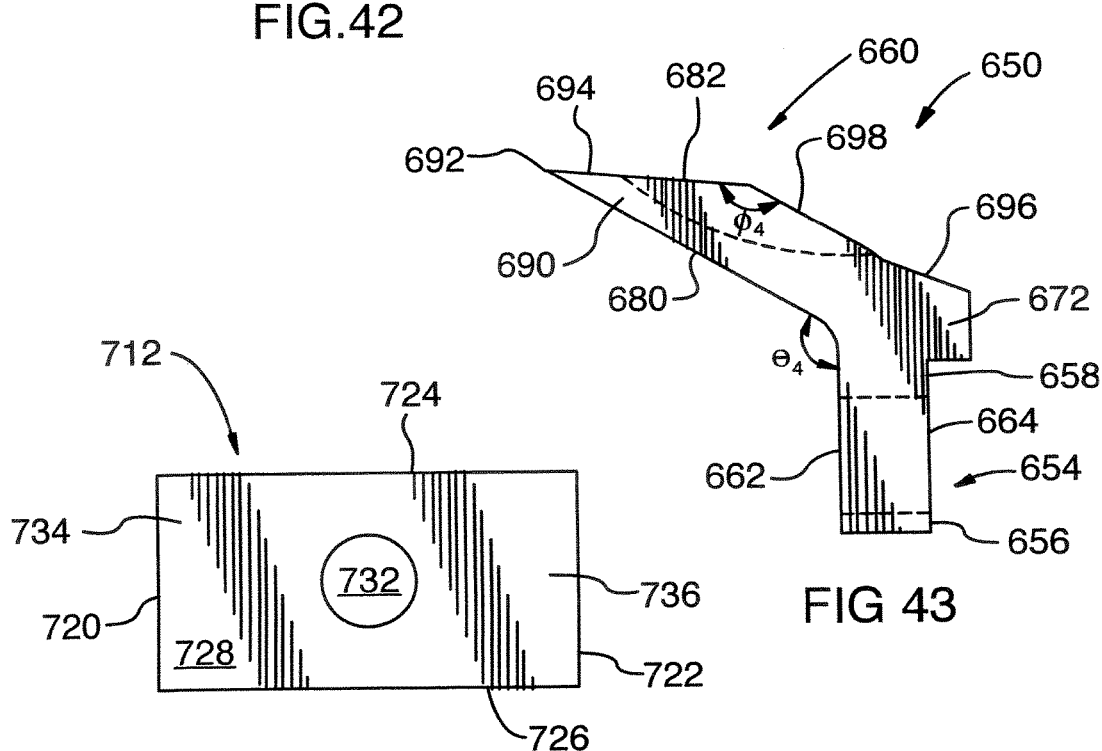
FIG 43
FIG 44

BRUSH CUTTING HEAD

CROSS-REFERENCE TO RELATED APPLICATION

The present application is a continuation of co-pending U.S. patent application Ser. No. 11/431,748 filed May 11, 2006, by Applicants and published under no. US 2007/0261763, the specifications of which is hereby incorporated by reference.

FIELD OF THE INVENTION

The present invention relates to a brush cutting head for a brush cutter.

BACKGROUND OF THE INVENTION

Vast felling and mulching operations are often performed with heavy-duty brush cutters. These brush cutters often have heavy-duty cutting heads removeably or permanently fixed on self-propelled vehicles. These cutting heads typically include a rotatable horizontal drum or roller upon which is mounted a plurality of cutting elements (i.e. cutting teeth). In operation, the rotation of the drum causes the cutting teeth to shred wood, debris and the like.

The cutting teeth are typically fixed to the outer surface of the drum via mounting blocks. Different mounting block configurations presently exist. For example, U.S. Pat. No. 5,873,534 describes a cutter tooth holder assembly for mounting about the curved surface of a rotatable cutter drum. The cutter tooth holder assembly includes a tooth holder for holding a cutter tooth and a mounting plate for attaching the tooth holder to the drum. The mounting plate has a generally concave surface for engaging the curved surface of the drum, and a top surface with a circumferentially extending tooth-locking groove formed along the entire length of the plate. The mounting plate is permanently attached to the drum by welding. The tooth holder has a generally square cross-section and is positioned in the tooth-locking groove formed within the mounting plate and welded in place. The tooth holder has a bore formed therein that is adapted to receive a cylindrical connector portion of the cutter tooth. The cutter tooth is generally polygonal with a plurality of cutting tips. When mounted within the tooth-locking groove one of the cutting tips is retained within the angled wall defining the tooth-locking groove thereby preventing rotational movement of the cutter tooth during operation of the brush cutter head.

While generally functional, the foregoing cutter tooth holder assembly tends to suffer from several drawbacks. First, to be able to withstand the high forces to which they are subjected, the assembly tends to be relatively large and heavy thereby requiring a substantial power draw. Second, the assembly remains unprotected from repeated contact with rocks or large trees. This exposure tends to make the assembly more prone to excessive wear and/or being damaged or broken off completely. As a result, this type of assembly requires costly servicing and replacement, the frequency of which tends to adversely impact the productivity of the brush cutter.

To address these shortcomings, certain known brush cutter heads have been provided with mounting blocks' protection means. One such brush cutter head is described in U.S. Pat. No. 6,764,035. This patent discloses a brush cutter that has a cylindrical support base and a within the station plurality of cutting tooth mounting blocks fastened to the outer surface of the base. The bottom surface of each mounting block is concavely curved to match the radius of the base thereby allowing each mounting block to be welded onto the base with its bottom surface flush with the outer surface of the base. Each mounting block carries a cutting tooth on its front face. To protect the mounting blocks from rocks and large trees, each mounting block is provided with a protective collar. Each protective collar is welded to the outer surface of the base and extends radially therefrom, transverse to the longitudinal axis of the base. Each collar terminates circumferentially a short distance from the front face of the mounting block with which it is associated to provide a front clearance space. The opposed end of the collar is welded to the back face of the associated mounting block to strengthen it.

While the mounting block described in U.S. Pat. No. 6,764,035 is a general improvement over the cutting tooth holder assembly of U.S. Pat. No. 5,873,534, its monolithic construction tends to make it relatively heavy and thus not well-suited for use in light-duty brush cutters where improved power utilization and reduced power consumption are a priority.

In light of the foregoing, it would be advantageous to have a brush cutting head provided with a mounting assembly that is relatively light, simply constructed and generally less prone to damage from impact with hard objects. Such a brush cutting head would tend to consume less power and be suitable for use in light-duty brush cutters.

SUMMARY OF THE INVENTION

According to a broad aspect of an embodiment of the present invention, there is provided a brush cutting head. The brush cutting head includes a cylindrical support body that has a first end, an opposed second end and an intermediate portion extending therebetween. The intermediate portion has a curved surface that defines the circular cross-section of the cylindrical support body. A plurality of collars is mounted to the cylindrical support body at spaced intervals along the intermediate portion. Each collar extends radially from the curved surface of the cylindrical support body. Additionally, each collar cooperates with an adjacent collar to define a mounting station between the adjacent collars. The brush cutter head further includes a plurality of cutting tooth assemblies carried on the outer surface of the cylindrical support body. Each cutting tooth assembly has a cutting tooth for placement within the mounting station and a mounting assembly engageable with the adjacent collars to secure the cutting tooth in the mounting station.

In an additional feature, each collar includes a circumferentially extending sidewall defining a substantially pen-annular structure. The sidewall has a first end and a second end spaced part from the first end thereof. The space between the first and second ends of the sidewall define a cutout in each collar. The cutout is sized to receive therein a portion of the cutting tooth assembly. In a further feature, the cutout defined in each collar is circumferentially spaced from the cutout defined in the adjacent collar. Additionally, each mounting station extends between the cutout in each collar and the portion of the sidewall of the adjacent collar opposite the cutout.

In still another feature, each mounting assembly includes first and second plate members for holding therebetween the cutting tooth and a fastener for attaching the cutting tooth to the first and second plate members. The first and second plate members are each mountable to extend between adjacent collars. The first plate member is disposed forwardly of the cutting tooth and the second plate member is disposed rearwardly of the cutting tooth when the cutting tooth is secured within the mounting station. Each cutting tooth has a base portion and a cutting portion supported on the base portion. Each of the plate members and the base portion has an aperture defined therein. The apertures defined in the plate members and the base portion are alignable to permit the fastener to be inserted therethrough. In an additional feature, the fastener is a threaded fastener and the aperture defined in the first plate member is adapted to threadingly engage the fastener to thereby fasten the second plate member and the cutting tooth to the first plate member.

In another feature, the mounting station is adapted to receive therein the cutting tooth and at least a portion of the mounting assembly.

In yet another feature, the mounting station is adapted to receive therein the cutting tooth and the second plate.

In a further feature, the sidewall of each collar has a first face and a second face opposite the first face. The first face of the sidewall has defined therein at least one rebate. In each collar the at least one rebate is circumferentially spaced from the cutout. The at least one rebate in each collar is substantially aligned with the cutout in the adjacent collar. Additionally, the second plate member has a first end and an opposed second end. The first end of the second plate member is locatable within the cutout in each collar and the second end thereof is mountable within the at least one rebate in the adjacent collar. Further still, the at least one rebate includes first and second rebates. In each collar the first rebate is circumferentially spaced from the second rebate. One of the first and second rebates in each collar is substantially aligned with the cutout in the adjacent collar. The second end of the second plate member is locatable within one of the first and second rebates in each collar. Each rebate is defined by first and second circumferentially spaced radial edges. In each collar the first rebate is radially offset from the cutout by a first angle measured from the centerline of the cutout to the first edge of the first rebate and the second rebate is radially offset from the cutout by a second angle measured from the centerline of the cutout to the first edge of the second rebate.

In an additional feature, one of the first plate member and the second plate member is fixed between adjacent collars. In another feature, the second plate member is fixed within the mounting station and the first plate member is removeably mounted between adjacent collars. In an alternate feature, the first plate member is fixed between the adjacent collars and welded to the curved surface of the support body. Moreover, the second plate member is releasably mountable within the mounting station.

In a further feature, the mounting station is adapted to receive therein the first plate member, the second plate member and the cutting tooth.

In another feature, each collar has a centreline running therethrough. The cutout defined in the collar is axially offset from the centreline of the collar. The sidewall of each collar has a first face and a second face opposite the first face. The first face of the sidewall has defined therein a rebate. The rebate is axially offset from the centreline of the collar. The cutout and the rebate are disposed on opposite sides of the centreline. In addition, the rebate in each collar is substantially aligned with the cutout in the adjacent collar. The second plate member has a first end and an opposed second end. The first end of the second plate member is mountable within the cutout in the collar and the second end thereof is locatable within the rebate in the adjacent collar.

In yet another feature, the cutout defined in each collar is a first cutout. The sidewall of each collar is bounded circumferentially by an outer edge and an inner edge and has defined therein a second cutout extending partially between the outer and inner edges. At the location of the second cutout the width of the sidewall as measured between the outer and inner edges thins to define a narrow strip of sidewall for supporting a portion of the mounting assembly. Additionally, the first cutout in each collar is substantially aligned with the second cutout in the adjacent collar. The second plate member has a first end and an opposed second end. The first end of the second plate member is mountable within the first cutout in the collar and the second end thereof is locatable within the second cutout in the adjacent collar. The second end of the second plate member has an abutment flange for abutting the narrow strip formed on the adjacent collar.

In still a further feature, the mounting station is adapted to receive therein only the cutting tooth.

In an additional feature, the sidewall of each collar has a pair of first and second apertures defined therein. The first aperture is disposed adjacent the cutout. The second aperture is circumferentially staggered from the first aperture. The first and second apertures are each adapted to receive therein a portion of the second plate member. The first aperture in each collar is aligned with the second aperture in the adjacent collar. The second plate member has a first end and an opposed second end. The first end of the second plate member is mountable within the first aperture in each collar and the second end thereof is locatable within the second aperture in the adjacent collar. The second plate member is detachably mounted to adjacent collars.

In another feature, each mounting station is radially offset from the adjacent mounting station.

In yet another feature, the plurality of cutting tooth assemblies is disposed along the support body in a double helix pattern.

In an additional feature, each mounting assembly includes first and second plate members for holding therebetween the cutting tooth and a fastener for attaching the cutting tooth to the first and second plate members. The first and second plate members are mountable to extend between adjacent collars. When the cutting tooth is secured within the mounting station, the first plate member is disposed forwardly of the cutting tooth and the second plate member is disposed rearwardly of the cutting tooth.

In still a further feature, the brush cutting head further includes a deflector member disposed between the adjacent collars forwardly of the mounting station. The deflector member is fixed to the curved surface of the support body and to the sidewalls of the adjacent collars. Additionally, the deflector member is disposed forwardly of the first plate member. Further still, the first plate member has a leading face and an opposed trailing face for abutting a portion of the cutting tooth. The deflector member is an elongate plate having first and second ends. The first end of the deflector member is supported on the curved surface of the support body and the second end of the deflector member abuts the leading face of the first plate member. The deflector member extends generally tangent to the curved surface.

In an additional feature, each mounting assembly includes a mounting block and a plate member for holding therebetween the cutting tooth, and a fastener for attaching the cutting tooth to the first and second plate members. The mounting block and the plate member are each mountable between adjacent collars. When the cutting tooth is secured within the station, the mounting block is disposed forwardly of the cutting tooth and the plate member is disposed rearwardly of the cutting tooth. Each cutting tooth has a base portion and a cutting portion supported on the base portion. Each of the mounting block, the plate member and the base portion has an aperture defined therein. The apertures defined in the mounting block, the plate member and the base portion are alignable to permit the fastener to be inserted therethrough. Additionally, the base portion has a leading face and an opposed trailing face. The leading face of the base portion abuts the mounting block and the trailing face of the base portion abuts the plate member when the cutting tooth is secured within the station.

In a further feature, the mounting block is defined by a pair of first and second spaced apart lateral faces, opposed top and bottom faces, a leading face and an opposed trailing face. The leading and trailing faces of the mounting block extend between the top and bottom faces thereof. When the cutting tooth is secured within the mounting station, the mounting block is disposed between adjacent collars with the first and second lateral faces abutting the sidewalls of the adjacent collars, the bottom face abutting the curved surface of the support body and the trailing face of the mounting block abutting the leading face of the base portion. In another feature, the bottom face of the mounting block has an arcuate profile matching the curvature of the curved surface. In still another feature, the leading face of the mounting block slopes downwardly from top face to the bottom face of the mounting block to encourage the deflection of debris away from the cutting tooth when the cutting tooth is secured within the mounting station. Moreover, the mounting block is fixed between the adjacent collars.

In still another feature, each mounting assembly further includes an elongate support plate spanning the adjacent collars proximate the cutout defined in one of the collars. The support plate has a leading portion and a trailing portion. The leading portion of the support plate is configured to provide an abutment face for a portion of the cutting tooth. The sidewall of each collar is bounded circumferentially by an outer edge and an inner edge. The support plate has first and second opposed ends. The ends of the support plate are mounted on the outer sidewall edges of the adjacent collars. Optionally, the ends of the support plate may be fixed to the outer sidewall edges of the adjacent collars.

In an additional feature, the cutting tooth includes a base portion and a cutting portion supported on the base portion. The base and cutting portions each have a leading face and a trailing face. Proximate the cutting portion, the trailing face of the base portion has protruding therefrom an abutment shoulder for bearing on the abutment face defined by the leading portion of the support plate.

In another feature, the cutting tooth and the plate member are configured for mating engagement with each other. One of the cutting tooth and the plate member has a male portion and the other of the cutting tooth and the plate member has a female portion configured to receive the male portion therein. The cutting tooth includes a base portion and a cutting portion supported on the base portion. The base portion has a leading face for abutting the mounting block and a trailing face for abutting the plate member. The trailing face of the base portion has a groove formed therein. The groove defines the female portion. The plate member has a leading face for abutting the trailing face of the base portion and a trailing face. The leading face of the plate member has formed therein a tongue. The tongue defining the male portion.

BRIEF DESCRIPTION OF THE DRAWINGS

The embodiments of the present invention shall be more clearly understood with reference to the following detailed description of the embodiments of the invention taken in conjunction with the accompanying drawings, in which:

FIG. 5 is an enlarged perspective view of one end of the brush cutting head of FIG. 2a;

FIG. 8 is a perspective view of one of the collars shown in FIG. 2a;

FIG. 10 is a perspective view of one of the cutting teeth shown in FIG. 6;

FIG. 11 is a side elevation view of the cutting tooth of FIG. 10;

FIG. 12 is a top plan view of the cutting tooth of FIG. 10;

FIG. 26 is a perspective view of one of the cutting teeth shown in FIG. 22;

FIG. 27 is a side elevation view of the cutting tooth shown in FIG. 22;

FIG. 42 is a perspective view of one of the cutting teeth shown in FIG. 40;

FIG. 43 is a side elevation view of the cutting tooth shown in FIG. 42;

FIG. 44 is a front elevation view of the second plate shown in FIG. 40;

DETAILED DESCRIPTION OF THE EMBODIMENTS OF THE INVENTION

Figure 1:
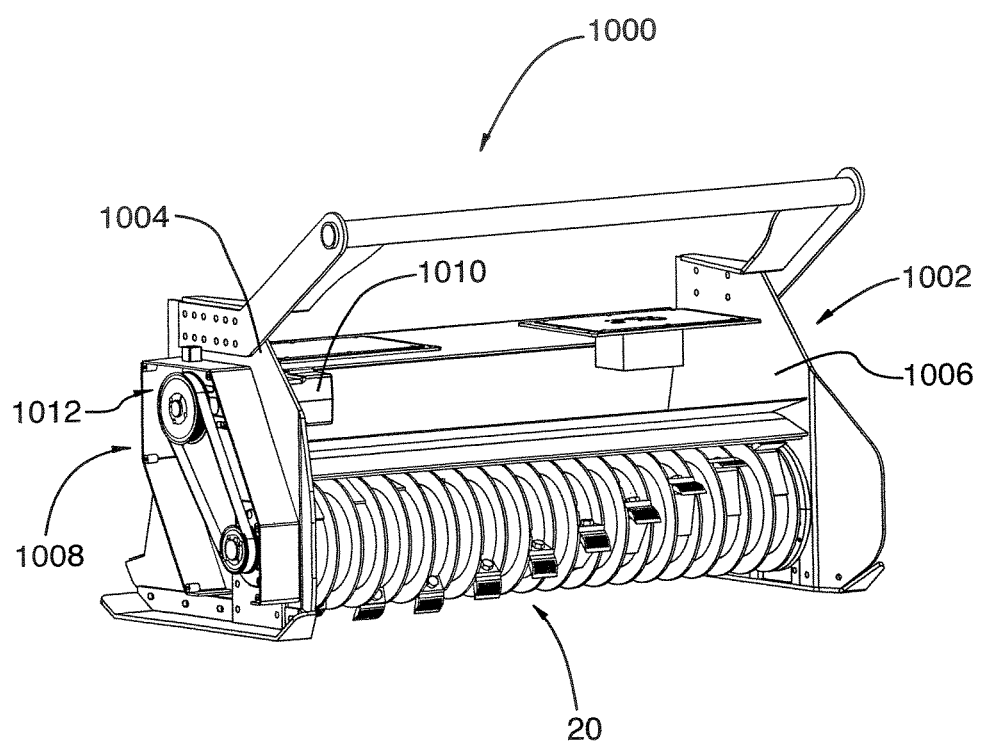
FIG. 1 is a perspective view of a brush cutter according to an embodiment of the present invention with a housing side panel removed and a portion of the housing top panel cut away to better reveal components of the drive assembly of the brush cutter.

The description which follows, and the embodiments described therein are provided by way of illustration of an example, or examples of particular embodiments of principles and aspects of the present invention. These examples are provided for the purposes of explanation and not of limitation, of those principles of the invention. In the description that follows, like parts are marked throughout the specification and the drawings with the same respective reference numerals.

Figure 2A:
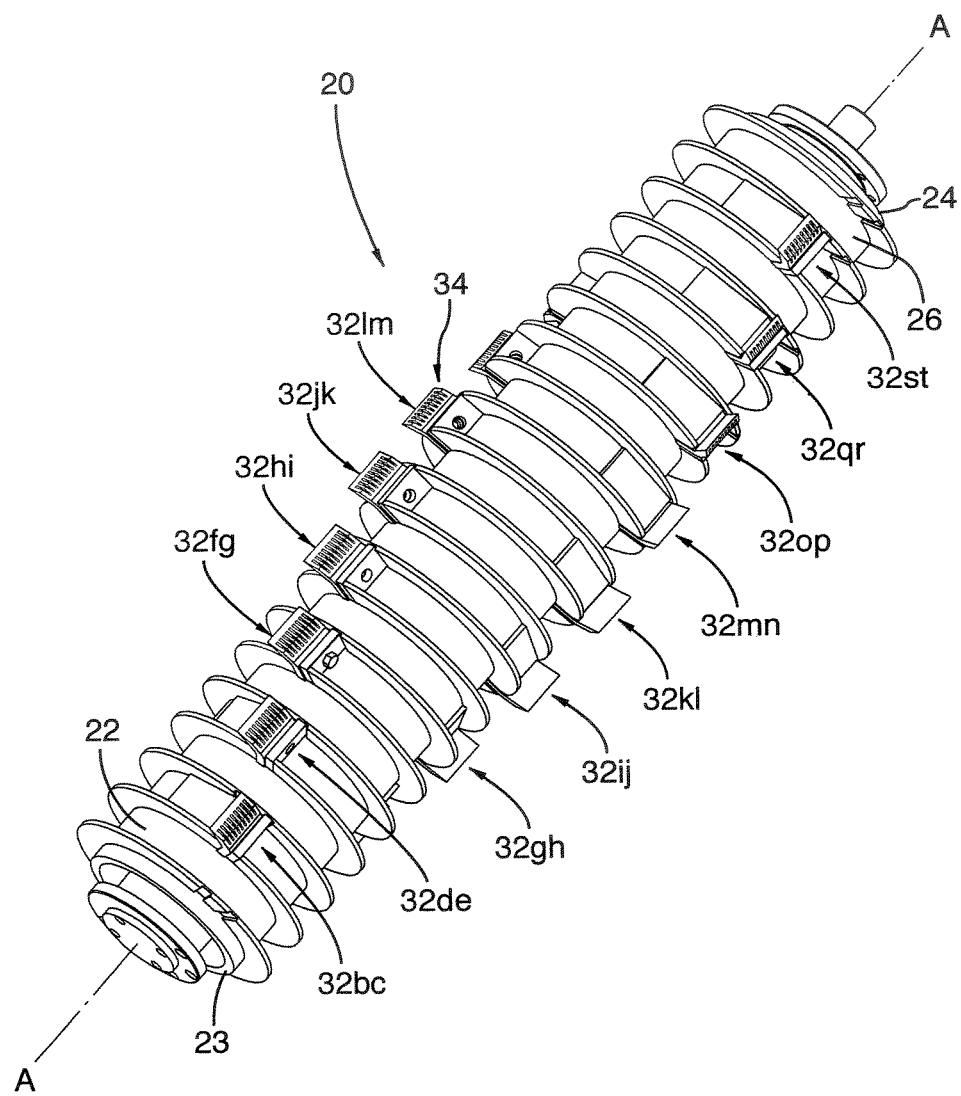
FIG. 2a is a perspective view of the brush cutting head shown in FIG. 1.
Figure 2B:
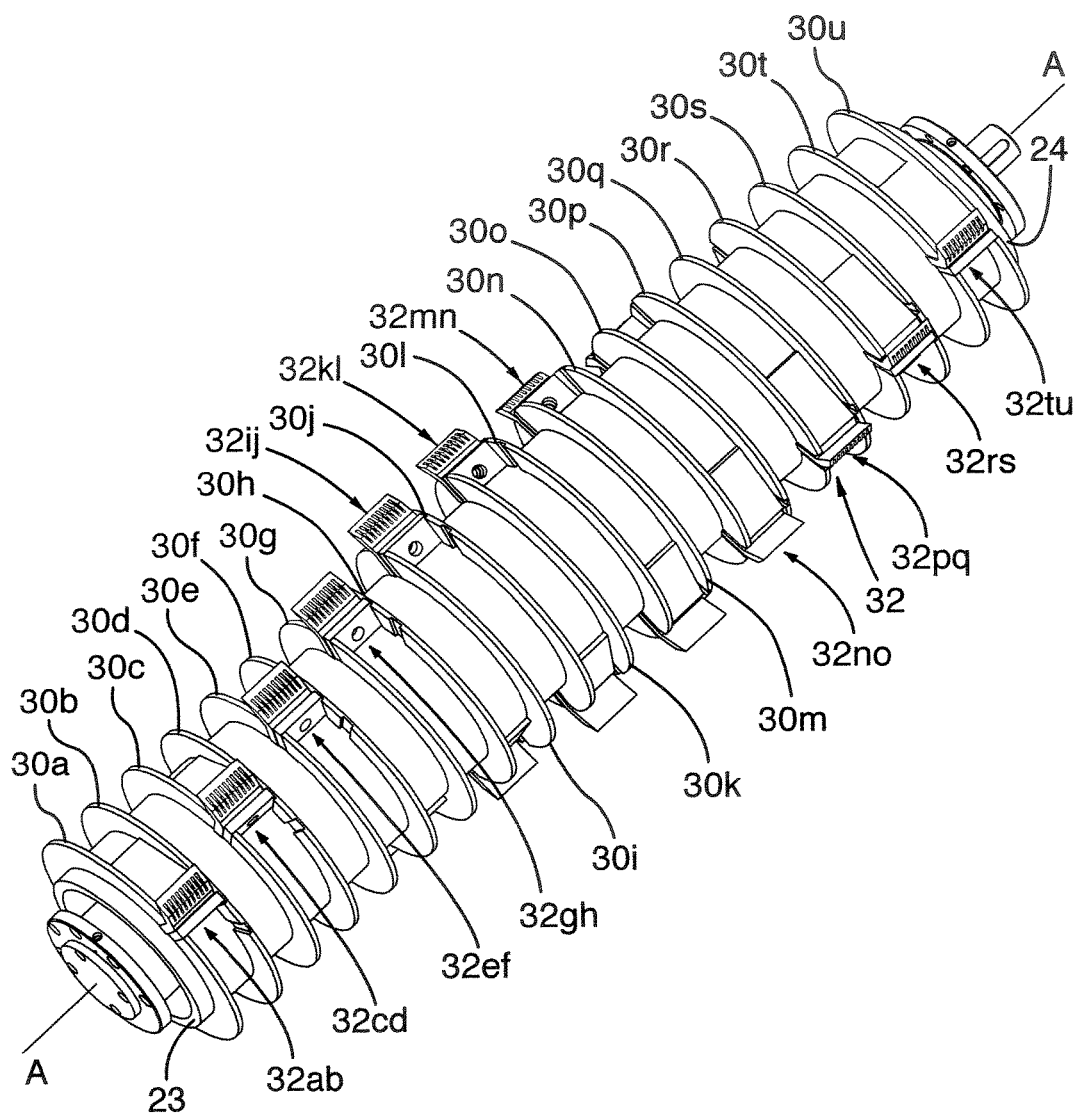
FIG. 2b is another perspective view similar to that shown in FIG. 2a showing the brush cutting head rotated 180 degrees.
Figure 3:
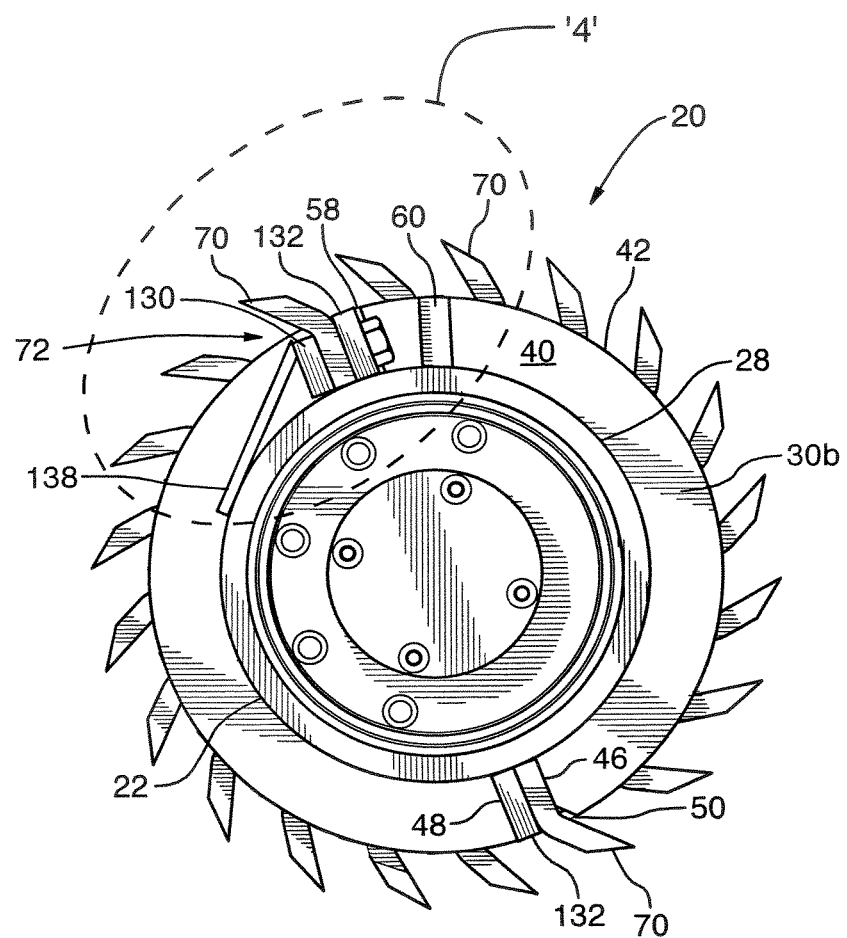
FIG. 3 is an end view of the brush cutting head shown in FIG. 2a with a collar removed therefrom for the sake of clarity.

Referring to FIGS. 1, 2a and 2b, there is shown a brush cutting head generally designated with reference numeral 20. Brush cutting head 20 is adapted for use in a conventional brush cutter 1000. The brush cutter 1000 is of the type generally known to those skilled in the art such that only a very general description thereof is required for the purposes of this specification. The brush cutter 1000 may be of the type attached to the front of a vehicle, such as a loader, skid steer, or the like. It has a housing 1002 defined by a plurality of walls mounted to each other and arranged to define a space for accommodating the brush cutting head 20. More specifically, the brush cutting head 20 is mounted longitudinally between two spaced apart housing sidewalls 1004 and 1006 and supported on bearing assemblies (not shown) for rotational motion about an axis of rotation 'A-A'. A drive assembly 1008 which includes a motor 1010 and drive belt arrangement 1012 is supported on sidewall 1004 and operatively connected to the brush cutting head 20 to drive the rotation thereof. Generally speaking, the brush cutting head 20 carries about its outer surface a plurality of teeth adapted to cut trees, brush or the like.

Brush cutting head 20 has a hollow, elongate support body 22 that has a first end 23, an opposed second end 24 and an intermediate portion 26 extending between the first and second ends 23 and 24. In this embodiment, the support body 22 is cylindrical. This, however, need not be the case in every application. In alternative embodiments, the support body may be shaped differently.

The intermediate portion 26 has a curved outer surface 28 that defines the circular cross-section of the support body 22. Concentrically mounted to the support body 22 at spaced intervals along the intermediate portion 26, is a plurality of protective collars designated with reference numerals 30a through to 30u (collectively, "collars 30"). As will be explained in greater detail below, pairs of adjacent collars 30 cooperate with each other to define mounting sites or stations 32 for each receiving a cutting tooth assembly 34 therein.

Figure 8:
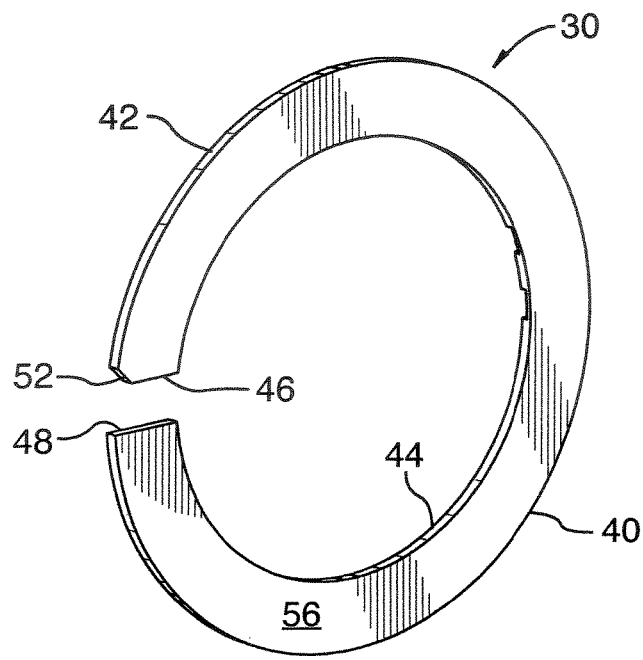
Figure 9:
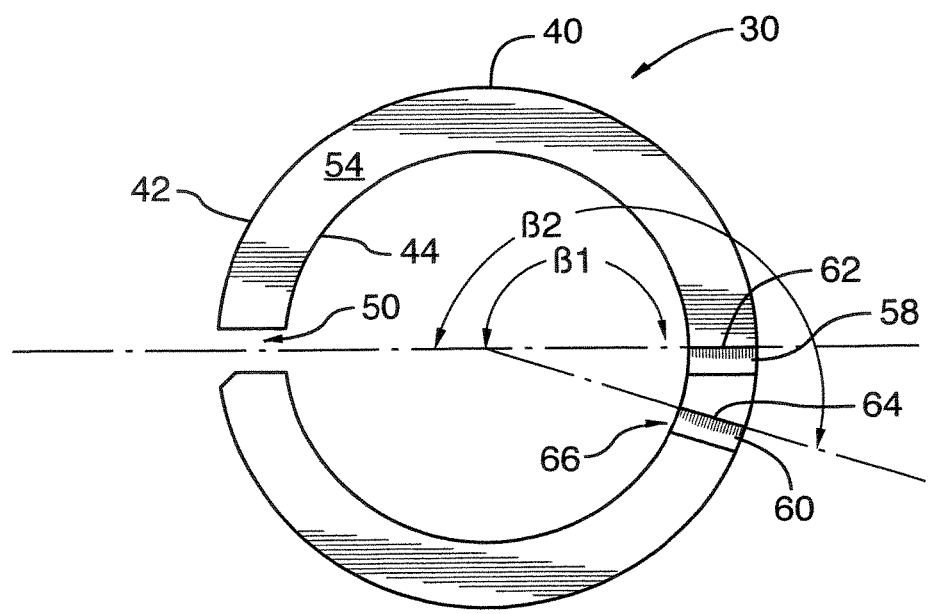
FIG. 9 is a side elevation view of the collar shown in FIG. 8.

Referring to FIGS. 8 and 9, each collar 30 has a penannular structure defined by a relatively flat, circumferentially extending, sidewall 40. The sidewall 40 is bounded circumferentially by an outer edge 42 and inner edge 44, and has first and second spaced apart ends 46 and 48. The space between the ends 46 and 48 defines a cutout 50 formed in the collar 30 that is sized to accommodate therein a portion of the cutting tooth assembly 34. The end 46 of sidewall 40 has a notch 52 formed about the outer edge 42 to provide clearance for the forward leaning portion of the cutting tooth assembly 34. The sidewall 40 has two opposed faces 54 and 56 and a pair of first and second, circumferentially spaced, rebates 58 and 60 formed within the face 54 of the sidewall 40. The rebates 58 and 60 extend between the outer and inner edges 42 and 44 of the sidewall 40. The rebates 58 and 60 are disposed substantially opposite to the cutout 50. More specifically, the first rebate 58 is circumferentially spaced from the cutout 50 by an angle $\beta_1$ (as measured from the centerline CL of cutout 50 to the edge 62 of rebate 58), whereas the second rebate 60 is circumferentially displaced from the cutout 50 by an angle $\beta_2$ (as measured from the centerline CL of the cutout 50 to the edge 64 of rebate 60). In this embodiment, the angle $\beta_1$ is approximately 180 degrees whereas the angle $\beta_2$ measures about 198 degrees. However, it will be appreciated that the angles $\beta_1$ and $\beta_2$ may be varied to suit the particular application. As will be explained in greater detail below, each rebate 58, 60 defines a substantially radial slot 66 in the sidewall 40 that is sized to receive a portion of the cutting tooth assembly 34.

While in the present embodiment each collar 30 is formed with two rebates 58 and 60 separated by an angle representing the difference between angle $\beta_2$ and $\beta_1$, this particular configuration need not be used in every application. In alternative embodiments, each collar could be provided with a single rebate or conversely, the collar could have three or more rebates defined in the sidewall at staggered locations.

The collars 30 are radially mounted to the support body 22 with their inner sidewall edges 44 welded to the curved surface 28. The spacing between adjacent collars 30 is sized to correspond generally to the width of the cutting tooth assembly 34 and tends to minimize the chance that the cutting tooth assembly 34 will be damaged by violent contact with a rock or a large tree. The collars 30 are mounted with their respective faces 54 all oriented in the same direction.

Figure 5:
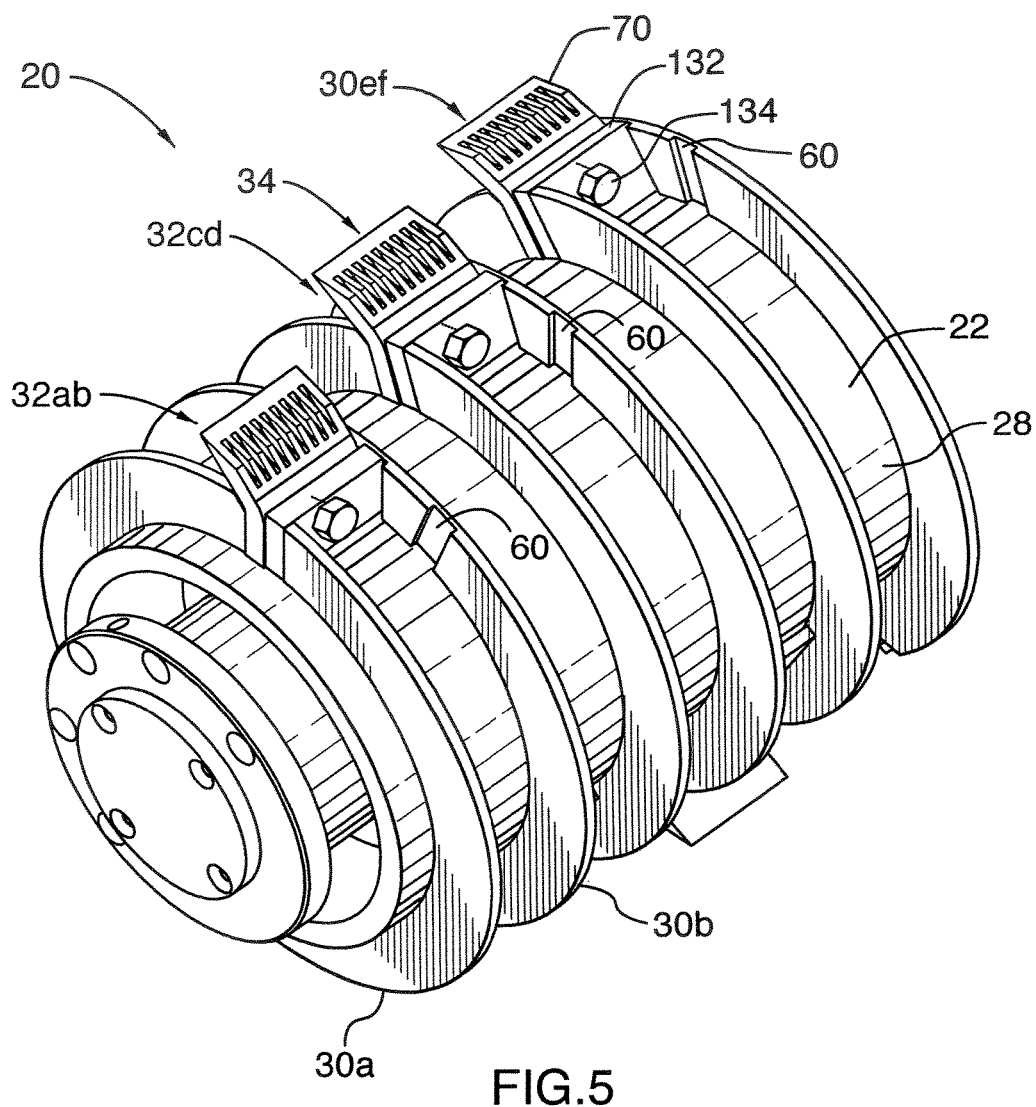

Each collar 30 is radially offset from its adjacent collar 30 by an angle $\omega_1$ (as measured between the respective centerlines CL of the cutouts 50) such that the cutouts 50 of adjacent collars 30 are staggered relative to each other. In the present embodiment, the angle $\omega_1$ measures about 180 degrees. In this arrangement, the cutout 50 of a given collar 30 is substantially aligned with the rebate 58 or 60 of another adjacent collar 30 to allow a portion of the cutting tooth assembly 34 to extend longitudinally therebetween in an orientation that is substantially parallel to the axis of rotation A-A. As shown in FIG. 5, the cutout 50 of collar 30a and the first rebate 58 of collar 30b are substantially aligned.

Figure 7:
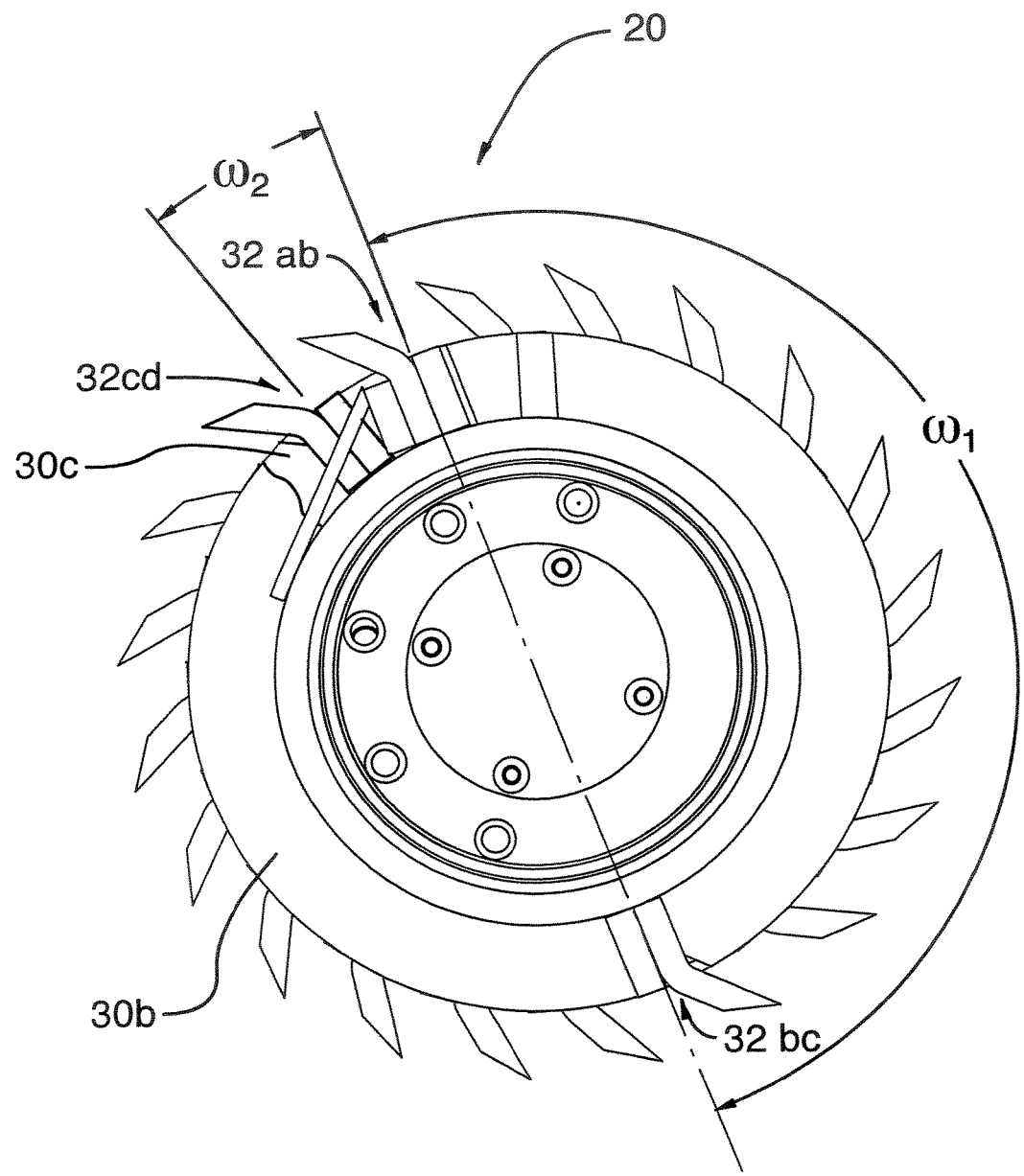
FIG. 7 is an end elevation view similar to that illustrated in FIG. 3 with a portion of the next adjacent collar removed for clarity.

Each station 32 is defined between the cutout 50 formed in a given collar 30 and that portion of the sidewall 40 of the adjacent collar 30 that is disposed opposite the cutout 50. Referring again to FIG. 5, the station 32ab (previously identified generically as "station 32") can be seen to be defined between the cutout 50 in collar 30a and the portion of sidewall 40 of collar 30b located opposite the cutout 50. Each of the other stations 32, identified in FIGS. 2a and 2b, is similarly defined between the cutout 50 of one collar 30 and a portion of sidewall of an adjacent collar 30. As shown in FIG. 7, each the station 32 is circumferentially staggered from its adjacent station by the angle $\omega_1$.

Due to this stagger and the geometry of the collars 30, every alternate station 32 is also radially offset from its respective reference station by an angle $\omega_2$. Taking as an example stations 32ab and 32cd, it can be seen in FIG. 7 that station 32cd is circumferentially staggered relative to station 32ab by an angle $\omega_2$. In this embodiment, the angle $\omega_2$ measures approximately 18 degrees.

In this embodiment, the staggered arrangement of the collars 30 allows the plurality of cutting tooth assemblies 34 to be disposed along the support body 22 in a generally double helix pattern. In this manner, the brush cutting head 20 can achieve cutting across the entire length of the support body 22 when rotated about axis 'A-A'. While this double helix pattern is generally preferred, it will be appreciated that the arrangement of the cutting tooth assemblies could be laid out differently. More specifically, the angles $\omega_1$ and $\omega_2$ could be varied to achieve a particular distribution or arrangement of cutting tooth assemblies 34 on the support body 22. For instance, the cutting tooth assemblies could be disposed in a triple or quadruple helix arrangement.

Turning now to FIGS. 4 to 6 and 10 to 12, the cutting tooth assembly 34 is now described in greater detail. The cutting tooth assembly 34 includes a cutting tooth 70 and a mounting assembly 72 for securely fixing the cutting tooth 70 within a respective station 32.

The cutting tooth 70 includes a plate-like, base portion 74 having a first end 76 and a second end 78, and a cutting portion 80 mounted to the second end 78 of the base portion 74. Base portion 74 has a generally planar, leading face 82, an opposing trailing face 84 and two, spaced apart, lateral faces 86 and 88. Defined in the base portion 74 is a bore 90 that extends between the leading face 82 and the trailing face 84. The bore 90 is adapted to receive a fastener therethrough to permit fastening of the cutting tooth 70 to the mounting assembly 72.

As best shown in FIGS. 10, 11 and 12, the cutting portion 80 is carried on the second end 78 of the base portion 74 in a generally, forwardly leaning or canted fashion. Preferably, the cutting portion 80 is integrally formed with the base portion 74 and both are fabricated from a plate of hardened steel. In this embodiment, the steel plate is bent forward to obtain the forwardly leaning cutting portion 80. Alternatively, the cutting tooth 70 could be cast with its cutting portion 80 leaning forward relative to its base portion 74. It will however be appreciated that in alternative embodiments, the cutting and base portions could be manufactured separately and then assembled to form the cutting tooth by welding, fastening or the like.

The cutting portion 80 includes a leading face 100, an opposed trailing face 102 and two spaced-apart lateral faces 104 and 106. The leading face 100 of the cutting portion 80 joins the leading face 82 of the base portion 74 while similarly, the trailing face 102 connects to trailing face 84 of the base portion 74. As best shown in FIG. 11, an external obtuse angle $\theta_1$ is formed between the leading face 100 and the leading face 82. Preferably, the angle $\theta_1$ lies between about 100 degrees and about 170 degrees. Most preferably, the angle $\theta_1$ lies between about 120 and about 150 degrees. In this embodiment, the angle $\theta_1$ is 135 degrees.

The leading and trailing faces 100 and 102 cooperate with each other to define a tapering, wedge-like, profile 110 that terminates in a cutting edge 112. The cutting edge 112 is carried forwardly of the leading face 82 of the base portion 74 such that it tends to be the first element of cutting tooth 70 to make contact with the brush. In the preferred embodiment, the cutting edge 112 extends generally linearly between the lateral faces 104 and 106 and substantially parallel to the rotational axis A-A of the brush cutting head 20. However, in alternative embodiments, the cutting edge could be configured differently. For instance, the cutting edge could be configured to extend generally diagonally between the lateral faces 104 and 106, askew of the rotational axis A-A. This configuration would tend to favor one end of the cutting edge over the other contacting the brush. In a further alternative, the cutting edge could be scalloped or formed to extend in a generally, zigzagging fashion.

The trailing face 102 of the cutting portion 80 has an upper portion 114 and a lower portion 116 joined to the upper portion 114. The upper portion 114 extends between the cutting edge 112 and the lower portion 116 whereas the lower portion 116 joins the trailing face 84 of the base portion 74 at a transition section 118. As best shown in FIG. 10, the upper portion 114 is bent relative to the lower portion 116 such that an internal obtuse angle $\Phi_1$ is defined therebetween. In the present embodiment, the angle $\Phi_1$ measures 150 degrees. However, the angle $\Phi_1$ may vary between about 120 degrees and about 180 degrees The trailing face 102 has a plurality of knuckle-like protuberances in the nature of ridges 120 formed thereon. The ridges 120 are generally evenly spaced and extend generally transverse of the cutting edge 112 between the upper and lower portions 114 and 116 of the trailing face 102. Defined between each pair of adjacent ridges 120 is a channel or groove 122 which when viewed from the side (as shown in FIG. 11) is generally curved. The alternate arrangement of ridges 120 and channels 122 define corrugations 124 on the trailing face 102. These corrugations serve to direct rocks, wood chips and other debris away from the cutting edge 80 thereby minimizing dispersion of the debris over the cutting area.

In this embodiment, the grooves 122 are machine ground into the trailing face 102 during fabrication. However, it should be appreciated that in alternative embodiments, the cutting portion 80 could be cast or forged in such a way that grooves and ridges are formed.

When the cutting tooth 70 is mounted within station 32, the cutting edge 112 extends beyond the outer edge 42 of the collar sidewall 40 to facilitate the cutting action of the tooth. In operation, the cutting edge 112 of each cutting tooth 70 comes into contact with the brush. Debris is created as a result of the cutting action of the cutting tooth 70. As tire debris passes over the cutting edge 112, it abrades the surface of the cutting edge 112 thereby sharpening the cutting tooth 70. This sharpening action tends to maintain or enhance the cutting efficiency of the cutting tooth and tends to reduce the need for mechanical sharpening. Thereafter the debris travels along the channels 122 to be carried away from cutting edge 112.

While in this embodiment, the corrugations 124 have a generally crenellated profile when view in cross-section, it will be appreciated that this need not be the case in an applications. In alternative embodiments, the corrugations could be configured differently. For instance, the corrugations could have a generally arcuate or zigzag profile when viewed in cross-section. Other profiles may also be employed to similar advantage.

While it is preferred that the brush cutting head 20 be used with cutting teeth 70, it will be appreciated that other types of teeth could also be used to similar advantage. More specifically, it may be advantageous to change the cutting tooth to adapt to the nature of the materials likely to be encountered during cutting operations. For instance, where the terrain to be cleared is rocky, the cutting tooth 70 described above could be replaced with a hammer-type tooth which tends to be better suited to resisting frequent impacts with rocks and the like. With reference to FIGS. 16 to 19, there is shown an alternate cutting tooth designated generally with reference numeral 230.

The cutting tooth 230 includes a base portion 232 having a first end 234 and a second end 236, and a cutting portion 238 carried on the second end 236 of the base portion 232. The base portion 232 has a generally planar leading face 240, an opposing trailing face 242 and two spaced apart lateral faces 244 and 246. Defined in the base portion 232 is a bore 248 that extends between the leading face 240 and the trailing face 242. The bore 248 is adapted to receive a fastener therethrough to permit fastening of the cutting tooth 230 to the mounting assembly 72.

Figure 17:
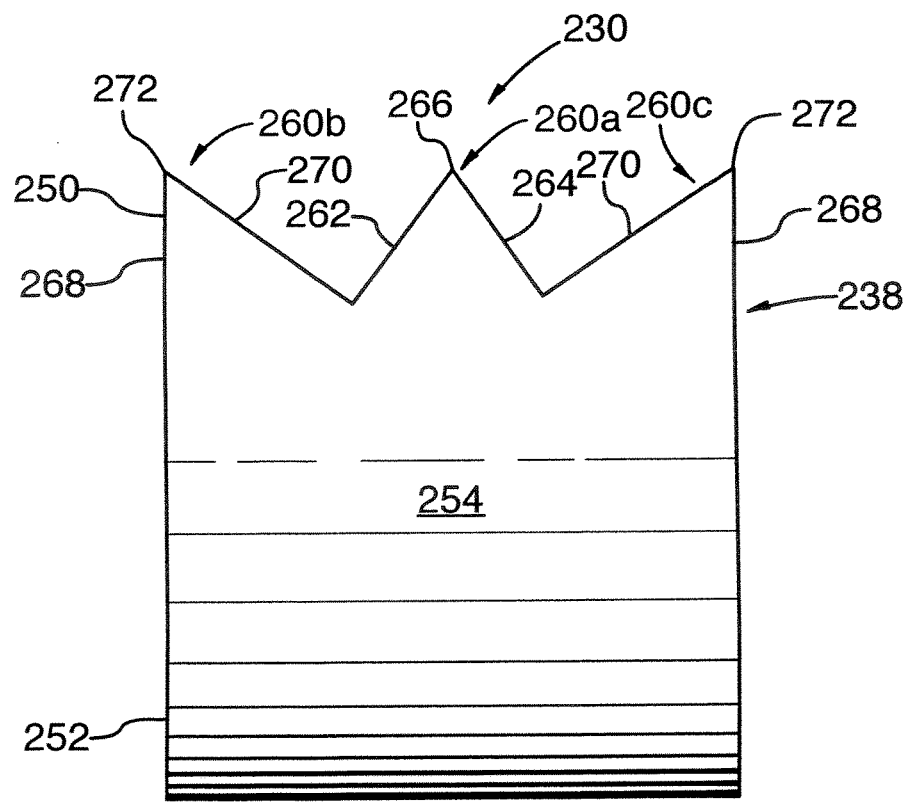
FIG. 17 is a top plan view of the cutting tooth of FIG. 16.
Figure 18:
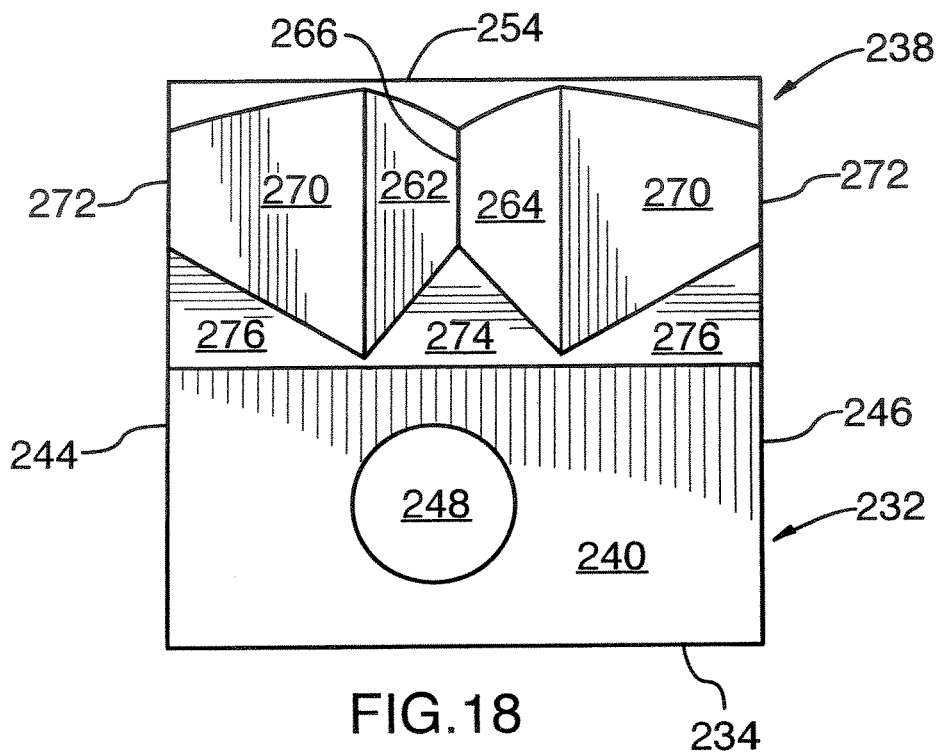
FIG. 18 is a front elevation view of the cutting tooth of FIG. 16.
Figure 19:
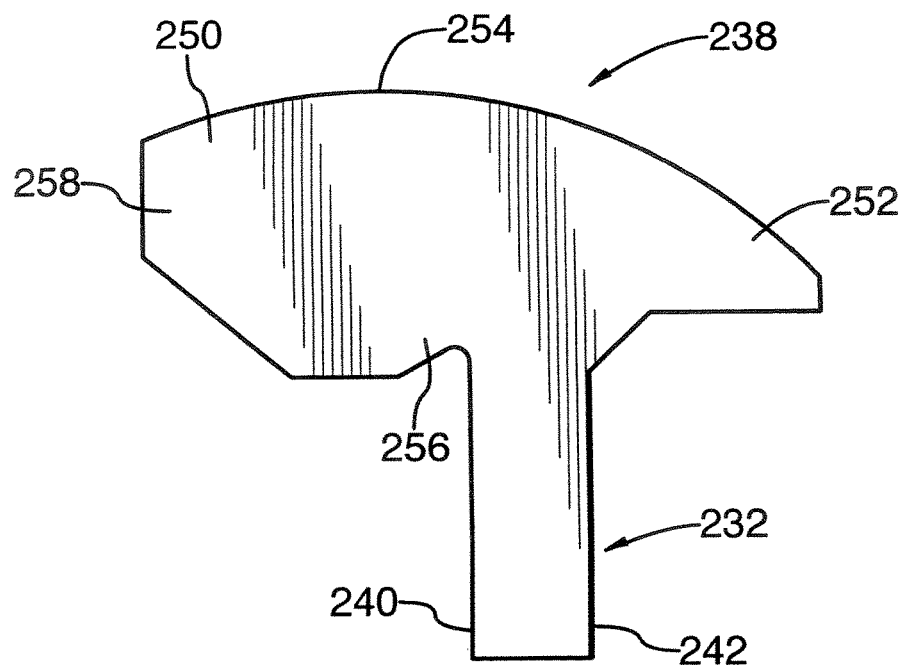
FIG. 19 is a side elevation view of the cutting tooth of FIG. 16.

As best shown in FIG. 19, the cutting portion 238 is generally T-shaped with a side profile that is not unlike that of the head of a hammer. The cutting portion 238 has a leading flange 250 and an opposed trailing flange 252. A generally arcuate face 254, spaced away from the base portion 232, extends between the leading and trailing flanges 250 and 252 and further defines the contour of the cutting tooth. The leading flange 250 has a proximal end 256 joined to the corresponding end of the trailing flange 252 and a distal end 258. The distal end 258 has formed therein a plurality of wedge-shaped projections 260. In the present embodiment, the cutting portion 238 has three wedge-shaped projections 260—a central projection 260a flanked by a pair of side projections 260b and 260c. While three projections are preferred, the cutting portion 238 may be configured with an alternate number of projections. When viewed in plan as shown in FIG. 17, the projections 260a, 260b and 260c impart a zigzag profile to the leading flange 252.

The central wedge-shaped projection 260a includes a first lateral face 262 and a second lateral face 264 that meet at a cutting edge 266. Similarly, each of the side projections 260b, 260c also have first and second lateral faces 268 and 270 that meet at a cutting edge 272. The first lateral faces 268 of the projections 260b and 260c are defined by the sides of the leading flange 250. In contrast to the cutting edge 112 of cutting tooth 70, when the cutting tooth 230 is operatively connected to the support body 22, the cutting edge 266 extends substantially transverse to the rotational axis A-A of the brush cutting head. Adjacent the base portion 232, the lateral faces 262 and 264 of the projection 260a and the lateral faces 268 and 270 of the projections 260b and 260c are truncated so as to define generally triangular impact faces 274 and 276, respectively, with which the brush or other material will make first contact during operation of the brush cutter.

In this embodiment, the cutting tooth 230 is of unitary construction and cast from hardened steel.

The mounting assembly 72 is now described in greater detail with reference to FIGS. 4, 6, 13 and 14. The mounting assembly 72 includes a first plate 130 disposed forwardly of the cutting tooth 70, a second plate 132 disposed rearwardly of the cutting tooth 70 and a fastener in the nature of a bolt 134. In this embodiment, the first plate 130 is fixed to the support body 22. As explained below, when mounted within the station 32, the cutting tooth 70 is fixedly retained between the first and second plates 130 and 132 by bolt 134. A deflector member 138 is further provided to reinforce the first plate 130 and to deflect debris away from the first plate thereby protecting it from direct impact with rocks.

Figure 13:
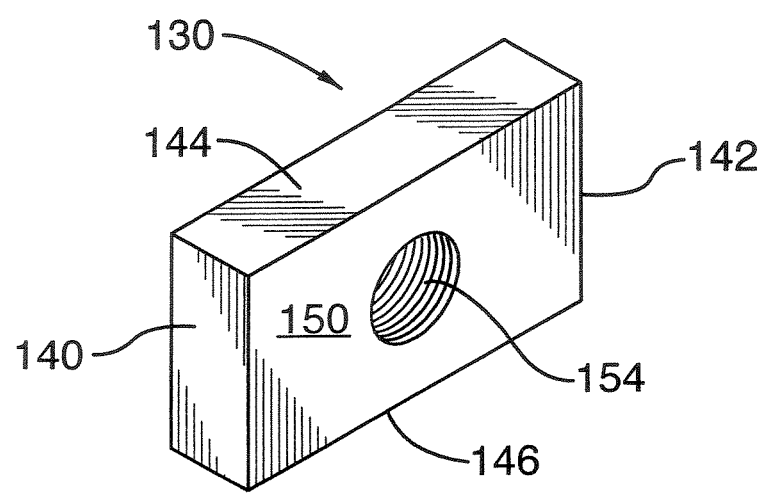
FIG. 13 is a front perspective view of the first plate shown in FIG. 5.

As shown in FIG. 13, the first plate 130 has a rectangular shape defined by a pair of opposed, relatively short, sides 140 and 142 and a pair of opposed, relatively long, sides 144 and 146 that extend between the short sides 140 and 142. In the present embodiment, the first plate 130 is mounted upright on the support body 22 with its long side 146 welded to the curved surface 28 and its short sides 140 and 142 welded to the opposed faces of adjacent collars. The first plate 130 further includes a leading face 152 and an opposed, trailing face 150 for abutting the cutting tooth base portion 74 (shown in FIG. 4) and a centrally threaded aperture 154 defined therein. The aperture 154 extends between the leading and trailing 152 and 150 and is adapted to receive the bolt 134 therethrough.

The deflector member 138 is a rectangular plate with first and second longitudinal ends 156 and 158. The deflector member 138 is mounted generally tangent to the curved surface 28 with its beveled second end 158 abutting the leading face 152 of the first plate 130 adjacent the side 44. The deflector member 138 is securely fixed to the support body 22, the adjacent collars 32 and the leading face 152 of the first plate 130 by welding.

While in this embodiment, the first plate 130 and the deflector member 138 are separate components it should be appreciated that they need not be in every application. In alternative embodiments, the first plate 130 and the deflector member 138 may be integrally formed.

As best shown in FIG. 5, the first plate 130 and the deflector member 138 of mounting assembly 72 are mounted between a pair of adjacent collars 30 with the trailing face 150 of the first plate 130 disposed flush with the end 46 of the sidewall 40 so as to allow unobstructed access to the cutout 50 during tooting.

Figure 4:
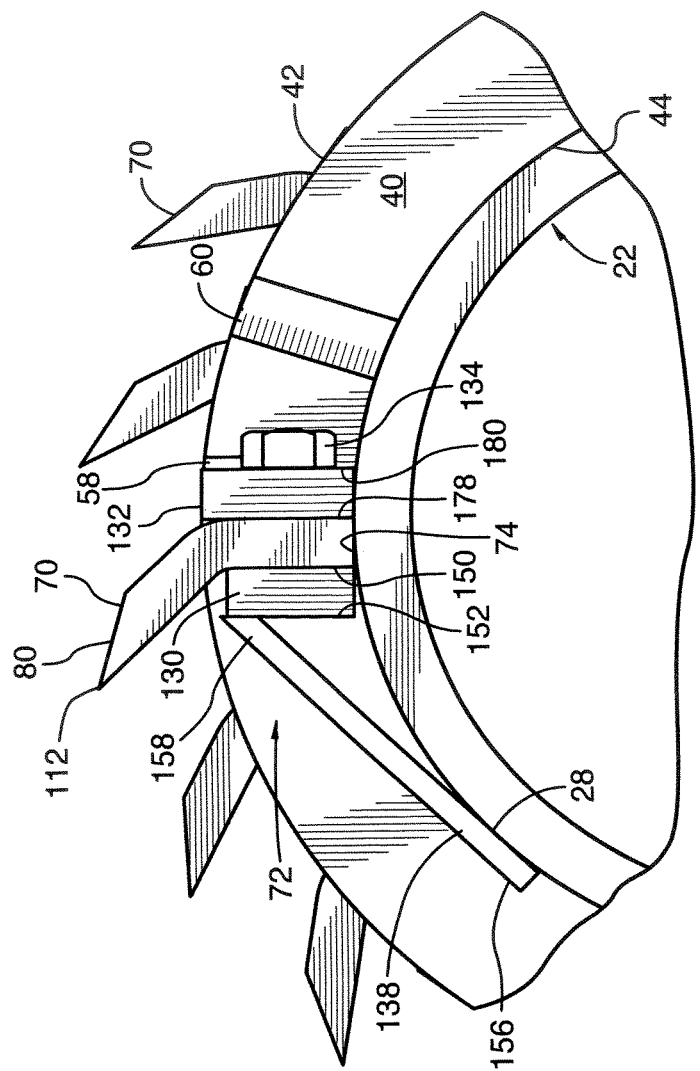
FIG. 4 is an enlarged view similar to that illustrated in FIG. 2a showing the encircled portion '4'.
Figure 14:
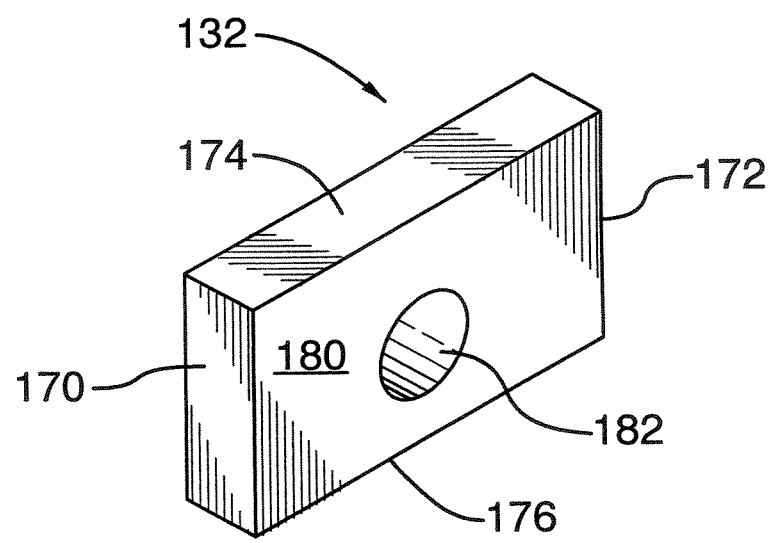
FIG. 14 is a front perspective view of the second plate shown in FIG. 5.

Referring to FIG. 14, the second plate 132 is generally similar to the first plate 130 in that it is also rectangular and is defined by a pair of opposed, relatively short, sides 170 and 172 and a pair of opposed, relatively long, sides 174 and 176 that extend between the short sides 170 and 172. The second plate 132 further includes a leading face 178 for abutting the cutting tooth base portion 74 (as shown in FIG. 4), an opposed trailing face 180 and an aperture 182 defined therein. The aperture 182 extends between the leading and trailing faces 178 and 180 and is adapted to receive the bolt 134 therethrough.

Preferably, the plates 130 and 132 and the deflector member 138 are made of hardened steel. However, other materials exhibiting similar wear resistance and strength characteristics may be used in the fabrication of the mounting assembly components.

As will be appreciated by a person skilled in the art, the mounting assembly 72 and is of generally simple construction. In contrast to known mounting assemblies, the uncomplicated design of the mounting assembly 72 tends to make it relatively simple and inexpensive to manufacture, easy to mount and easy to replace. Moreover, given its configuration and location between adjacent collars 30, the mounting assembly 72 tends to be less prone to damage from contact with rocks and trees.

Figure 6:
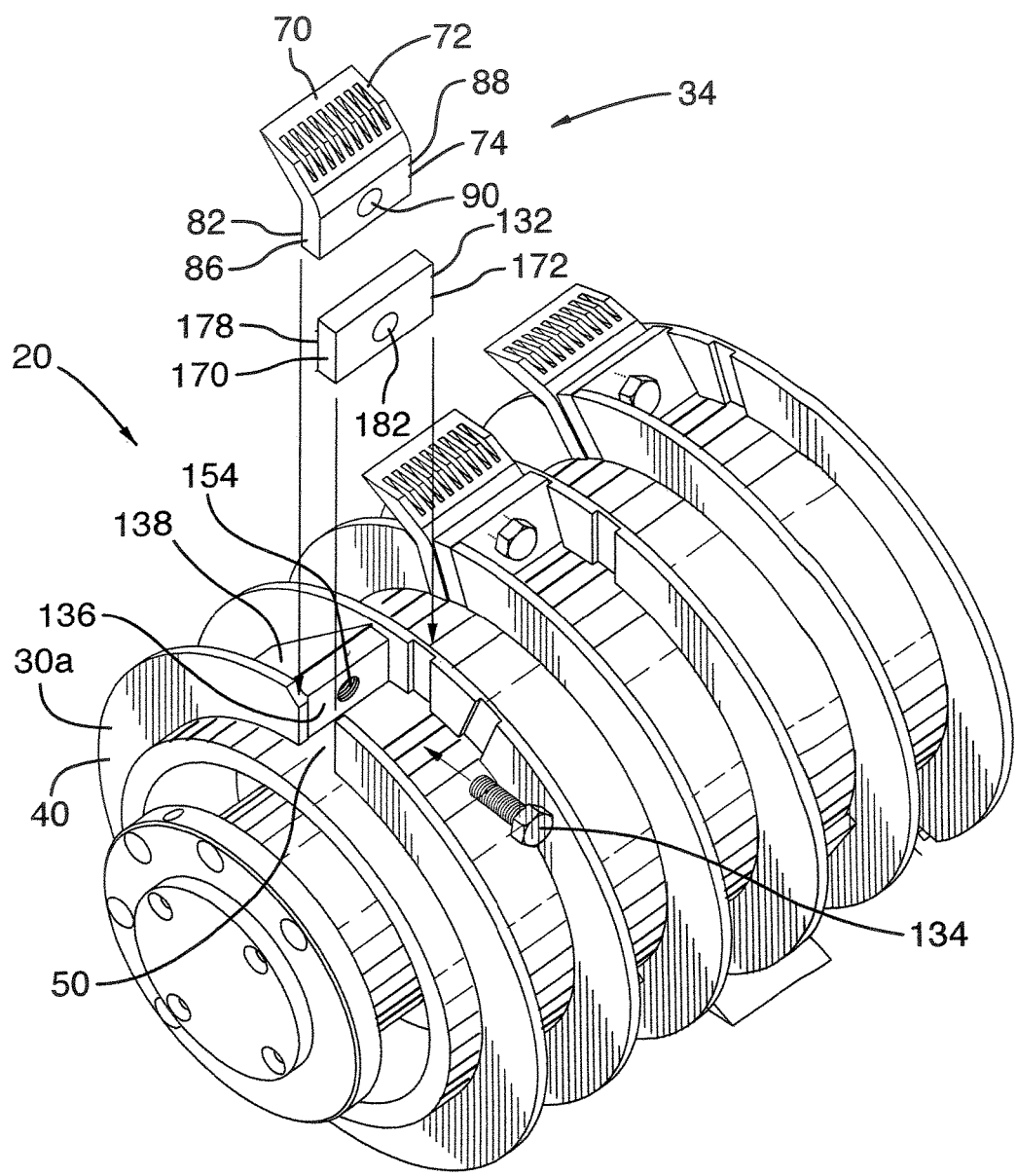
FIG. 6 is an enlarged perspective view similar to that illustrated in FIG. 5 showing a cutting tooth and a portion of its corresponding mounting assembly exploded.

Referring to FIGS. 5 and 6, the attachment of the cutting tooth 70 to the brush cutting head 20 is now described in greater detail in the context of station 32ab. The cutting tooth base portion 74 is urged against the first plate 130 such that its leading face 82 abuts the trailing face 150 of the first plate 130 and its bore 90 is aligned with the threaded aperture 154. The lateral face 88 of the base portion 74 abuts the face 54 of collar 30b while the opposed face 86 extends beyond face 54 of collar 30a and through the cutout 50 to lie flush with face 52 of collar 30a. In this position, the cutting portion 80 of the cutting tooth also extends beyond face 54 of collar 30a to lie flush with the face 52 thereof to thereby pro vide a continuous cutting line running along the entire length of the support body 22 during rotation of the brush cutter head 20.

Thereafter the short side 172 of second plate 132 is introduced into slot 66 defined by the first rebate 58 formed in collar 30b. With short side 172 fully received within slot 66, the opposed side 170 of second plate 132 projects through the cutout 50 to lie flush with face 52 of collar 30a in similar fashion to the side 88 of base portion 74. Thus disposed, the second plate 132 abuts the trailing face 84 of the cutting tooth base portion 74 and its aperture 182 is aligned with bore 90 and threaded aperture 154. The bolt 134 is then inserted through the aligned apertures 182, 90 and 154 and threadingly engages the threading of aperture 154. The bolt 134 is then tightened to ensure the cutting tooth 70 is held fast within the station 32ab.

In the event the cutting tooth 70 is damaged or worn, it may be easily replaced by releasing the cutting tooth 70 from the station 32ab. To do so, the bolt 134 is unfastened to permit the first and second plates 130 and 132 to be detached from the cutting tooth. The cutting tooth may then be removed from the station. If the cutting tooth 70 is lodged within the station 32ab, a mallet or similar tool may be used to facilitate removal thereof by striking the lateral face 88 of the cutting tooth 70 so as to urge the cutting tooth 70 to move towards the cutout 50 formed in the collar 30.

With the appropriate modifications, the foregoing description may also apply to the mounting of cutting tooth 230 within a station 32.

It will thus be understood that, the cutting tooth 70 is retained not only by the plates 130 and 132 but also by collar 30a. The first plate 130 cooperates with the rebate 58 defined in collar 30b and the sidewall ends 46 and 48 of collar 30a snugly hold the cutting tooth 70 and the second plate 132 within the cutout 50. Advantageously the collars 30 serve a dual purpose in the brush cutting head 20. On one hand, the collars 30 cooperate with the mounting assembly 72 to securely fasten the cutting teeth and on the other, the collars 30 protect the cutting teeth 70 from damage. The collars offer two-fold protection to the cutting teeth by shielding the cutting teeth from rocks and other hard objects and by reducing the stresses to which the cutting teeth are subjected during operations by improving the distribution of forces through the mounting assembly. Use of the collars 30 in this manner tends to obviate the need for relatively heavy mounting blocks thereby making it possible to manufacture brush cutting heads that tend to be relatively lightweight and have modest energy requirements. As a result, the brush cutting head 20 tends to be suitable for use in a relatively lightweight brush cutter.

Figure 15:
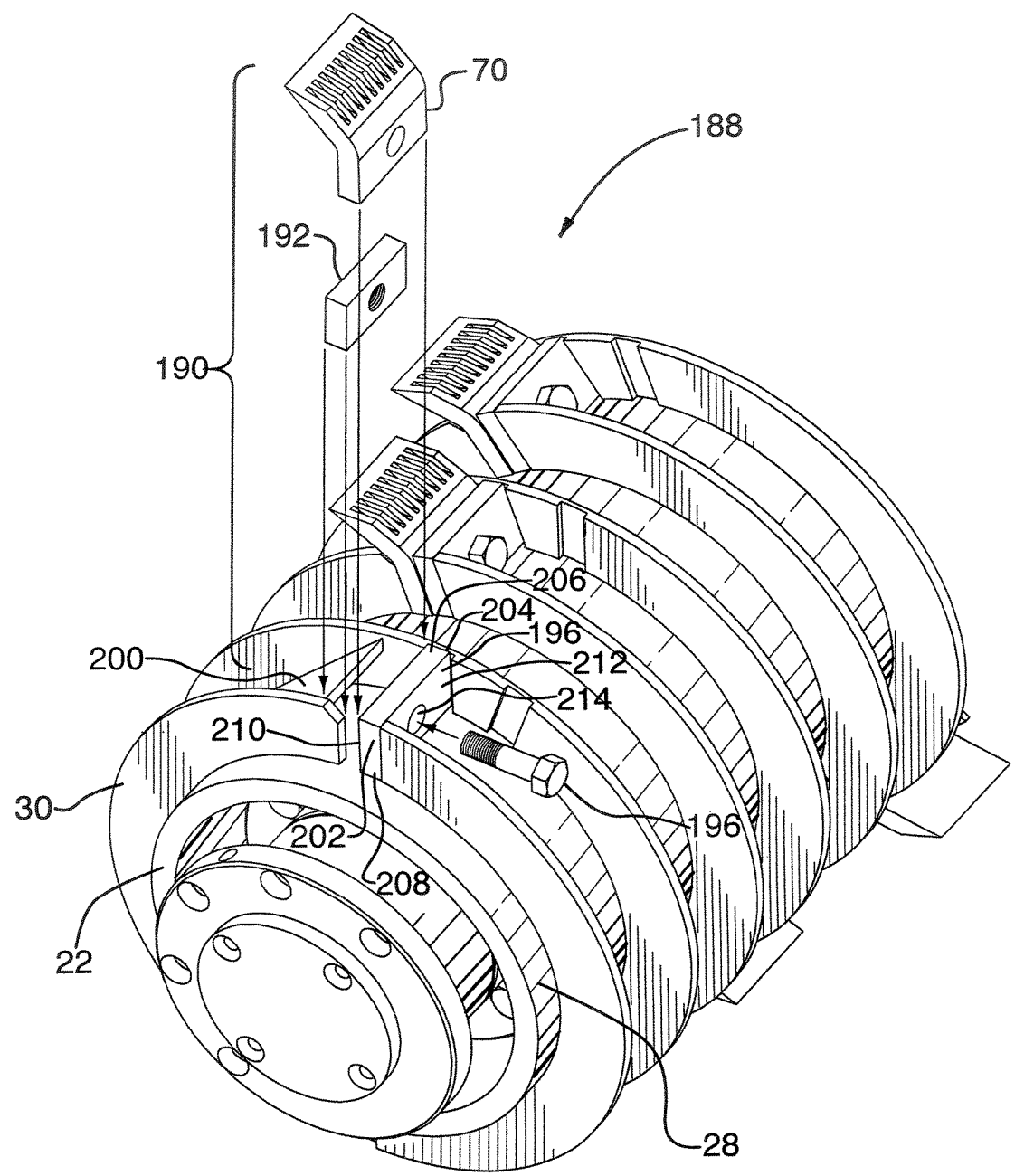
FIG. 15 is an enlarged perspective view of a brush cutting head according to an alternative embodiment of the present invention, showing a cutting tooth and a portion of its corresponding mounting assembly exploded.
Figure 16:
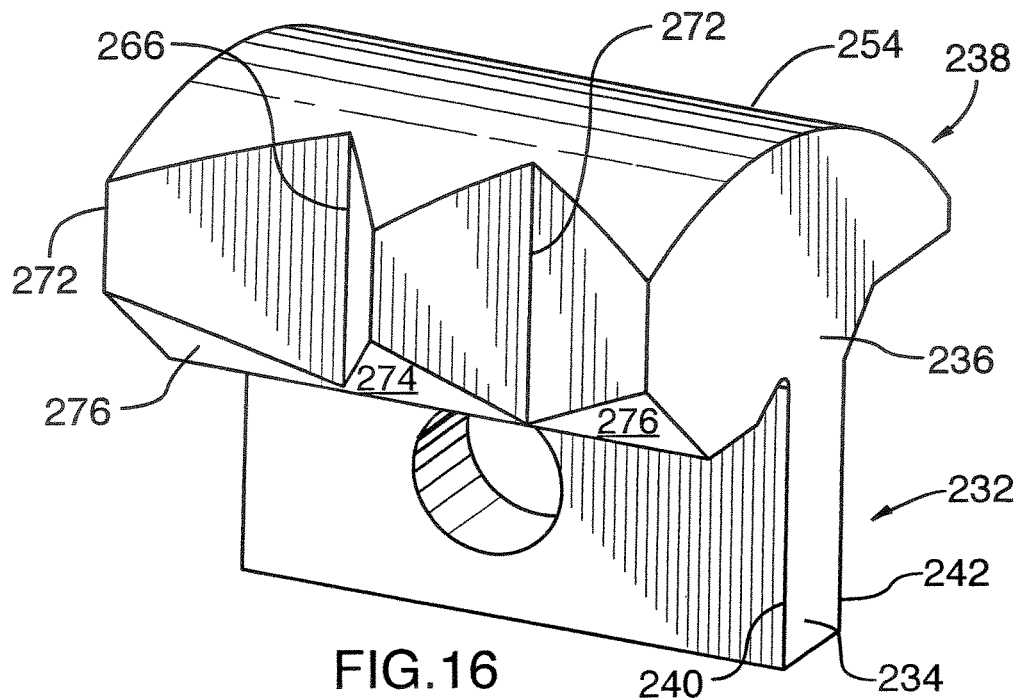
FIG. 16 is a perspective view of an alternative cutting tooth to that shown in FIG. 10.

In the present embodiment, the first plate 130 is fixed to the curved surface 28 of the support body 22 and welded to the opposed faces of the adjacent collars 30 whereas the second plate is releasably attached to the cutting tooth 70 and adjacent collars 30. This need not be the case in every application. In a different embodiment, the first plate could be releasably detachable from the collars and the second plate could be fixed to the support body. Such an embodiment is illustrated in FIG. 15 wherein a brush cutting head designated generally with reference numeral 188, is shown to have an alternate mounting assembly 190.

Mounting assembly 190 is generally similar to mounting assembly 72 in that it has a first plate 192 disposed forwardly of the cutting tooth 70, a second plate 194 disposed rearwardly of the cutting tooth 70, a fastener in the nature of a bolt 196 and a deflector member 200. Each of these components is similar in both construction and configuration to their respective counterpart elements 130, 132 134 and 138 in mounting assembly 72. In particular, the second plate 194 resembles second plate 132 in that it is rectangular and is defined by a pair of opposed, relatively short, sides 202 and 204 and a pair of opposed, relatively long, sides 206 and 208 that extend between the short sides 202 and 204. Moreover, the second plate 194 has a leading face 210 for abutting the cutting tooth base portion 74 (as shown in FIG. 4), an opposed trailing face 212 and an aperture 214 defined therein. The aperture 214 extends between the leading and trailing faces 210 and 212 and is adapted to receive the bolt 196 therethrough.

However, the mounting assembly 190 differs from mounting assembly 72 in that the first plate 192 is not permanently attached to any of the support member 22, collars 32 and deflector member 200. Instead, it is the second plate 194 that is fixedly mounted to the collars 32 and the support member 22. During fabrication of the brush cutting head 188, the second plate 194 is welded to the curved surface 28 along its long side 208. The second plate 194 is also welded to the adjacent collars 30 at two locations—first along its short side 204 to permanently fix it within the one of the rebates 58 and 60 and secondly, along the point of contact between the trailing face 208 and the sidewall end 46.

The deflector member 200 is mounted to the support body 22 and to the adjacent collars 32 in much the same manner as described above in the context of deflector member 138, except that the deflector member 200 is not welded to the first plate 192.

To attach the cutting tooth 70 to the brush cutting head 188, the first plate 192 is placed on the curved surface 28 in an upright position with its leading face abutting the deflector member 200 and its short sides abutting the opposed collars. The cutting tooth base portion 74 is then placed between the first plate 192 and the second plate 194 such that its trailing face 84 abuts the leading face 210 of the second plate 194. Thereafter, the bolt 196 is inserted into the aligned apertures of the first plate 192, the cutting tooth 70 and the second plate 194 and tightly fastened.

Other modifications may be made without departing from the principles of the present invention. For instance, it may be possible to alter the configuration of the protective collars. In contrast to brush cutting head 20 wherein only the second plate and the cutting tooth 70 fit within cutout 50, in an alternative embodiment, the collars could be fabricated with larger cutouts so as to accommodate both mounting plates and the cutting tooth mounted therebetween. One such embodiment is shown in FIGS. 20 to 29, wherein an alternate brush cutting head is designated generally with reference numeral 300.

Brush cutting head 300 is generally similar to brush cutting head 20 in that it employs the same support body 22. However, as is described in greater detail below, in this embodiment, different collars and cutting tooth assemblies are used. The brush cutting head 300 has a plurality of protective collars 302 concentrically mounted to the support body at spaced intervals along the intermediate portion 26 of the support body 22. Adjacent collars 302 cooperate with each other to define mounting sites or stations 304 for each receiving a cutting tooth assembly 306 therein.

Figure 24:
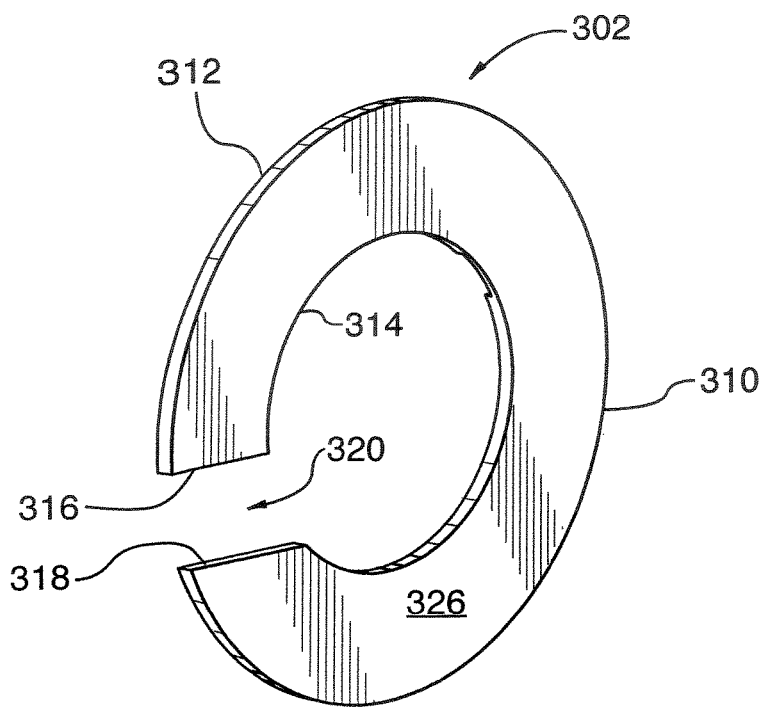
FIG. 24 is a perspective view of one of the collars shown in FIG. 22.
Figure 25:
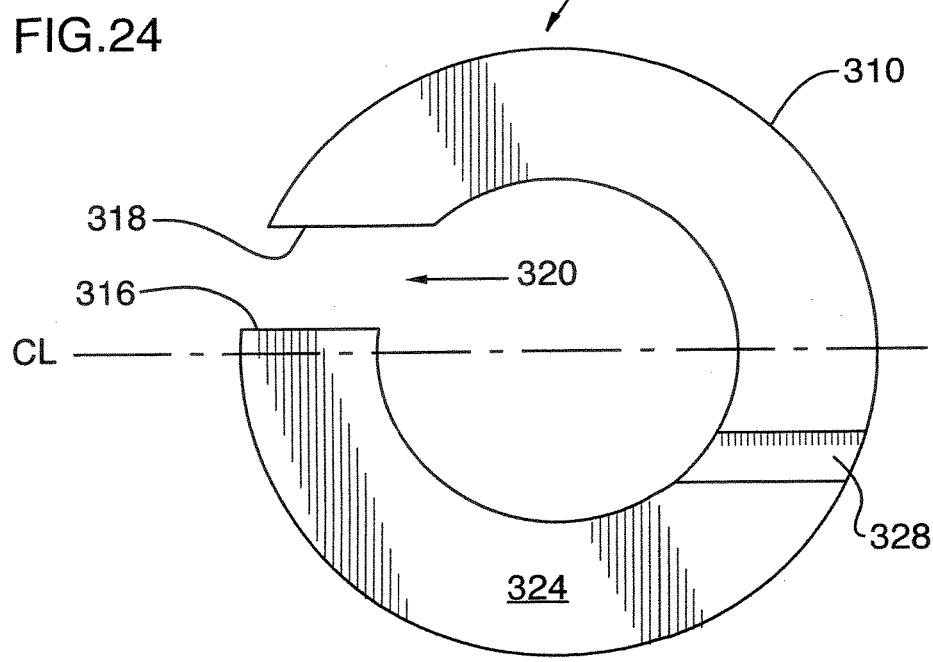
FIG. 25 is a side elevation view of the collar shown in FIG. 22.

Referring to FIGS. 24 and 25, each collar 302 is generally similar to collar 30 in that it has a penannular structure defined by a relatively flat, circumferentially extending, sidewall 310. The sidewall 310 is bounded circumferentially by an outer edge 312 and inner edge 314, and has first and second spaced apart ends 316 and 318. The space between the ends 316 and 318 defines a cutout 320 formed in the collar 302. The cutout 320 is axially offset from the centreline CL of the collar 302. The sidewall 310 further includes two opposed faces 324 and 326 and a single rebate 328 formed within the face 324 of the sidewall 310. The rebate 328 extends between the outer and inner edges 312 and 314. The rebate 328 is also axially offset from the centerline CL opposite the cutout 320. As best shown in FIG. 25, the cutout 320 and the rebate 328 are disposed on opposite sides of the centreline CL and extend substantially parallel to each other. While in the present embodiment each collar 302 is formed with only a single rebate 328, it will be appreciated that in alternative embodiments, each collar could be provided with two or more rebates defined in the sidewall.

In like fashion to collars 30, the collars 302 are radially mounted to the support body 22 with their inner sidewall edges 314 welded to the curved surface 28. The spacing between adjacent collars 302 is sized to correspond generally to the width of the cutting tooth assembly 306. Moreover, the collars 302 are mounted with their respective faces 324 all oriented in the same direction.

Figure 23:
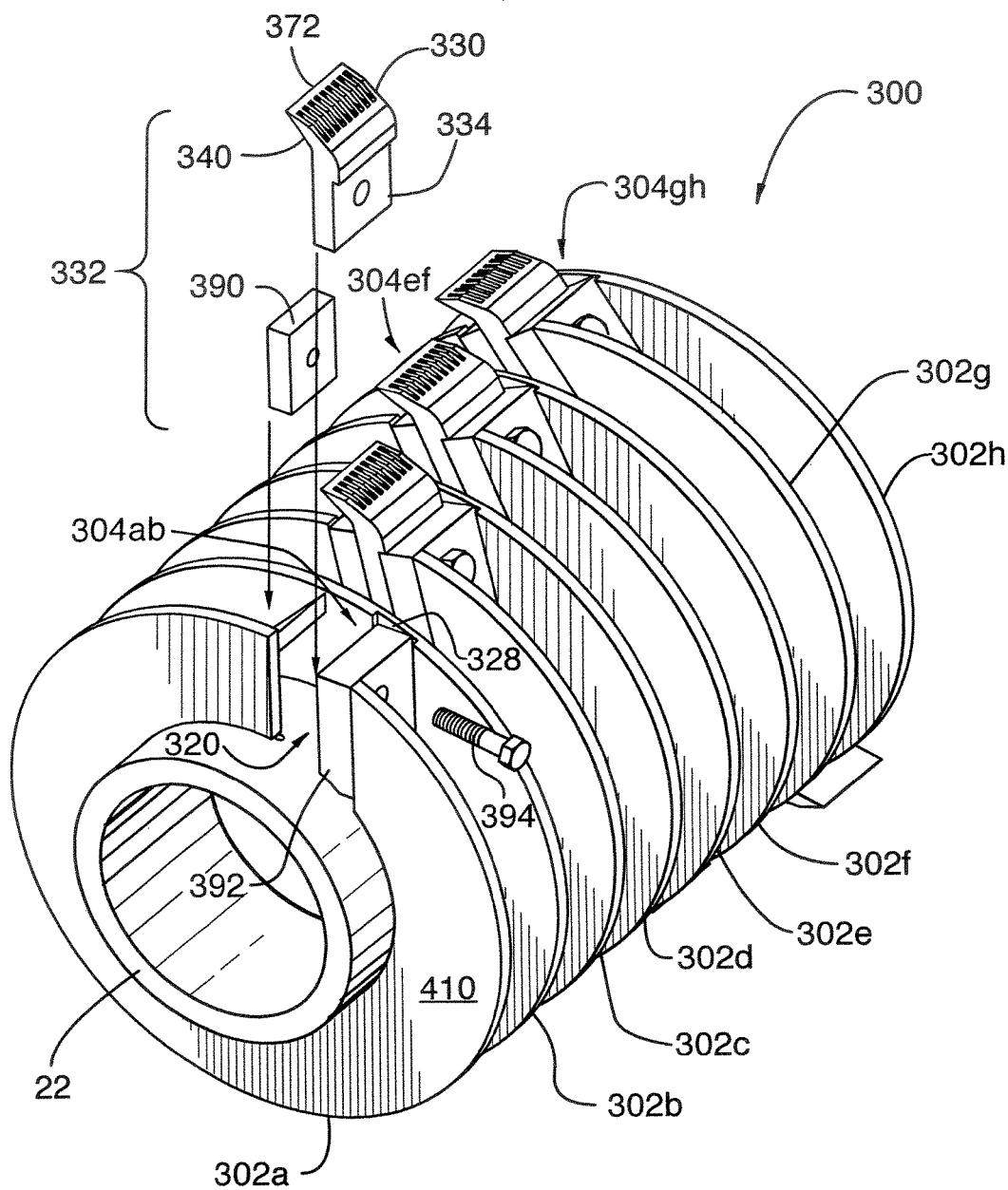
FIG. 23 is an enlarged perspective view of one end of the brush cutting head of FIG. 20 showing a cutting tooth and a portion of its corresponding mounting assembly exploded.

Each collar 302 is radially offset from its adjacent collar 302 such that the cutouts 320 of adjacent collars 302 are staggered relative to each other. In this arrangement, the cutout 320 of a given collar 302 is substantially aligned with the rebate 328 of another, adjacent collar 302 to allow a portion of the cutting tooth assembly 306 to extend longitudinally therebetween in an orientation that is substantially parallel to the axis of rotation A-A. As shown in FIG. 23, the cutout 320 of collar 302a and the rebate 328 of collar 302b are substantially aligned.

Figure 20:
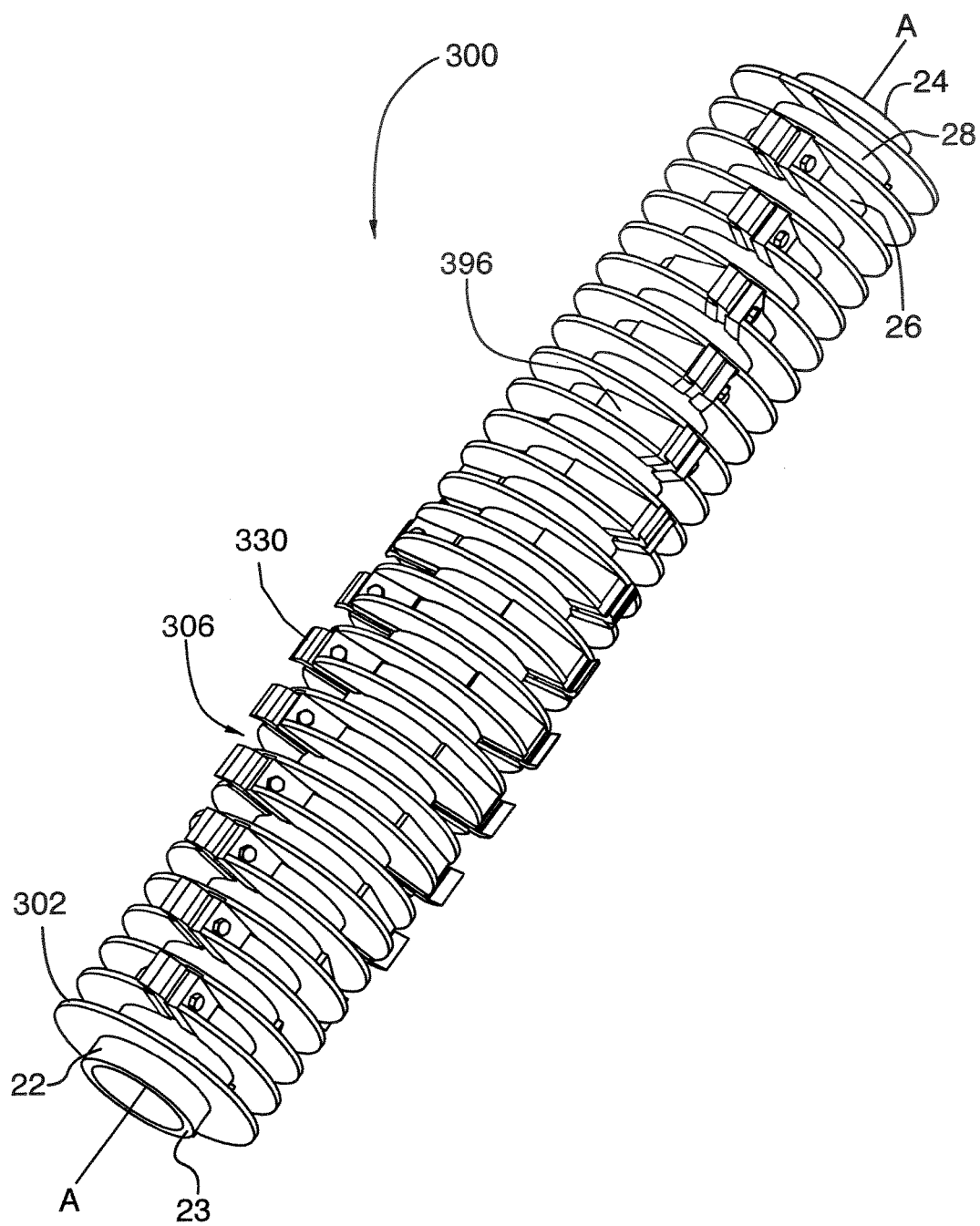
FIG. 20 is a perspective view of a brush cutter head according to another embodiment of the present invention.

Each station 304 is defined between the cutout 320 formed in a given collar 302 and that portion of the sidewall 310 of the adjacent collar 302 that is disposed opposite the cutout 320. Referring again to FIG. 23, the station 304ab (previously identified generically as "station 304") can be seen to be defined between the cutout 320 in collar 302a and the portion of sidewall 310 of collar 302b located opposite the cutout 320. Each of the other stations 304, identified in FIG. 23 is similarly defined between the cutout 320 of one collar 302 and a portion of sidewall 310 of an adjacent collar 302. As best shown in FIGS. 20 and 23, each station 304 is circumferentially staggered from its adjacent station.

As in the brush cutting head 20, in this embodiment, the staggered arrangement of the collars 302 allows the plurality of cutting tooth assemblies 306 to be disposed along the support body 22 in a generally double helix pattern thereby permitting cutting across the entire length of the support body 22 when the brush cutting head 300 is rotated about axis 'A-A'. It will however be appreciated that the cutting tooth assemblies 306 could be disposed differently along the support body 22.

Turning now to FIGS. 21, 22 and 26 to 29, the cutting tooth assembly 306 is now described in greater detail. The cutting tooth assembly 306 includes a cutting tooth 330 and a mounting assembly 332 for securely fixing the cutting tooth 330 within a respective station 304. The cutting tooth 330 is generally similar to cutting tooth 70 in that it has a plate-like, base portion 334 having a first end 336 and a second end 338, and a cutting portion 340 mounted to the second end 338 of the base portion 334. Whereas in cutting tooth 70, the cutting portion 80 and the base portion 74 are of a substantially similar size, in this embodiment the cutting portion 340 is relatively smaller than the base portion 334.

The base portion 334 has a generally planar, leading face 342, an opposing trailing face 344 and two, spaced apart, lateral faces 346 and 348. Defined in the base portion 334 is a bore 350 that extends between the leading face 342 and the trailing face 344. The bore 350 is adapted to receive a fastener therethrough to permit fastening of the cutting tooth 330 to the mounting assembly 332. The base portion 334 however differs from base portion 74 in two respects. First, the base portion 334 is relatively longer than the base portion 74. Second, adjacent its second end 338, the base portion 334 has an abutment flange or shoulder 352 which projects from the trailing face 344. The abutment flange 352 reinforces the cutting tooth 330 and enables it to better resist the high impact forces to which it may be subjected during operation of the brush cutting head 300. As a result, the cutting tooth 330 tends to be less vulnerable to cracking failures along the area where the cutting portion 340 meets the base portion 334. As will be explained in greater detail below, when the cutting tooth 330 is mounted within the station 304, the abutment flange 352 will rest on a portion of the mounting assembly 332.

As in the cutting tooth 70, the cutting portion 340 is carried on the second end 338 of the base portion 334 in a generally, forwardly leaning or canted fashion, and is integrally formed with the base portion 334. However, in this embodiment the cutting tooth 330 is fabricated by forging and machining.

But for its relatively smaller size, the cutting portion 340 resembles the cutting portion 80 in that it also has a leading face 360, an opposed trailing face 362 and two spaced-apart lateral faces 364 and 366. The leading face 360 of the cutting portion 340 joins the leading face 342 of the base portion 334 while the trailing face 362 connects to the abutment flange 352 of the base portion 334. As best shown in FIG. 27, an external obtuse angle $\theta_2$ is formed between the leading face 360 and the leading face 342. In this embodiment, the angle $\theta_2$ is 138 degrees.

In like fashion to leading and trailing faces 100 and 102 in cutting tooth 70, the leading and trailing faces 360 and 362 cooperate with each other to define a tapering, wedge-like, profile 370 that terminates in a cutting edge 372. The cutting edge 372 is carried forwardly of the leading face 342 of the base portion 334 such that it tends to be the first element of cutting tooth 330 to make contact with the brush. The cutting edge 372 extends generally linearly between the lateral faces 364 and 366 and substantially parallel to the rotational axis A-A of the brush cutting head 300. When the cutting tooth 330 is mounted within the station 304, the cutting edge 372 extends beyond the outer edge 312 of the collar sidewall 310 to facilitate the cutting action of the tooth.

Returning to FIG. 27, the trailing face 362 of the cutting portion 330 has an upper portion 374 and a lower portion 376 joined to the upper portion 374. The upper portion 374 extends between the cutting edge 372 and the lower portion 376 whereas the lower portion 376 joins the abutment flange 352 at a transition section 378. As best shown in FIG. 27, the upper portion 374 is bent relative to the lower portion 376 such that an internal obtuse angle $\Phi_2$ is defined therebetween. In the present embodiment, the angle $\Phi_2$ measures 161 degrees. The trailing face 362 is configured with corrugations 380 that are similar to the corrugations 124 formed on cutting tooth 70 such that no further description is required.

Figure 21:
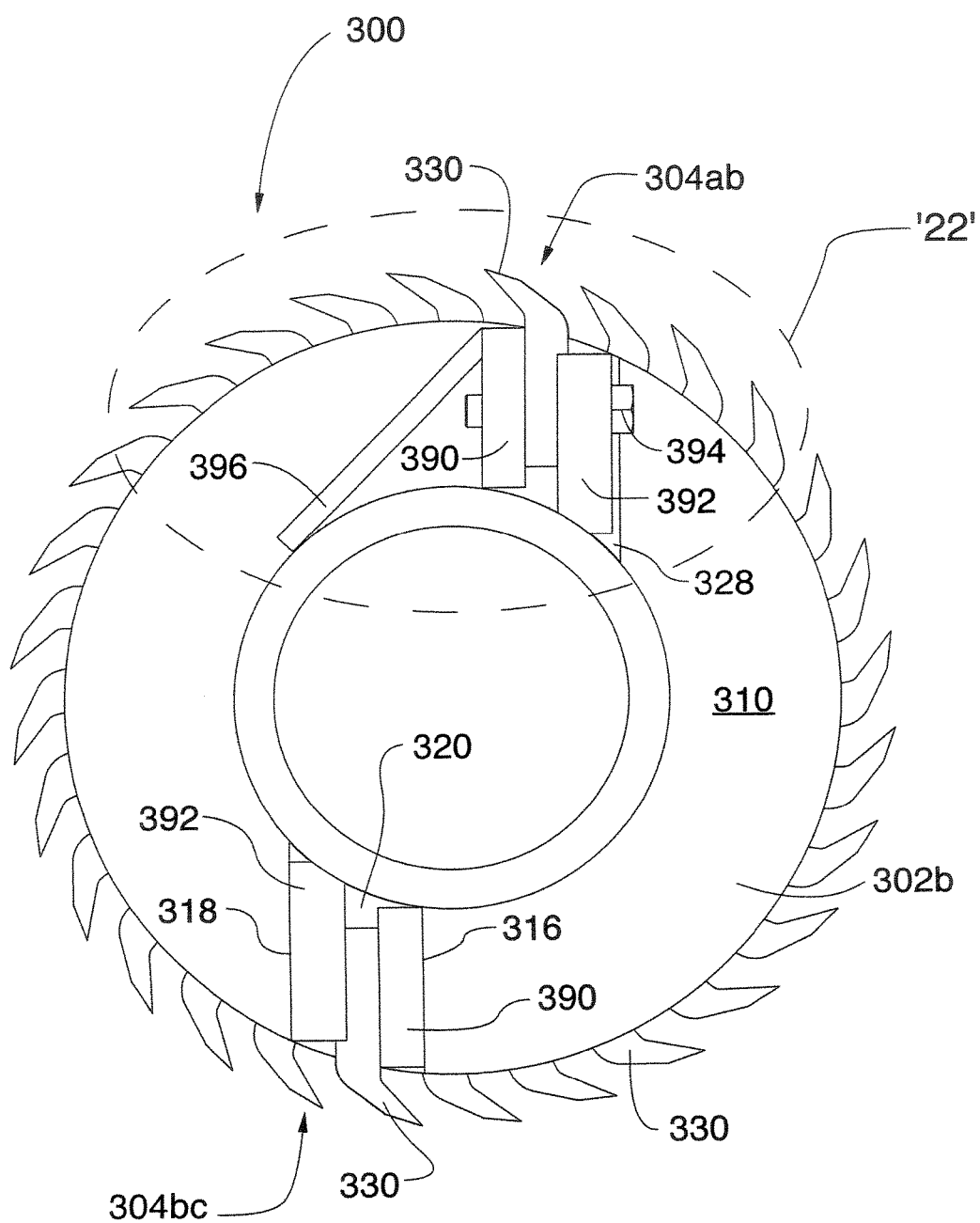
FIG. 21 is an end view of the brush cutting head illustrated in FIG. 20 shown with a collar removed therefrom for the sake of clarity.
Figure 22:
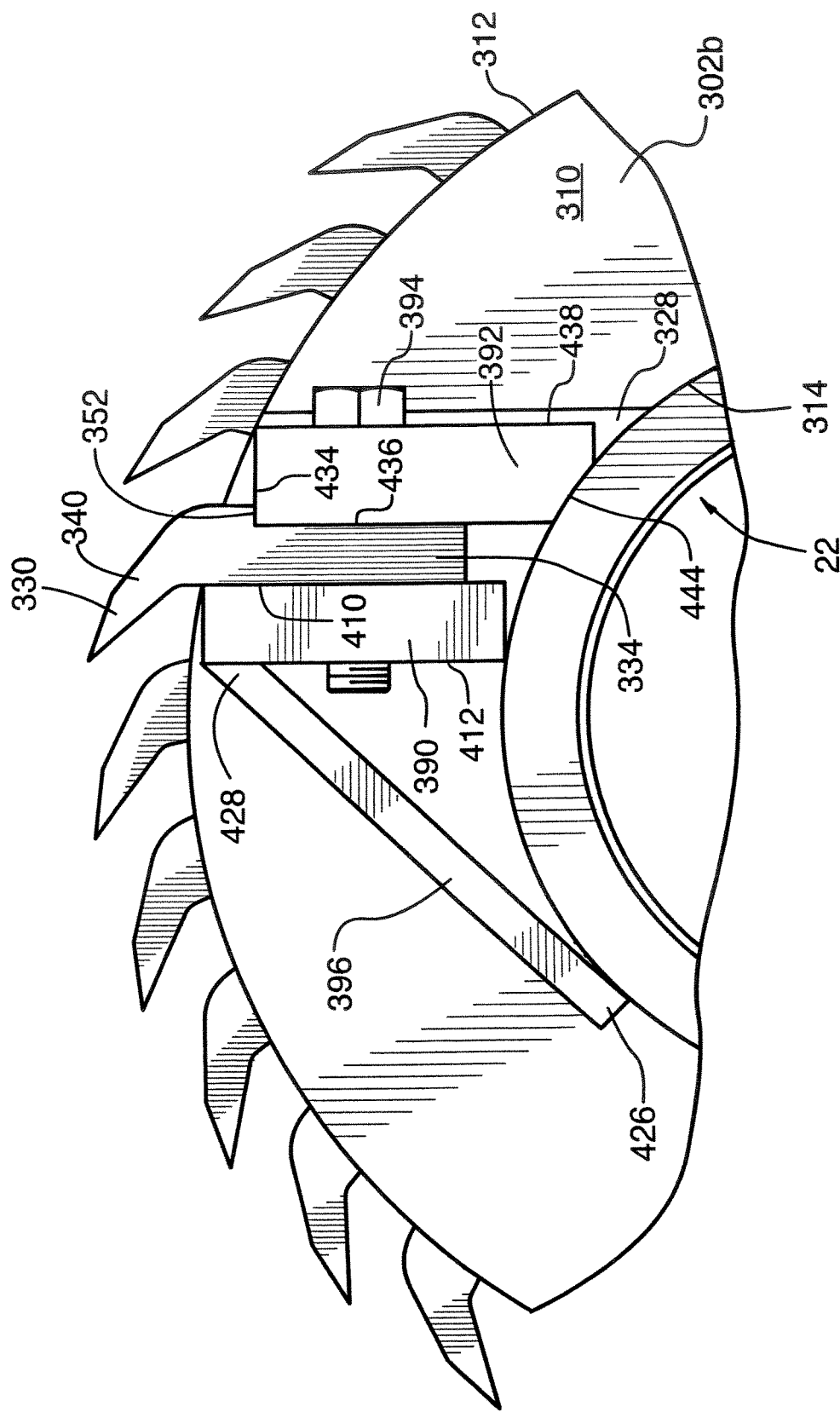
FIG. 22 is an enlarged view similar to that illustrated in FIG. 21 showing the encircled portion '22'.

The mounting assembly 332 is now described in greater detail with reference to FIGS. 21, 22 and 23. The mounting assembly 332 is generally similar to mounting assembly 72 in that it includes a first plate 390 disposed forwardly of the cutting tooth 330, a second plate 392 disposed rearwardly of the cutting tooth 330 and a fastener in the nature of a bolt 394. However, in this embodiment the second plate 392 is welded to the support body 22. As explained below, when mounted within the station 304, the cutting tooth 330 is fixedly retained between the first and second plates 390 and 392 by bolt 394. Also provided, is a deflector member 396 not unlike the deflector member 138 shown in FIG. 4.

Figure 28:
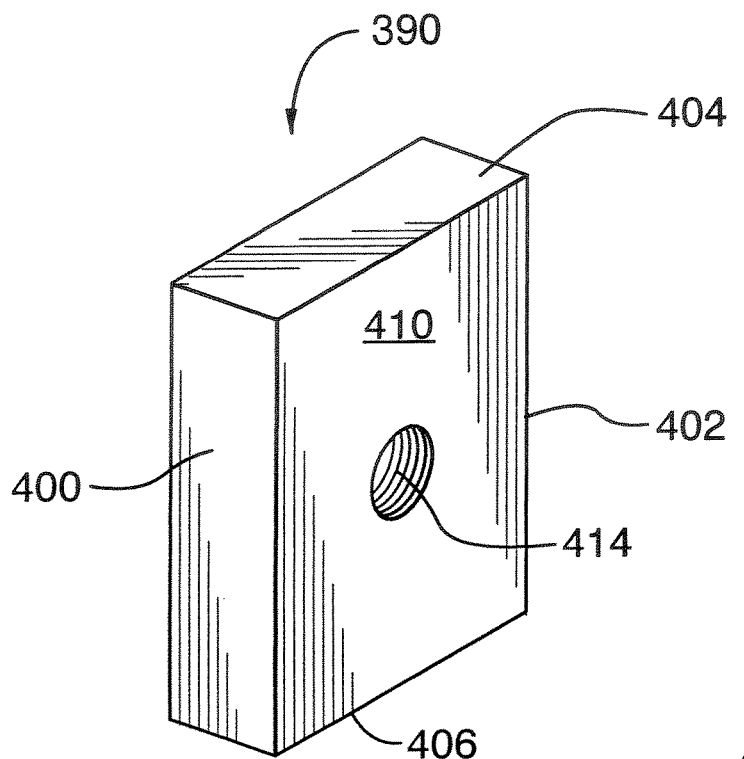
FIG. 28 is a front perspective view of the first plate shown in FIG. 22.

As shown in FIG. 28, the first plate 390 has a rectangular shape defined by a pair of opposed, relatively long, lateral sides 400 and 402 and a pair of opposed, relatively short, sides 404 and 406 that extend between the long sides 400 and 402. In the present embodiment, the first plate 390 is mounted upright on the support body 22 with its short side 406 abutting the curved surface 28. The first plate 390 further includes a leading face 412 and an opposed, trailing face 410 for abutment against the cutting tooth base portion 334 and a centrally threaded aperture 414 defined therein. The aperture 414 extends between the leading and trailing faces 412 and 410 and is adapted to receive the bolt 394 therethrough.

The deflector member 396 is a rectangular plate with first and second longitudinal ends 426 and 428. The deflector member 396 is mounted generally tangent to the curved surface 28 with its beveled second end 428 abutting the leading face 412 of the first plate 390 adjacent the short side 404. The deflector member 396 is securely fixed to the support body 22 and the adjacent collars 302 by welding.

Figure 29:
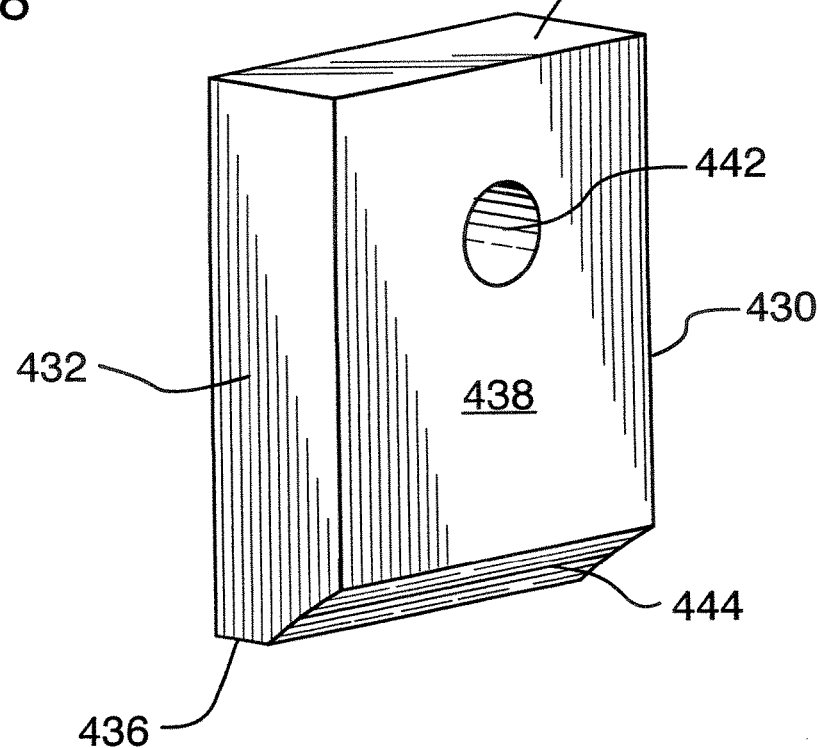
FIG. 29 is a rear perspective view of the second plate shown in FIG. 22.

Referring to FIG. 29, the second plate 392 is also generally rectangular and is defined by a pair of opposed, relatively long, lateral sides 430 and 432 and a pair of opposed, relatively short sides 434 and 436 that extend between the long sides 430 and 432. The second plate 392 further includes a leading face 438 for abutting the cutting tooth base portion 334, an opposed trailing face 440 and an aperture 442 defined therein. The aperture 442 extends between the leading and trailing faces 438 and 440 and is adapted to receive the bolt 394 therethrough. The corner along which the short side 436 would meet the leading face 438 is truncated so as to define an arcuate face 444. The face 444 is radiused to match the arcuate profile of the curved surface 28. This tends to facilitate fixing the second plate 392 to the support body 22.

During fabrication of the brush cutting head 300, the second plate 392 is welded to the curved surface 28 along its arcuate face 444. The second plate 392 is also welded to the adjacent collars 302 at two locations—first along its long side 432 to permanently fix it within the rebate 328 and secondly, along the point of contact between the trailing face 440 and the sidewall end 318. When fixed in this position, the opposing long side 430 of the second plate projects through the cutout 320 to lie flush with the face 326 of collar 302.

Referring to FIG. 23, the attachment of the cutting tooth 330 to the brush cutting head 300 is now described in greater detail in the context of station 304ab. The first plate 390 is placed on the curved surface 28 in an upright position with its leading face abutting the deflector member 396 and its long side 402 abutting the sidewall of collar 302b. The other long side 404 of the first plate 390 extends beyond face 324 of collar 302a and through the cutout 320 to lie flush with face 326 of collar 302a. The cutting tooth base portion 334 is then placed between the first plate 390 and the second plate 392 such that its trailing face 344 abuts the leading face 438 of the second plate 392 and its abutment flange 352 rests on the short side 434 of the second plate 392. Thereafter, the bolt 394 is inserted into the aligned apertures of the first plate 390, the cutting tooth 330 and the second plate 392 and tightly fastened.

In contrast to station 32ab in brush cutting head 20 which receives therein only the cutting tooth 70 and the second plate 132, the station 304ab accommodates both plates 390 and 392 and the cutting tooth 330.

Moreover, while cutting tooth 330 has been described in connection with brush cutting head 300, it will be appreciated that with appropriate modifications, this type of cutting tooth could be also be successfully employed in other brush cutting heads fabricated in accordance with the principles of the present invention.

In each of the brush cutting heads 20, 188 and 300, the protective collars were formed with one cutout and at least one rebate. However, the protective collars could be configured differently. For instance, it may be possible to replace one or more of the rebates in the protective collars with an additional cutout. One such embodiment is shown in FIGS. 30 to 35 wherein an alternative brush cutting head is designated generally with reference numeral 460.

Brush cutting head 460 uses the same support body 22 as a brush cutting head 20 and similarly includes a plurality of protective collars 462 concentrically mounted to the support body at spaced intervals along the intermediate portion 26 of the support body 22. As in the other previously described embodiments, the adjacent collars 462 cooperate with each other to define mounting sites or stations 464 for each receiving a cutting tooth assembly 466 therein.

Figure 32:
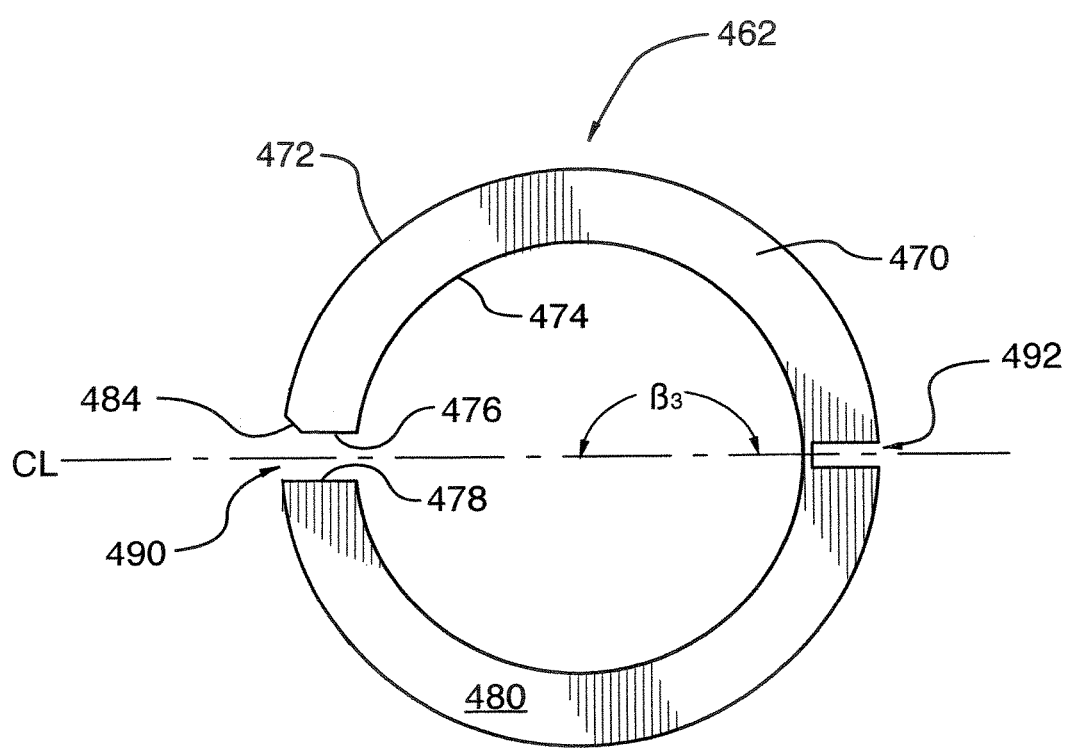
FIG. 32 is a side elevation view of one of the collars shown in FIG. 31.
Figure 33:
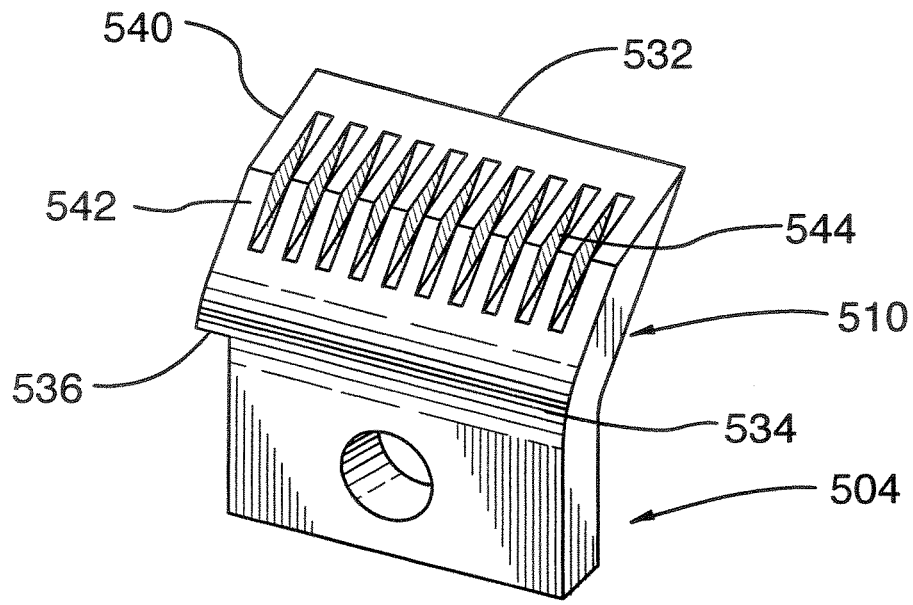
FIG. 33 is a perspective view of one of the cutting teeth shown in FIG. 31.
Figure 34:
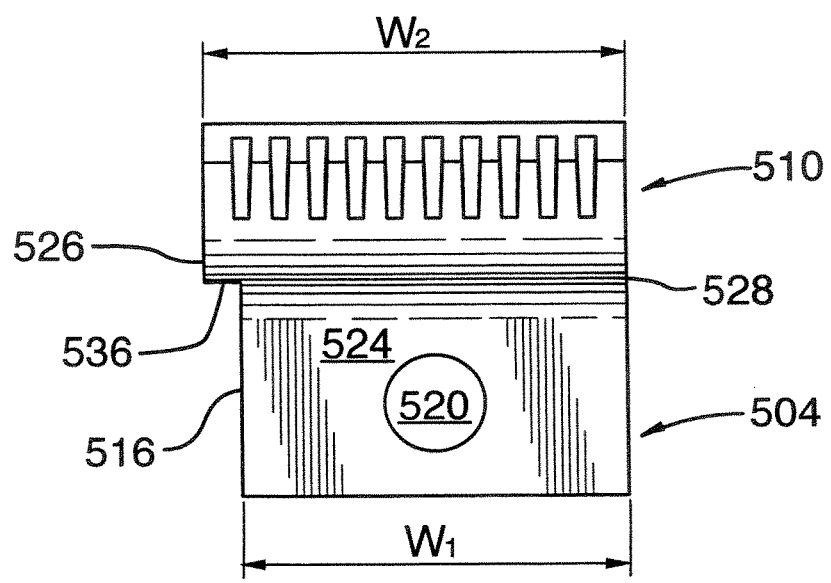
FIG. 34 is rear end view of the cutting tooth shown in FIG. 31.

Referring to FIG. 32, each collar 462 has a penannular structure defined by a relatively flat, circumferentially extending, sidewall 470. The sidewall 470 is bounded circumferentially by an outer edge 472 and inner edge 474, and has first and second spaced apart ends 476 and 478 and two opposed faces 480 and 482. The end 476 of sidewall 470 has a notch 484 formed about the outer edge 472 to pro vide clearance for the forward leaning portion of the cutting tooth assembly 466. The space between the ends 476 and 478 defines a first cutout 490 formed in the collar 462. Disposed substantially opposite to the first cutout 490, is a second, partial cutout 492 defined within the sidewall 470 and extending between the outer and inner edges 472 and 474 thereof. The second cutout 492 is radially offset from the first cutout 490 by an angle $\beta_3$ (as measured from the centerline of the first cutout 490 to the centerline of the second cutout 492). In this embodiment, the angle $\beta_3$ is approximately 180 degrees. However, it will be appreciated that the angle $\beta_3$ may be varied to suit a particular application. At the location of the second cutout 492, the width of the sidewall 470 (as measured between the outer edge 472 and the inner edge 474) thins to a narrow strip 496. As will be explained in greater detail below, the narrow strip 496 supports a portion of the cutting tooth assembly 466.

In like fashion to collars 30, the collars 462 are radially mounted to the support body 22 with their inner sidewall edges 474 welded to the curved surface 28. The spacing between adjacent collars 462 is sized to correspond generally to the width of the cutting tooth assembly 466.

Each collar 462 is radially offset from its adjacent collar 462 such that the first cutouts 490 of adjacent collars 462 are staggered relative to each other. In this arrangement, the first cutout 490 of a given collar 462 is substantially aligned with the second cutout 492 of another, adjacent collar 462 to allow a portion of the cutting tooth assembly 466 to extend longitudinally therebetween in an orientation that is substantially parallel to the axis of rotation A-A.

Figure 30:
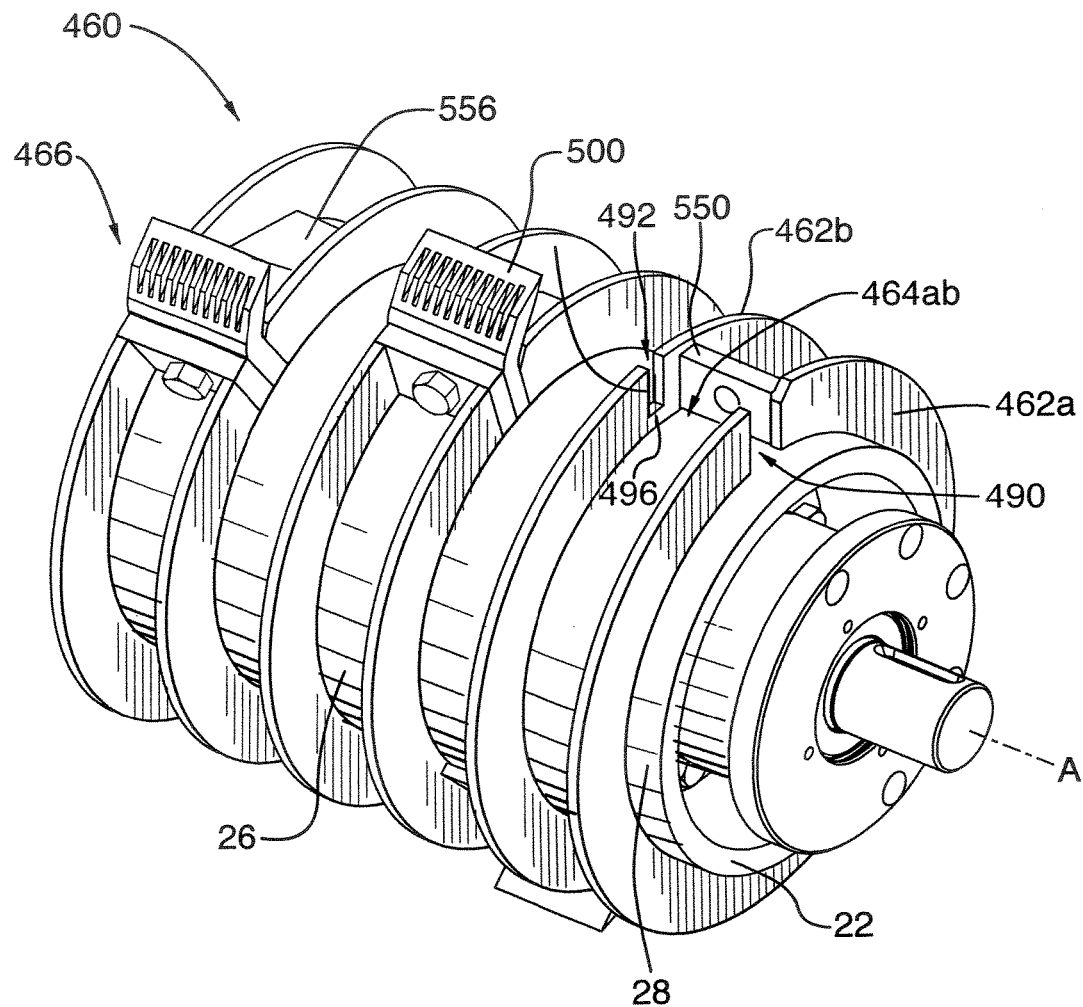
FIG. 30 is a perspective view of one end of another brush cutting head in accordance with the principles of the present invention, shown with a cutting tooth and a portion of its corresponding mounting assembly removed for the sake of clarity.
Figure 31:
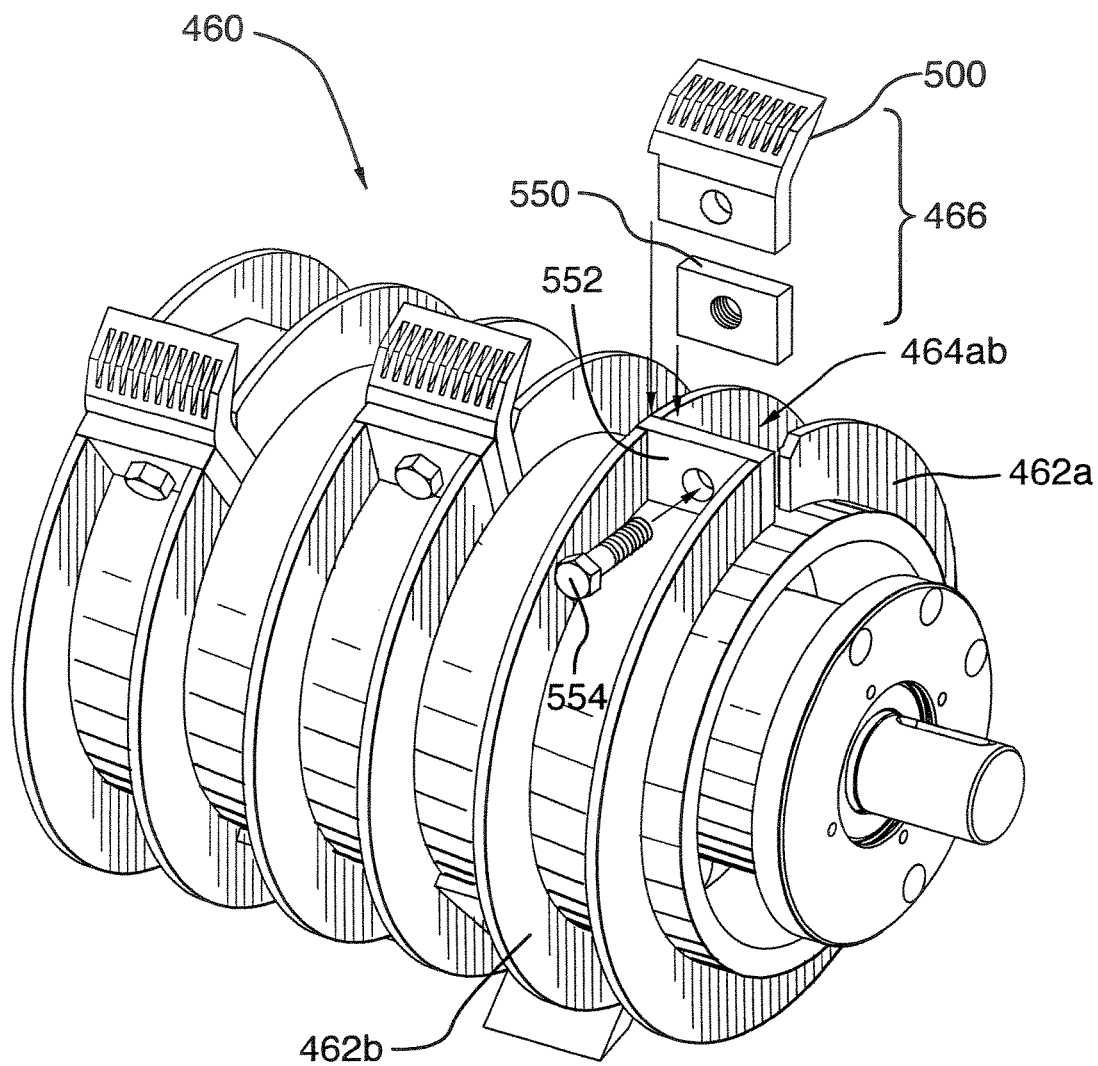
FIG. 31 is another perspective view similar to that illustrated in FIG. 30 showing the cutting tooth and the portion of its corresponding mounting assembly exploded.

In this embodiment, each station 464 is defined between the first cutout 490 formed in a given collar 462 and that portion of the sidewall 470 of the adjacent collar 462 that is disposed opposite the cutout 462. Referring to FIG. 30, the station 462ab (previously identified generically as "station 462") can be seen to be defined between the first cutout 490 in collar 462a and the portion of sidewall 470 of collar 462b located opposite the first cutout 490. Each of the other stations 464, identified in FIG. 30 is similarly defined between the first cutout 490 of one collar 462 and a portion of sidewall 470 of an adjacent collar 462. As best shown in FIGS. 30 and 31, each station 464 is circumferentially staggered from its adjacent station.

As in the brush cutting head 20, in this embodiment, the staggered arrangement of the collars 462 allows the plurality of cutting tooth assemblies 466 to be disposed along the support body 22 in a generally double helix pattern thereby permitting cutting across the entire length of the support body 22 when the brush cutting head 460 is rotated about axis 'A-A'. It will however be appreciated that the cutting tooth assemblies 466 could be disposed differently along the support body 22.

Turning now to FIGS. 31 and 33 to 36, the cutting tooth assembly 466 is now described in greater detail. The cutting tooth assembly 466 includes a cutting tooth 500 and a mounting assembly 502 for securely fixing the cutting tooth 500 within a respective station 464. The cutting tooth 500 is generally similar to cutting tooth 70 in that it has a base portion 504 having a first end 506 and a second end 508, and a cutting portion 510 mounted to the second end 508 of the base portion 504.

The base portion 504 has a generally planar, leading face 512, an opposing trailing face 514 and two, spaced apart, lateral faces 516 and 518. Defined in the base portion 504 is a bore 520 that extends between the leading face 512 and the trailing face 514. The bore 520 is adapted to receive a fastener therethrough to permit fastening of the cutting tooth 500 to the mounting assembly 502.

Figure 35:
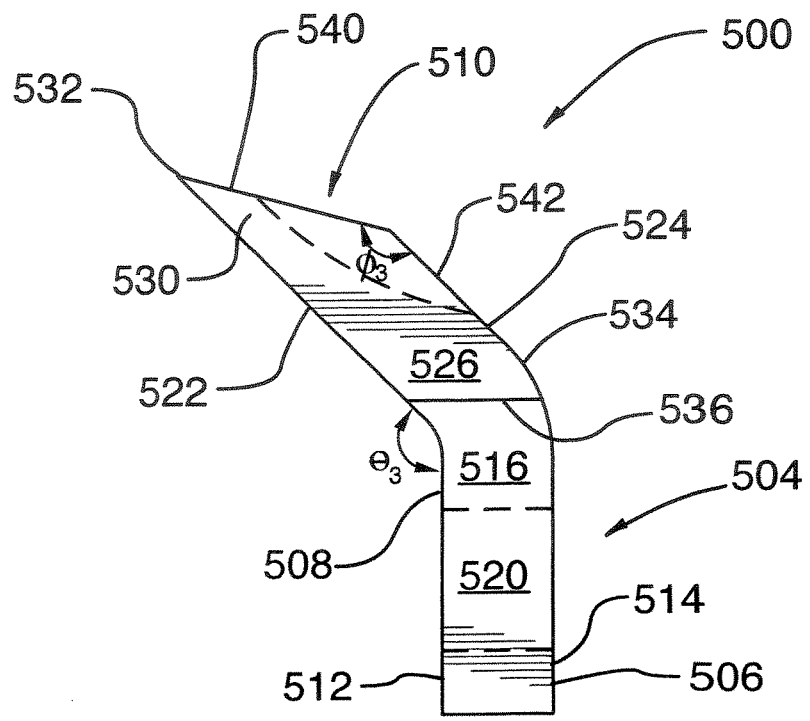
FIG. 35 is a side elevation view of the cutting tooth shown in FIG. 31.

As in the cutting tooth 70, the cutting portion 510 is carried on the second end 508 of the base portion 504 in a generally, forwardly leaning or canted fashion, and is integrally formed with the base portion 504. The cutting portion 510 resembles the cutting portion 80 in that it also has a leading face 522, an opposed trailing face 524 and two spaced-apart lateral faces 526 and 528. The leading face 522 of the cutting portion 510 joins the leading face 512 of the base portion 504 while the trailing face 524 connects to the trailing face 514 of the base portion 504. As best shown in FIG. 35, an external obtuse angle $\theta_3$ is formed between the leading face 512 and the leading face 522. In this embodiment, the angle $\theta_3$ is 135 degrees.

In like fashion to leading and trailing faces 100 and 102 in cutting tooth 70, the leading and trailing faces 522 and 524 cooperate with each other to define a tapering, wedge-like, profile 530 that terminates in a cutting edge 532. The cutting edge 532 is carried forwardly of the leading face 512 of the base portion 504 such that it tends to be the first element of cutting tooth 500 to make contact with the brush. The cutting edge 532 extends generally linearly between the lateral faces 526 and 528 and substantially paraUel to the rotational axis A-A of the brush cutting head 470.

However, the cutting portion 510 differs from the cutting portion 80 in that it is relatively wider than the base portion 504. That is, the width $W_1$ of the cutting portion 510 (as measured between its lateral faces 526 and 528) is greater than the width $W_2$ of the base portion 504 (as measured between its lateral faces 516 and 518). As a result, in the transition section 534 where the cutting portion 510 meets the base portion 504, the lateral face 526 projects beyond the lateral face 516 thereby defining an abutment member or shoulder 536. When the cutting tooth 500 is mounted within the station 474, the abutment shoulder 536 abuts the outer edge 472 of the collar sidewall 470 and the lateral face 526 lies flush with the face 482 of the collar sidewall 470.

Returning to FIG. 35, the trailing face 524 of the cutting portion 510 has an upper portion 540 and a lower portion 542 joined to the upper portion 540. The upper portion 540 extends between the cutting edge 532 and the lower portion 542, whereas the lower portion 542 joins the base portion 504 at the transition section 534. The upper portion 540 is bent relative to the lower portion 542 such that an internal obtuse angle $\Phi_3$ is defined therebetween. In the present embodiment, the angle $\Phi_3$ measures 150 degrees. The trailing face 522 is configured with corrugations 544 that are similar to the corrugations 124 formed on cutting tooth 70 such that no further description is required.

Referring to FIGS. 30, 31 and 35, the mounting assembly 502 is generally similar to mounting assembly 72 in that it includes a first plate 550 disposed forwardly of the cutting tooth 500, a second plate 552 disposed rearwardly of the cutting tooth 500 and a fastener in the nature of a bolt 554. However, in this embodiment the second plate 552 is welded to the support body 22 and to the collars 462. As explained below, when mounted within the station 464, the cutting tooth 500 is fixedly retained between the first and second plates 550 and 552 by bolt 554. Also provided, is a deflector member 556. The first plate 550 and the deflector member 556 are similar in both construction and configuration to their counterpart components 130 and 138. However, in this embodiment the first plate 550 is not permanently attached to the support member 22, adjacent collars 462 or deflector member 556. The deflector member 556 is mounted to the support body 22 and to the adjacent collars 462 in much the same manner as described above in the context of deflector member 138, except that the deflector member 556 is not welded to the first plate 550.

Figure 36:
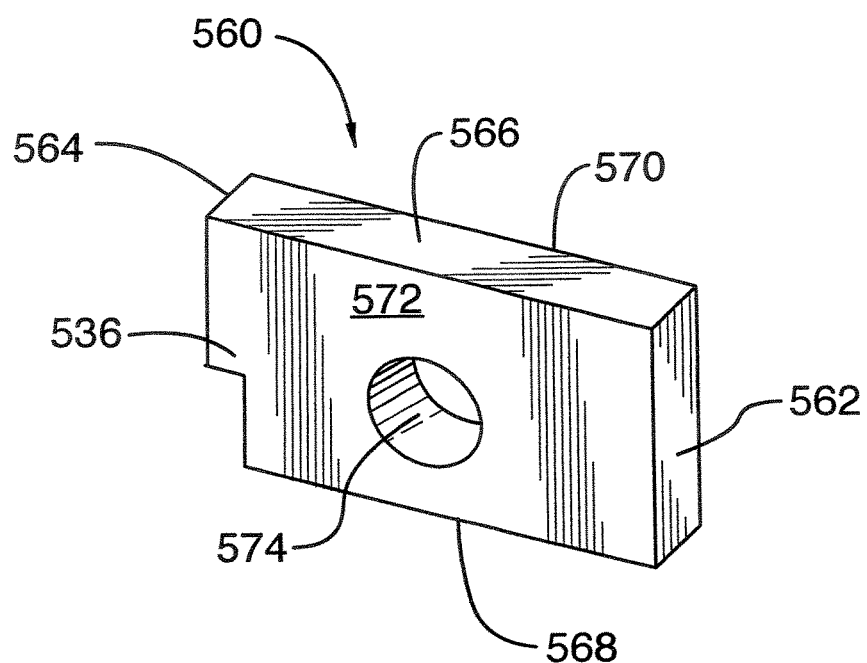
FIG. 36 is a perspective view of the second plate shown in FIG. 31.

Referring to FIG. 36, the second plate 552 is generally rectangular and is defined by a pair of opposed, relatively short, sides 562 and 564 and a pair of opposed, relatively long sides 566 and 568 that extend between the short sides 562 and 564. A notch 570 is cut out of the corner formed by the short side 564 and the long side 568. The notch 570 defines an abutment flange 572 that rests on the narrow strip 496 of the collar 462 when cutting tooth 500 is mounted within the station 464. The second plate 552 further includes a leading face 574 for abutting the cutting tooth base portion 504, an opposed trailing face 576 and an aperture 578 defined therein. The aperture 578 extends between the leading and trailing faces 574 and 576 and is adapted to receive the bolt 554 therethrough.

During fabrication of the brush cutting head 460, the second plate 552 is positioned within the second cutout 492 with the abutment flange 572 abutting the narrow strip 496 and the top portion of the short side 564 lying flush with the face 482 of the collar 462. The second plate 552 is welded in place within the second cutout 492 and along the point of contact between the trailing face 570 and the sidewall end 478. Additionally, the second plate 552 is welded onto the curved surface 28 along its long side 568. When fixed in this position, the short side 562 of the second plate 552 projects through the first cutout 490 to lie flush with the face 480 of collar 462.

Referring now to FIG. 31, the attachment of the cutting tooth 500 to the brush cutting head 460 is now described in greater detail in the context of station 464ab. The first plate 550 is placed on the curved surface 28 in an upright position with its leading face abutting the deflector member 556 and its short sides abutting the sidewalls of collars 462a and 462b. The cutting tooth base portion 504 is then placed between the first plate 550 and the second plate 552 such that its trailing face 512 abuts the leading face 574 of the second plate 552. The lateral face 516 of the base portion 504 is urged to abut the sidewall of collar 462b with the abutment shoulder 536 resting on the outer edge 472 of sidewall 470. In this position, the opposed lateral face 518 extends through the first cutout 490 beyond face 482 to lie flush with face 480 of collar 462a. Thereafter, the bolt 554 is inserted into the aligned apertures of the first plate 550, the cutting tooth 500 and the second plate 552 and tightly fastened.

In like fashion to station 32ab in brush cutting head 20, the station 464ab is configured to receive the cutting tooth 500 and the second plate 552.

It should be appreciated that, with appropriate modifications, cutting tooth 500 could be used in other brush cutting heads fabricated in accordance with the principles of the present invention.

As previously described, the brush cutting head 460 does not employ rebates. Instead, its collars 462 are provided with two cutouts—one full cutout 490 and a partial cutout 492. The full cutout 490 receives therein a portion of the cutting tooth 500 and one end of the second plate 552 whereas the partial cutout 492 accommodates the opposite end of the second plate 552. In another embodiment, the protective collars may be modified further still by doing away with a partial cutout such as cutout 492 in favour of apertures defined in the collar sidewall. Moreover, in such an embodiment, the full cutout may be sized to receive therein the cutting tooth only.

With reference to FIGS. 37 to 44, there is shown an alternative brush cutting head designated generally with reference numeral 600. Brush cutting head 600 is generally similar to brush cutting head 20 in that it employs the same support body 22. However, as is described in greater detail below, in this embodiment, different collars and cutting tooth assemblies are used. The brush cutting head 600 has a plurality of protective collars 602 concentrically mounted to the support body 22 at spaced intervals along the intermediate portion 26 of the support body 22. Adjacent collars 602 cooperate with each other to define mounting sites or stations 604 for each receiving a cutting tooth assembly 606 therein.

Figure 41:
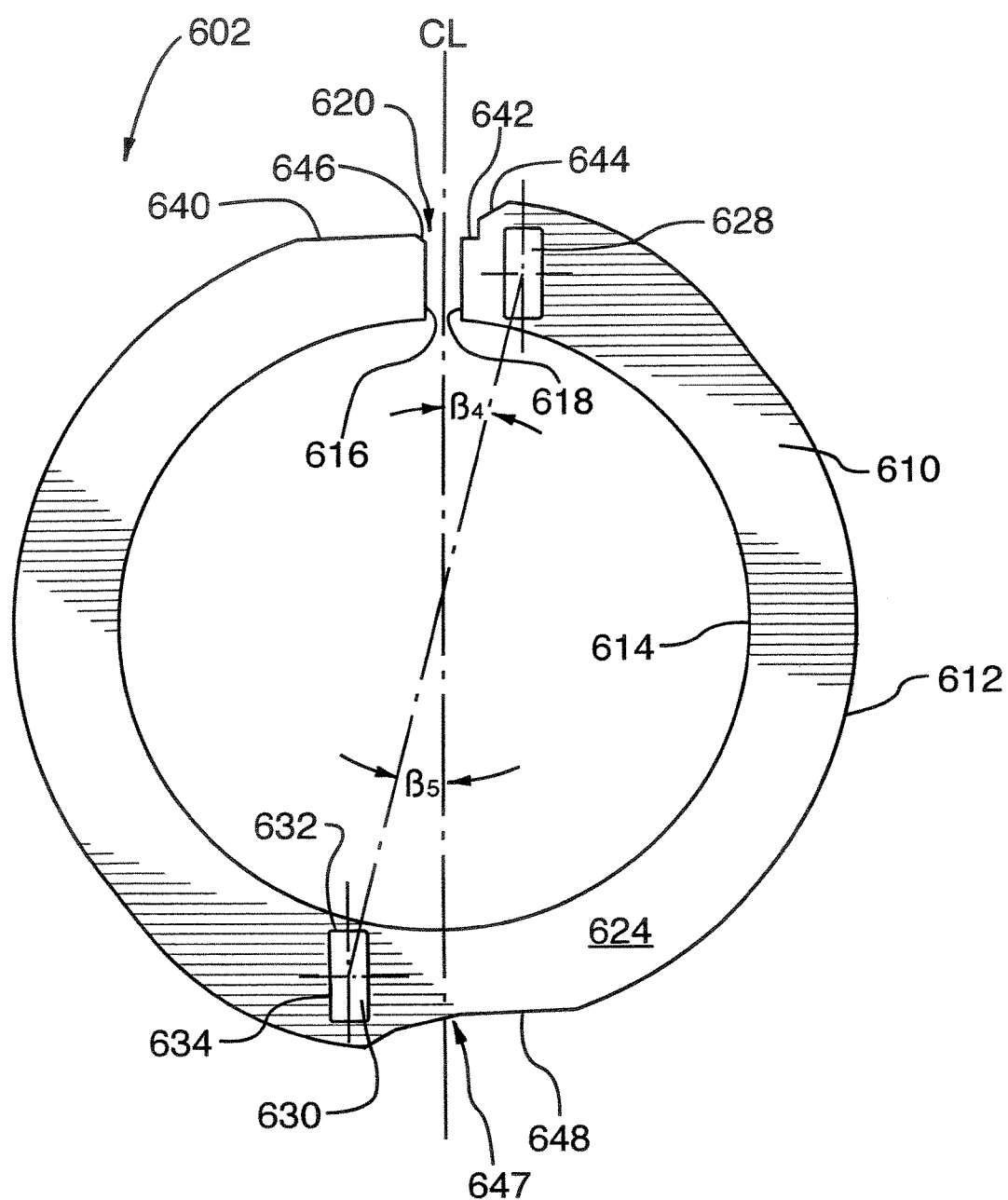
FIG. 41 is a side elevation view of one of the collars shown in FIG. 40.

Referring to FIG. 41, each collar 602 is generally similar to collar 30 in that it has a substantially penannular structure defined by a relatively flat, circumferentially extending, sidewall 610. The sidewall 610 is bounded circumferentially by an outer edge 612 and inner edge 614, and has first and second spaced apart ends 616 and 618. The space between the ends 616 and 618 defines a cutout 620 formed in the collar 602. The cutout 620 is disposed slightly off centre of the centreline CL of the collar 602.

The sidewall 610 further includes two opposed faces 624 and 626 and a pair of first and second, circumferentially spaced, apertures 628 and 630 defined in the sidewall 610 and extending between the faces 624 and 626. The apertures 628 and 630 are generally rectangular with their shape being defined by a pair of relatively short, opposed edges 632 and a pair of relatively long, opposed edges 634. The apertures 628 and 630 are disposed about the sidewall 610 with their long edges 634 axially offset from the centerline CL of the collar 602. More specifically, the apertures 628 and 630 are disposed on opposite sides of the centreline CL and extend substantially parallel to each other. As shown in FIG. 41, the first aperture 628 is circumferentially spaced from the centreline CL by an angle P4 (as measured from the centerline CL to the geometric centre of the rectangular aperture 628). The second aperture 630 is circumferentially displaced from the centreline CL by an angle Ps (as measured from the centerline CL to the geometric centre of the rectangular aperture 630). In this embodiment, both angles $\beta_4$ and $\beta_5$ measure about 13 degrees such that the second aperture 630 is circumferentially staggered from the first aperture by about 180 degrees. It should however be appreciated that the angles $\beta_4$ and $\beta_5$ may be varied to suit the particular application.

On opposite sides of the centreline CL of the collar 602 and adjacent the sidewall ends 616 and 618, the outer edge 612 has been trimmed back (by laser cutting) at a first location 636 to define a first, substantially planar edge 640. Thus trimmed, the outer edge 612 also defines a relatively small shoulder 642 a short distance away from the second sidewall end 618. Adjacent the shoulder 642, a first notch 644 is formed in the sidewall 610. There is also defined a second notch 646 at the first sidewall end 616. The second notch 646 provides clearance for the forward leaning portion of the cutting tooth assembly 606. In the vicinity of second aperture 630 at a second location 647, the outer edge 612 has also been ground to modify its originally arcuate profile to one that includes a second, truncated edge 648.

In like fashion to collars 30, the collars 602 are radially mounted to the support body 22 with the inner edge 614 of the sidewall 610 welded to the curved surface 28. The spacing between adjacent collars 602 is sized to correspond generally to the width of the cutting tooth assembly 606.

Figure 40:
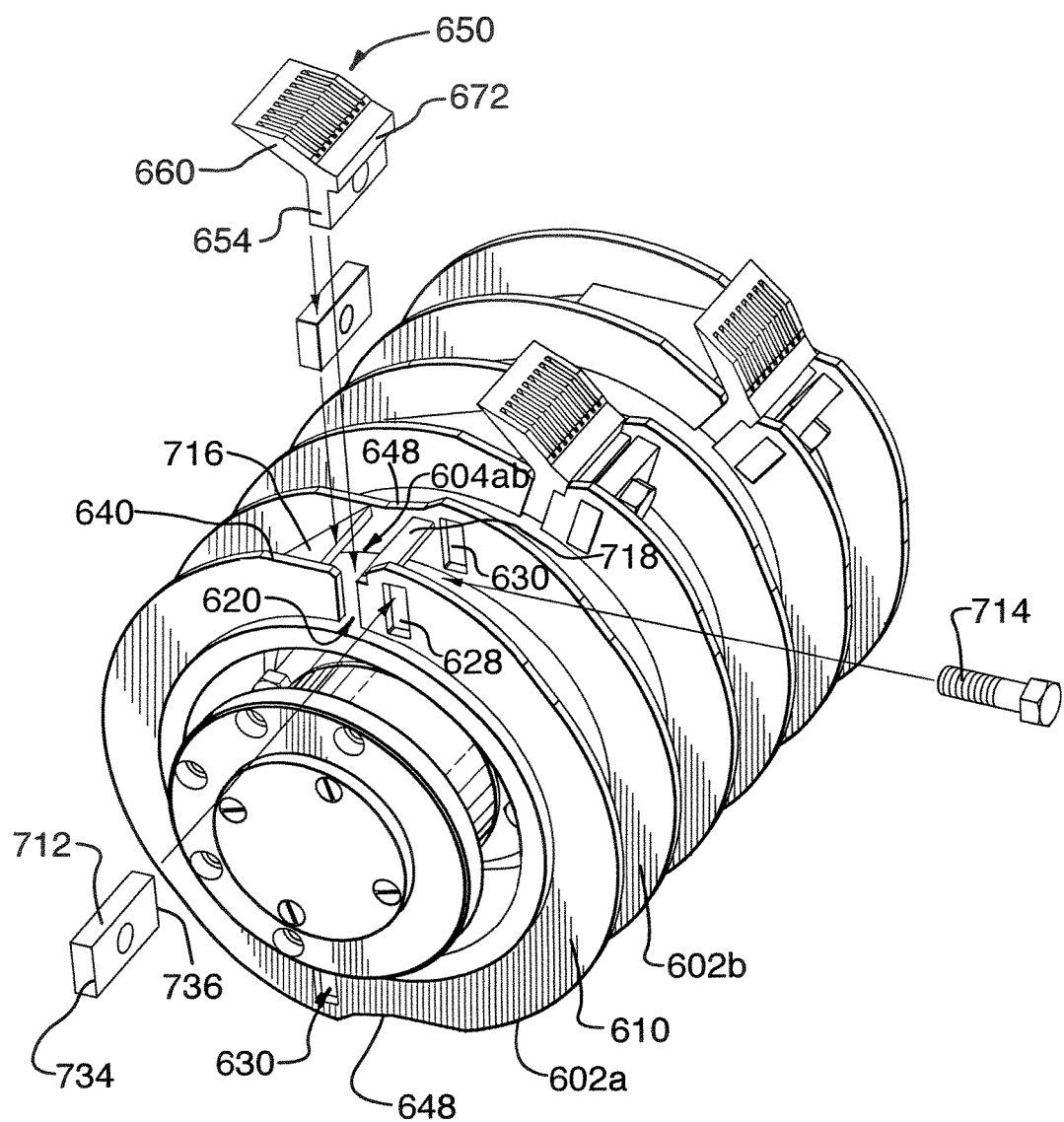
FIG. 40 is an enlarged perspective view of one end of the brush cutting head illustrated in FIG. 37 showing a cutting tooth and a portion of its corresponding mounting assembly exploded.

Each collar 602 is radially offset from its adjacent collar 602 such that the cutouts 620 of adjacent collars are staggered relative to each other. The first and second apertures 628 and 630 of adjacent collars 602 are also staggered relative to each other to allow alignment of the first aperture 628 of a given collar 602 with the second aperture 630 of another, adjacent collar 602. With reference to FIG. 40, it can be seen that the first aperture 628 of collar 602*a* is aligned with the second aperture 630 of collar 602*b*. The alignment of these apertures in adjacent collars 602 permits a portion of the cutting tooth assembly 606 to be mounted longitudinally therebetween in an orientation that is substantially parallel to the axis of rotation A-A.

Figure 37:
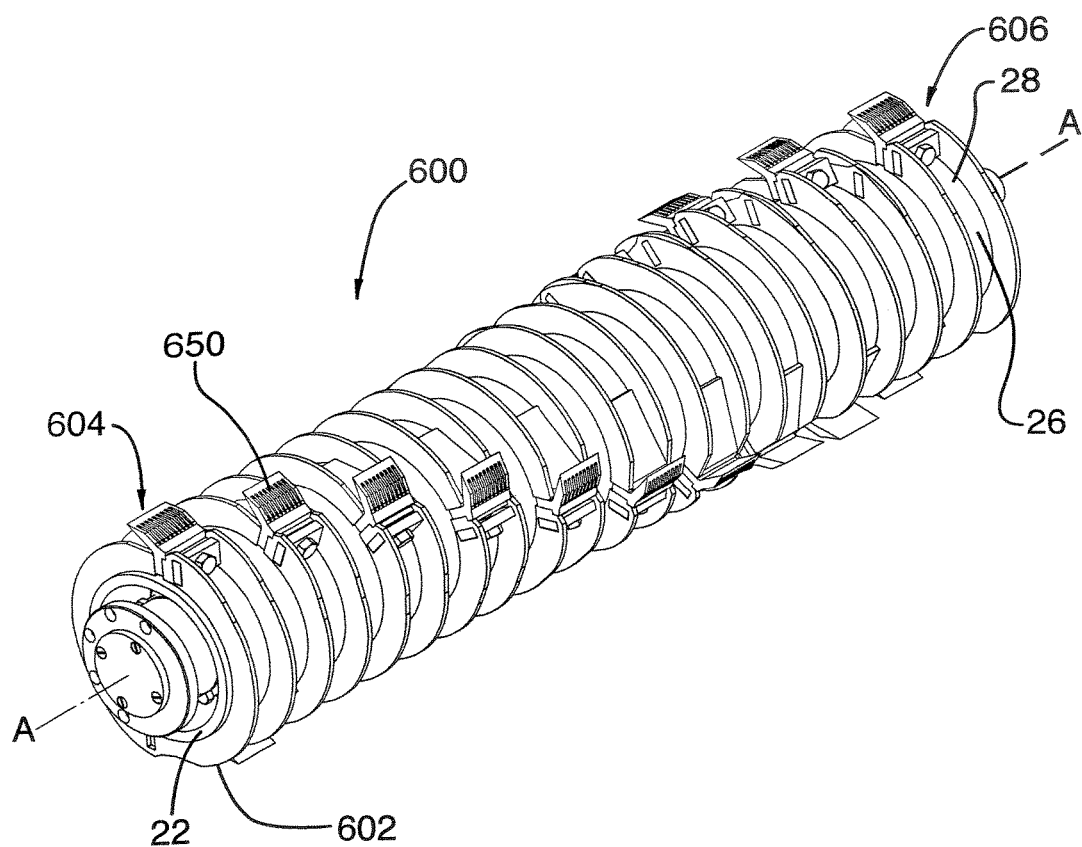
FIG. 37 is a perspective view of a yet another brush cutter head according to an alternative embodiment of the present invention.
Figure 38:
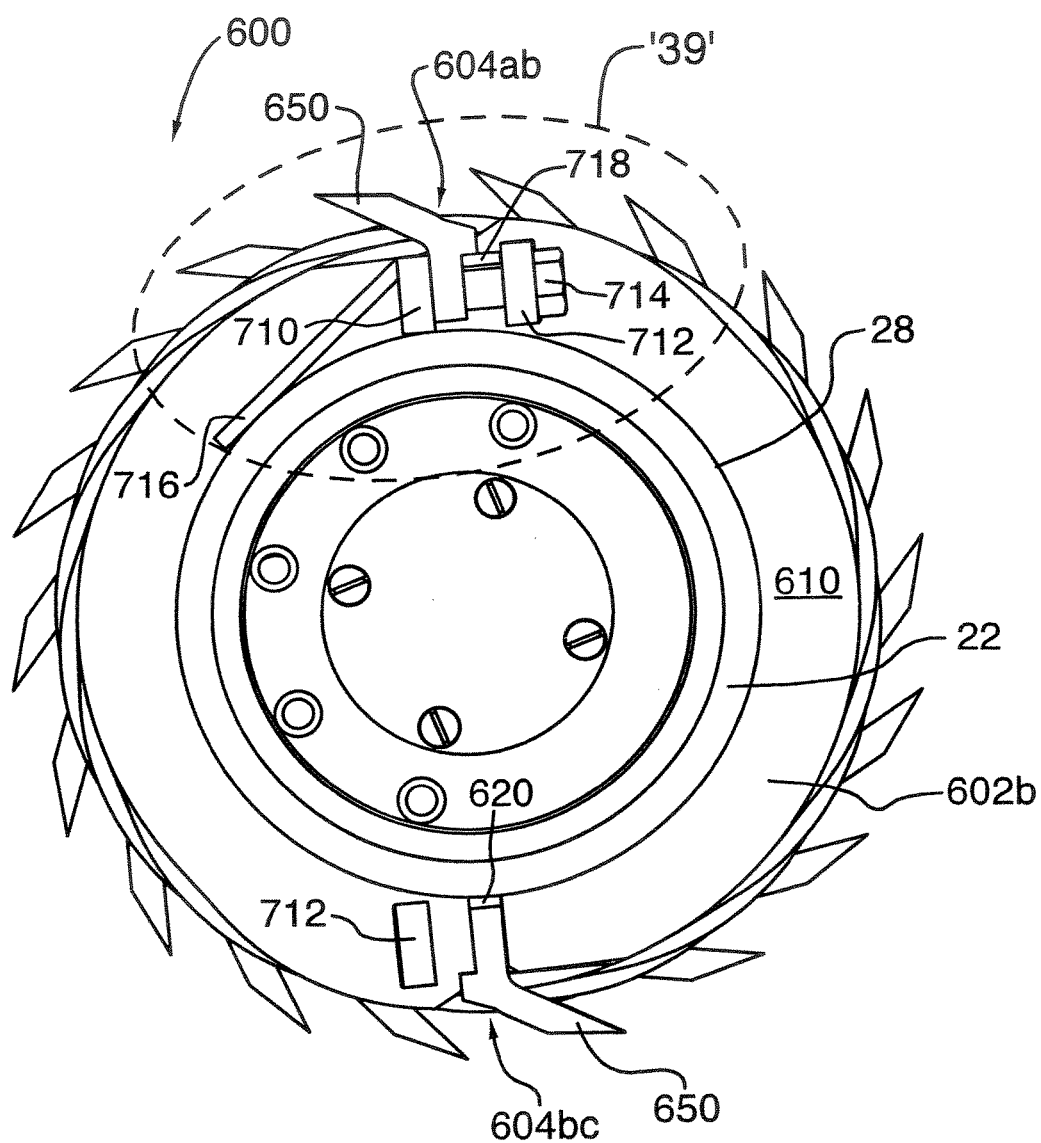
FIG. 38 is an end view of the brush cutting head shown in FIG. 37 with a collar removed therefrom for the sake of clarity.
Figure 39:
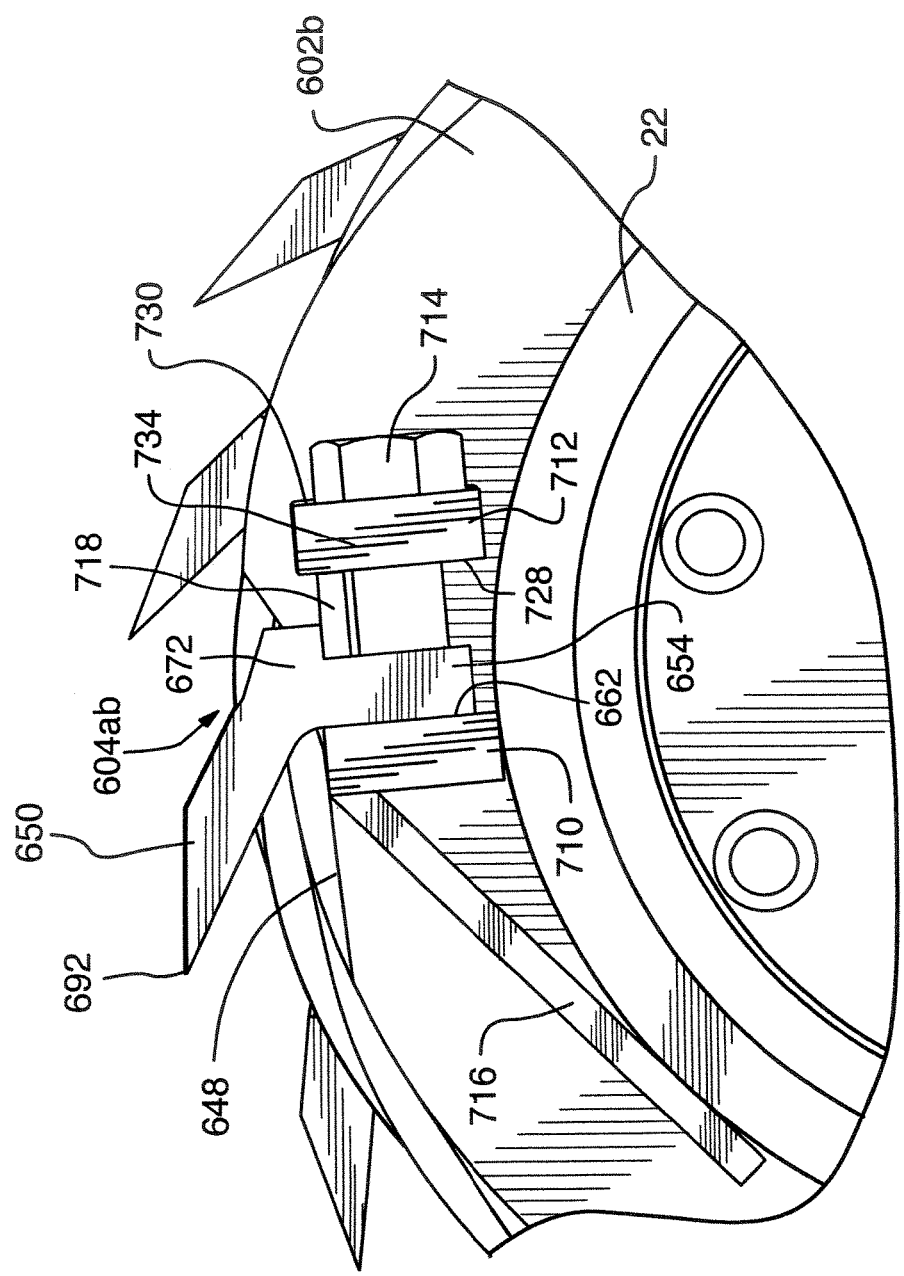
FIG. 39 is an enlarged view similar to that illustrated in FIG. 38 showing the encircled portion '39'.

In this embodiment, each station 604 is defined between the cutout 620 formed in a given collar 602 and that portion of the sidewall 610 of the adjacent collar 602 that is disposed opposite the cutout 620. Referring to FIG. 40, the station 604*ab* (previously identified generically as "station 604") can be seen to be defined between the cutout 620 in collar 602*a* and the portion of sidewall 610 of collar 602*b* located opposite the first cutout 620. Each of the other stations 604, identified in FIG. 37 is similarly defined between the cutout 620 of one collar 602 and a portion of sidewall 610 of an adjacent collar 602. As best shown in FIGS. 37 and 40, each station 604 is circumferentially staggered from its adjacent station.

As in the brush cutting head 20, in this embodiment, the staggered arrangement of the collars 602 allows the plurality of cutting tooth assemblies 606 to be disposed along the support body 22 in a generally double helix pattern thereby permitting cutting across the entire length of the support body 22 when the brush cutting head 600 is rotated about axis 'A-A'. It will however be appreciated that the cutting tooth assemblies 606 could be disposed differently along the support body 22.

Turning now to FIGS. 38, 39, 42 and 43, the cutting tooth assembly 606 is now described in greater detail. The cutting tooth assembly 606 includes a cutting tooth 650 and a mounting assembly 652 for securely fixing the cutting tooth 650 within a respective station 604. The cutting tooth 650 is generally similar to cutting tooth 70 in that it has a base portion 654 having a first end 656 and a second end 658, and a cutting portion 660 mounted to the second end 658 of the base portion 654. However, whereas in cutting tooth 70, the cutting portion 80 and the base portion 74 are of a substantially similar size, in this embodiment, the cutting portion 660 is relatively larger than the base portion 654.

The base portion 654 has a generally planar, leading face 662, an opposing trailing face 664 and two, spaced apart, lateral faces 666 and 668. Defined in the base portion 654 is a bore 670 that extends between the leading face 662 and the trailing face 664. The bore 670 is adapted to receive a fastener therethrough to permit fastening of the cutting tooth 650 to the mounting assembly 652. The base portion 654 however differs from base portion 74 in two respects. First, the base portion 654 is relatively shorter than the base portion 74. Second, adjacent its second end 658, the base portion 654 has an abutment flange or shoulder 672 which projects from the trailing face 664. While generally similar to abutment flange 352 of cutting tooth 330, the abutment flange 672 is relatively larger and more prominent in cutting tooth 650. These differences notwithstanding the abutment flange 672 serves a similar purpose to that of abutment flange 352—it reinforces the cutting tooth 650 and enables it to better resist the high impact forces to which it may be subjected during operation of the brush cutting head 650. As a result, the cutting tooth 650 tends to be less vulnerable to cracking failures along the area where the cutting portion 660 meets the base portion 654. As will be explained in greater detail below, when the cutting tooth 650 is mounted within the station 604, the abutment flange 672 will rest on a portion of the mounting assembly 652.

As in the cutting tooth 70, the cutting portion 660 is carried on the second end 658 of the base portion 654 in a generally, forwardly leaning or canted fashion, and is integrally formed with the base portion 654. However, in like fashion to cutting tooth 330, the cutting tooth 650 is fabricated by forging and machining.

But for its relatively larger size, the cutting portion 660 resembles the cutting portion 80 in that it also has a leading face 680, an opposed trailing face 682 and two spaced-apart lateral faces 684 and 686. The leading face 680 of the cutting portion 660 joins the leading face 662 of the base portion 654 while the trailing face 682 connects to the abutment flange 672 of the base portion 654. As best shown in FIG. 43, an external obtuse angle $\theta_4$ is formed between the leading face 680 and the leading face 682. In this embodiment, the angle $\theta_4$ is 120 degrees.

In like fashion to leading and trailing faces 100 and 102 in cutting tooth 70, the leading and trailing faces 680 and 682 cooperate with each other to define a tapering, wedge-like, profile 690 that terminates in a cutting edge 692. The cutting edge 692 is carried forwardly of the leading face 662 of the base portion 654 such that it tends to be the first element of cutting tooth 650 to make contact with the brush. The cutting edge 692 extends generally linearly between the lateral faces 684 and 686 and substantially parallel to the rotational axis A-A of the brush cutting head 600. When the cutting tooth 650 is mounted within the station 604, the cutting edge 692 extends beyond the first and second edges 640 and 648 of the sidewall 610 (of adjacent collars 602) to facilitate the cutting action of the tooth. The reduced profile of the sidewall 610 at the edges 640 and 648 tends to facilitate evacuation of the cutting debris away from the station 604 and the cutting tooth 650.

Returning to FIG. 43, the trailing face 682 of the cutting portion 660 has an upper portion 694, a lower portion 696 and an intermediate portion 698 connecting the upper portion 694 to the lower portion 696. The upper portion 694 extends between the cutting edge 692 and the upper margin of the intermediate portion 698, whereas the lower portion 376 extends from the lower margin of the intermediate portion 698 and terminates at the abutment flange 672—the lower portion 696 partially defining the abutment flange 672. The upper portion 694 is bent relative to the intermediate portion 698 such that an internal obtuse angle $\Phi_4$ is defined therebetween. In the present embodiment, the angle $\Phi_4$ measures about 155 degrees. Corrugations 700 not unlike corrugations 124 of cutting tooth 70 are formed in the upper and intermediate portions 694 and 698 of the cutting portion trailing face 682.

Referring to FIGS. 38, 39, 40 and 44, the mounting assembly 652 is generally similar to mounting assembly 72 in that it includes a first, generally rectangular, plate 710 disposed forwardly of the cutting tooth 650, a second plate 712 disposed rearwardly of the cutting tooth 650, a fastener in the nature of a bolt 714 and a deflector member 716. The first plate 710 and the deflector member 716 are similar in both construction and configuration to their counterpart components 130 and 138. However, in this embodiment, the first plate 710 is not permanently attached to any of the support member 22, the adjacent collars 602 or the deflector member 716. The deflector member 716 is mounted to the support body 22 and to the adjacent collars 602 in much the same manner as described above in the context of deflector member 138, except that deflector member 716 is not welded to the first plate 710.

The mounting assembly 652 differs from the mounting assembly 72 in that it further includes an additional component, namely, a support plate 718 for placement between adjacent collars 602. During fabrication of the brush cutting head 600, the support plate 718 is mounted between adjacent collars 602 with its ends welded to the collar sidewalls 610. The support plate 718 provides a surface upon which the abutment flange 672 of the cutting tooth 650. As will be explained in greater detail below, when mounted within the station 604, the cutting tooth 650 is supported by plate 718 and fixedly retained between the first plate 710 and the second plate 712 by bolt 714.

Referring to FIG. 44, the second plate 712 is generally rectangular and is defined by a pair of opposed, relatively short, sides 720 and 722 and a pair of opposed, relatively long sides 724 and 726 that extend between the short sides 720 and 722. Moreover, the second plate 712 has a leading face 728, an opposed trailing face 730 and an aperture 732 defined therein between the leading and trailing faces 728 and 730. The aperture 732 is adapted to receive the bolt 714 therethrough. The second plate 712 further includes a first longitudinal end 734 located adjacent short side 720 and a second longitudinal end 736 located adjacent short side 722.

Referring now to FIG. 40, the attachment of the cutting tooth 650 to the brush cutting head 600 is now described in greater detail in the context of station 604ab. The first plate 710 is placed on the curved surface 28 in an upright position with its leading face abutting the deflector member 716 and its short sides abutting the sidewalls of collars 602a and 602b. The second plate 712 is then mounted between adjacent collars 602. The first longitudinal end 734 of the second plate 712 is inserted into the aperture 628 formed in collar 602a while the second longitudinal end 736 thereof is received within the aperture 630 defined in the adjacent collar 602b. Subsequently, the cutting tooth base portion 654 is placed between the first plate 710 and the second plate 712 with its leading face 662. abutting the trailing face of the first plate 710. In this position, the abutment shoulder 672 of the base portion 654 abuts the top face of the support plate 718. Thereafter, the bolt 714 is inserted into the aligned apertures of the first plate 710, the cutting tooth 650 and the second plate 712 and tightly fastened.

In contrast to previous embodiments, wherein the stations held the cutting tooth and one or more plates, in this embodiment, the station 604ab receives only the cutting tooth 650.

While cutting tooth 650 has been described in connection with brush cutting head 600, it will be appreciated that with appropriate modifications, this type of cutting tooth could be also be successfully employed in other brush cutting heads fabricated in accordance with the principles of the present invention.

Further modifications may be brought to the protective collars and the cutting tooth assemblies. For instance, in a further alternative embodiment, the protective collars could be configured with a single full cutout but without apertures defined in the collar sidewall. FIGS. 45 to 55 show such an embodiment wherein a brush cutting head is designated generally with reference numeral 750. Brush cutting head 750 is generally similar to brush cutting head 20 in that it employs the same support body 22. However, as is described in greater detail below, in this embodiment, different collars and cutting tooth assemblies are used. The brush cutting head 750 has a plurality of protective collars 752 concentrically mounted to the support body 22 at spaced intervals along the intermediate portion 26 of the support body 22. Adjacent collars 752 cooperate with each other to define mounting sites or stations 754 for each receiving a cutting tooth assembly 756 therein.

Figure 50:
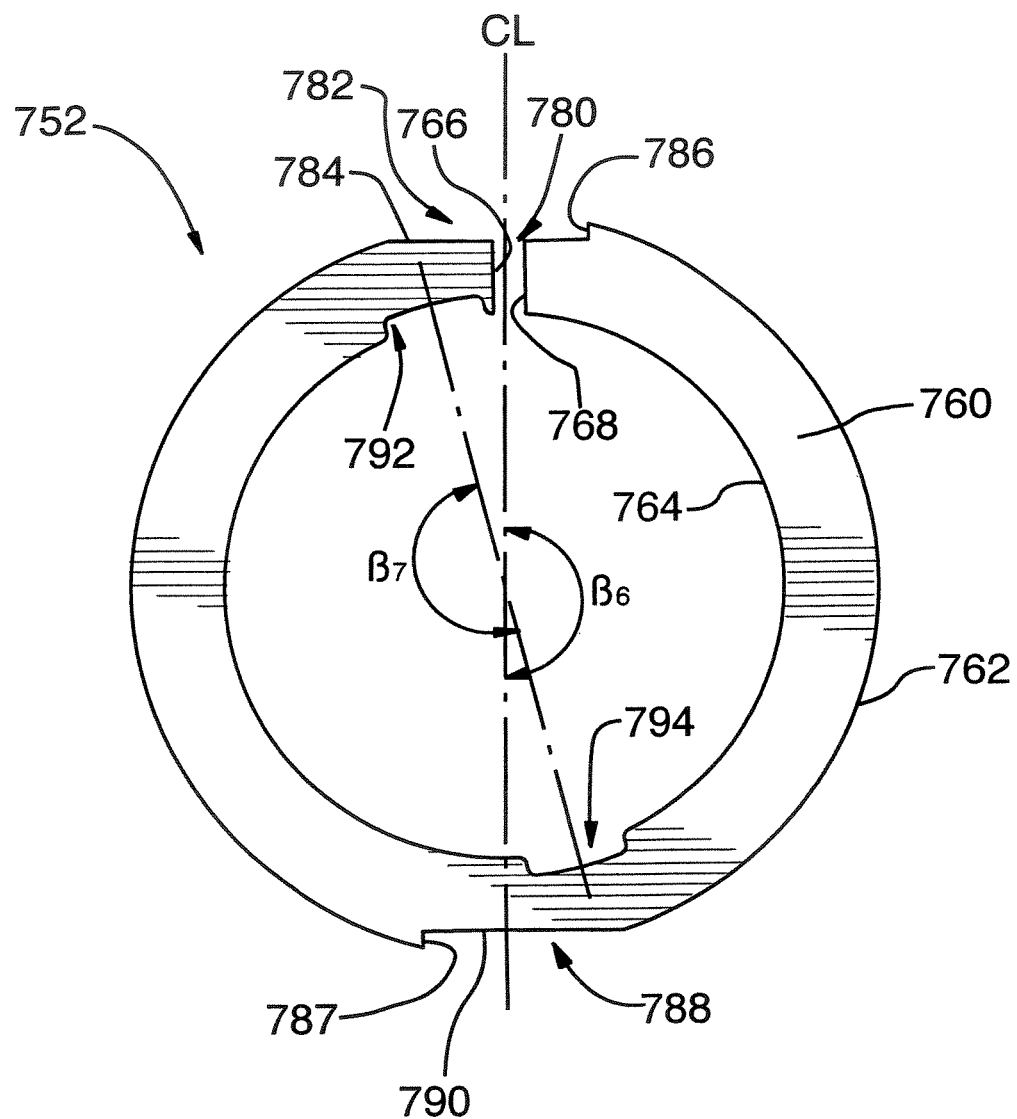
FIG. 50 is a side elevation view of one of the collars shown in FIG. 49.
Figure 51:
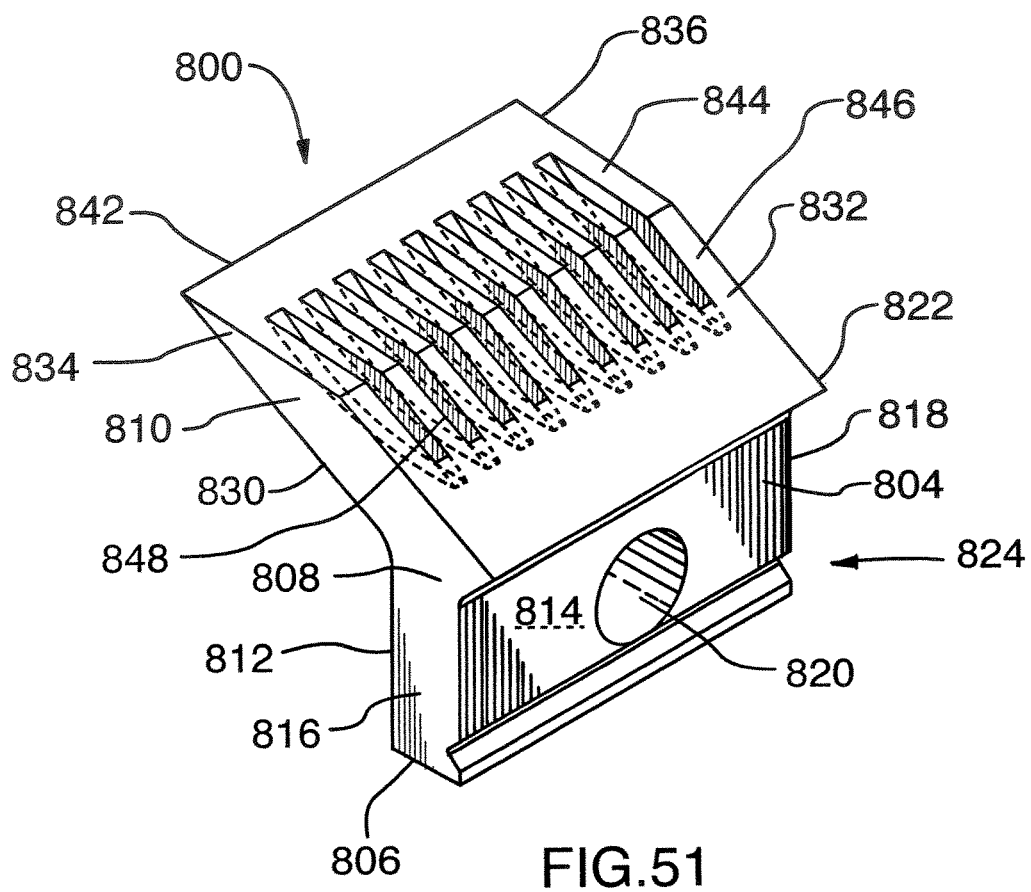
FIG. 51 is a perspective view of one of the cutting teeth shown in FIG. 49.

Referring to FIG. 50, each collar 752 is generally similar to collar 30 in that it has a substantially penannular structure defined by a relatively flat, circumferentially extending, sidewall 760. The sidewall 760 is bounded circumferentially by an outer edge 762 and inner edge 764, and has first and second spaced apart ends 766 and 768. The space between the ends 766 and 768 defines a cutout 780 formed in the collar 752. The cutout 780 is disposed slightly off centre of the centreline CL of the collar 752.

On opposite sides of the centreline CL of the collar 752 and adjacent the sidewall ends 766 and 768, the outer edge 762 has been trimmed back (by laser cutting) at a first location 782 to define a first substantially planar edge 784. A short distance away from the second sidewall end 768, the edge 784 terminates at a relatively small shoulder 786 defined in the outer edge 762. The outer edge 762 has also been trimmed at a second location 788 opposite the first location 782, to define a second substantially planar edge 790. The edge 790 also terminates at a shoulder 787 of a size similar to that of shoulder 786. The second location 788 is circumferentially spaced from the first location 782 by an angle 136 (as measured from the midpoint of the first edge 784 to the midpoint of the second edge 790). In this embodiment, the angle $\beta_6$ measures about 180 degrees.

Adjacent each of the first and second locations 782 and 788, the inner edge 764 of the sidewall 760 has a generally channel-shaped rebate 792, 794 (as the case may be) defined therein. The rebates 792 and 794 provide access to the space between adjacent collars 754 thereby facilitating the welding of a portion of the cutting tooth assembly 606 to the collar sidewalls 760. The first rebate 792 is circumferentially spaced from the second rebate 794 by an angle $\beta_7$ (as measured from the midpoint of the first rebate 792 to the midpoint of the second rebate 794). In this embodiment, the angle $\beta_7$ measures about 180 degrees. In alternative embodiments, the angles $\beta_6$ and $\beta_7$ could, be varied to suit the particular application.

In like fashion to collars 30, the collars 752 are radially mounted to the support body 22 with their inner sidewall edges 764 welded to the curved surface 28. The spacing between adjacent collars 752 is sized to correspond generally to the width of the cutting tooth assembly 756.

Figure 45:
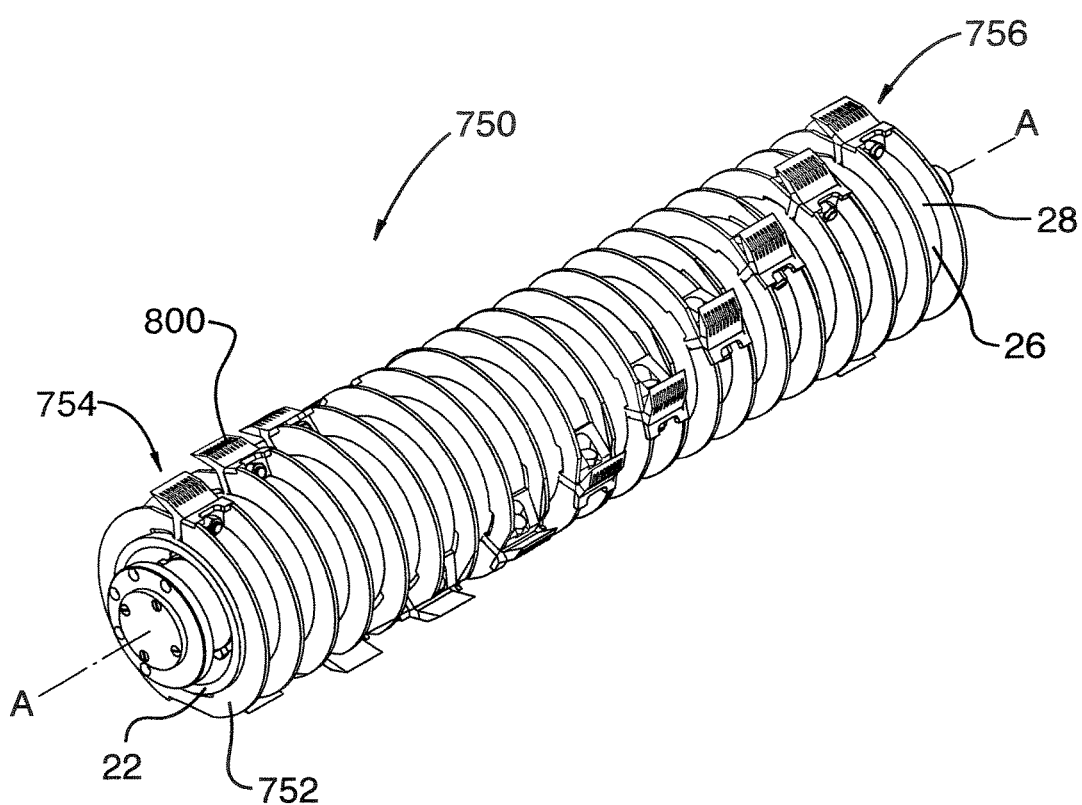
FIG. 45 is a perspective view of another brush cutter head according to a further alternative embodiment of the present invention.
Figure 46:
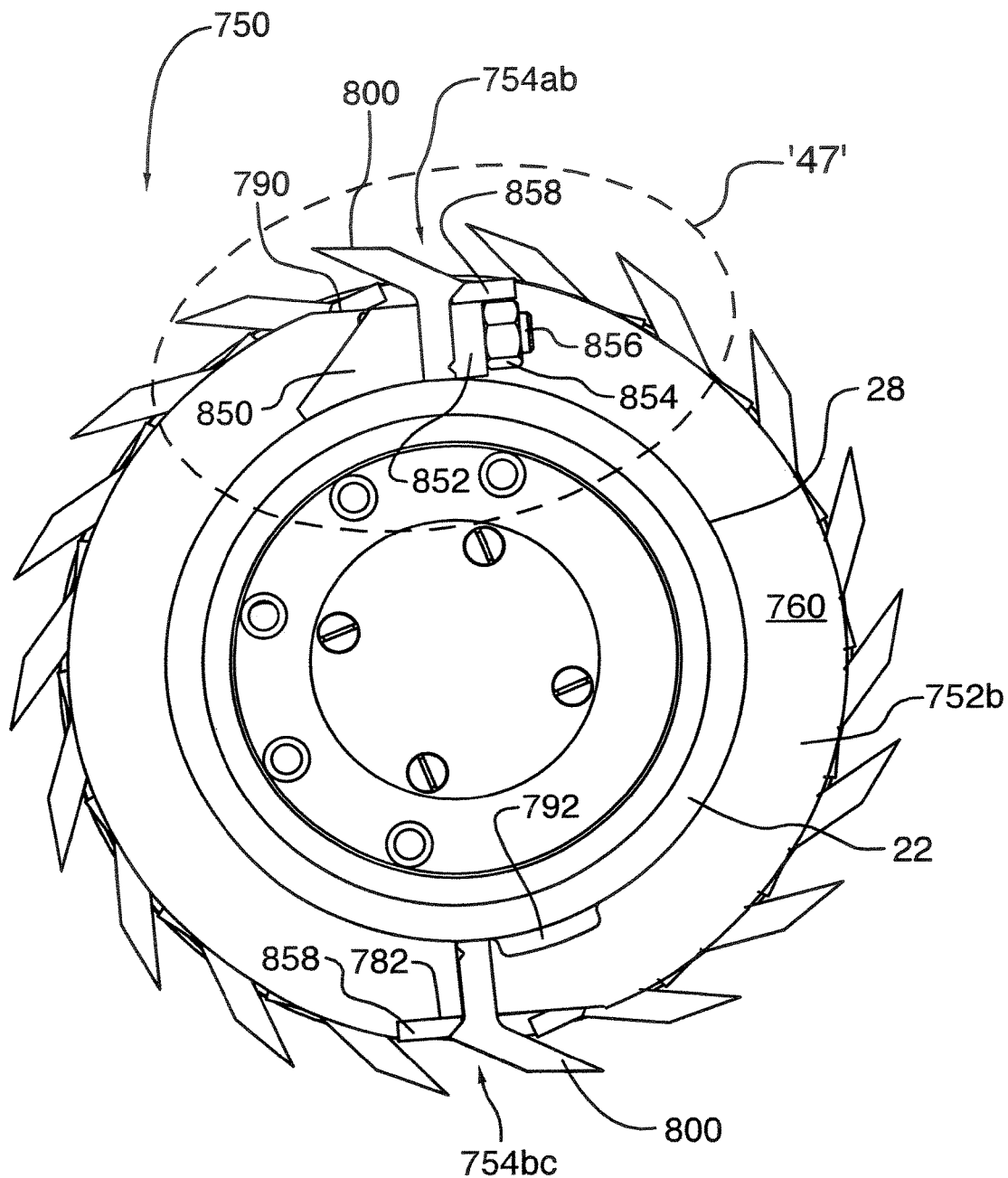
FIG. 46 is an end view of the brush cutting head shown in FIG. 45 with a collar removed therefrom for the sake of clarity.
Figure 47:
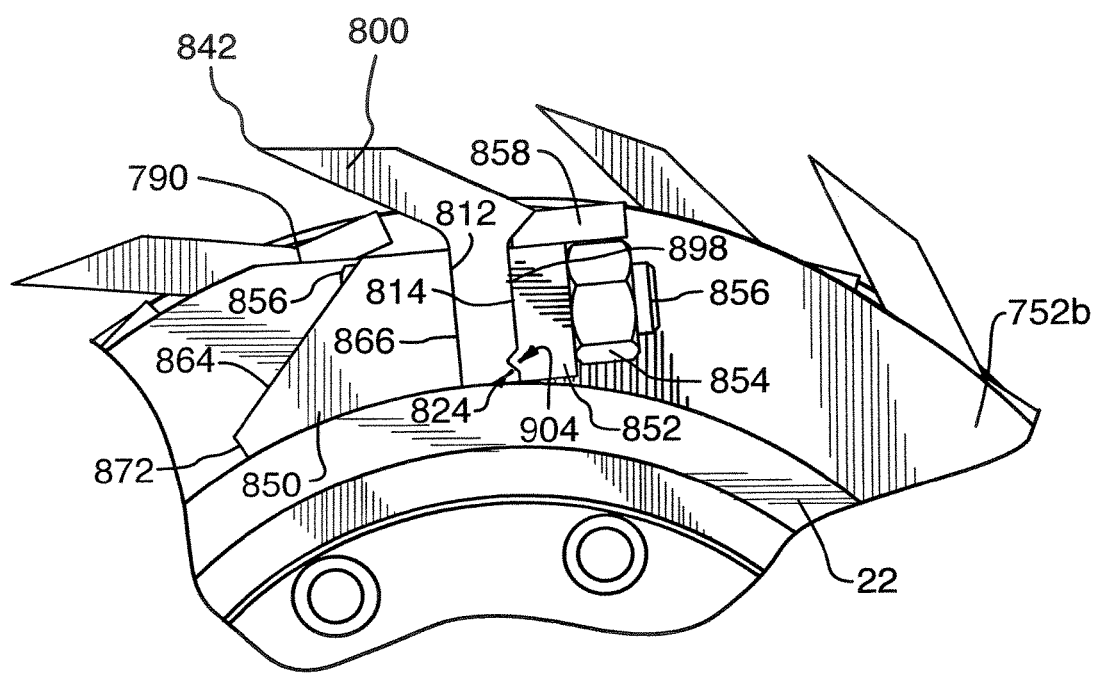
FIG. 47 is an enlarged view similar to that illustrated in FIG. 46 showing the encircled portion '47'.
Figure 49:
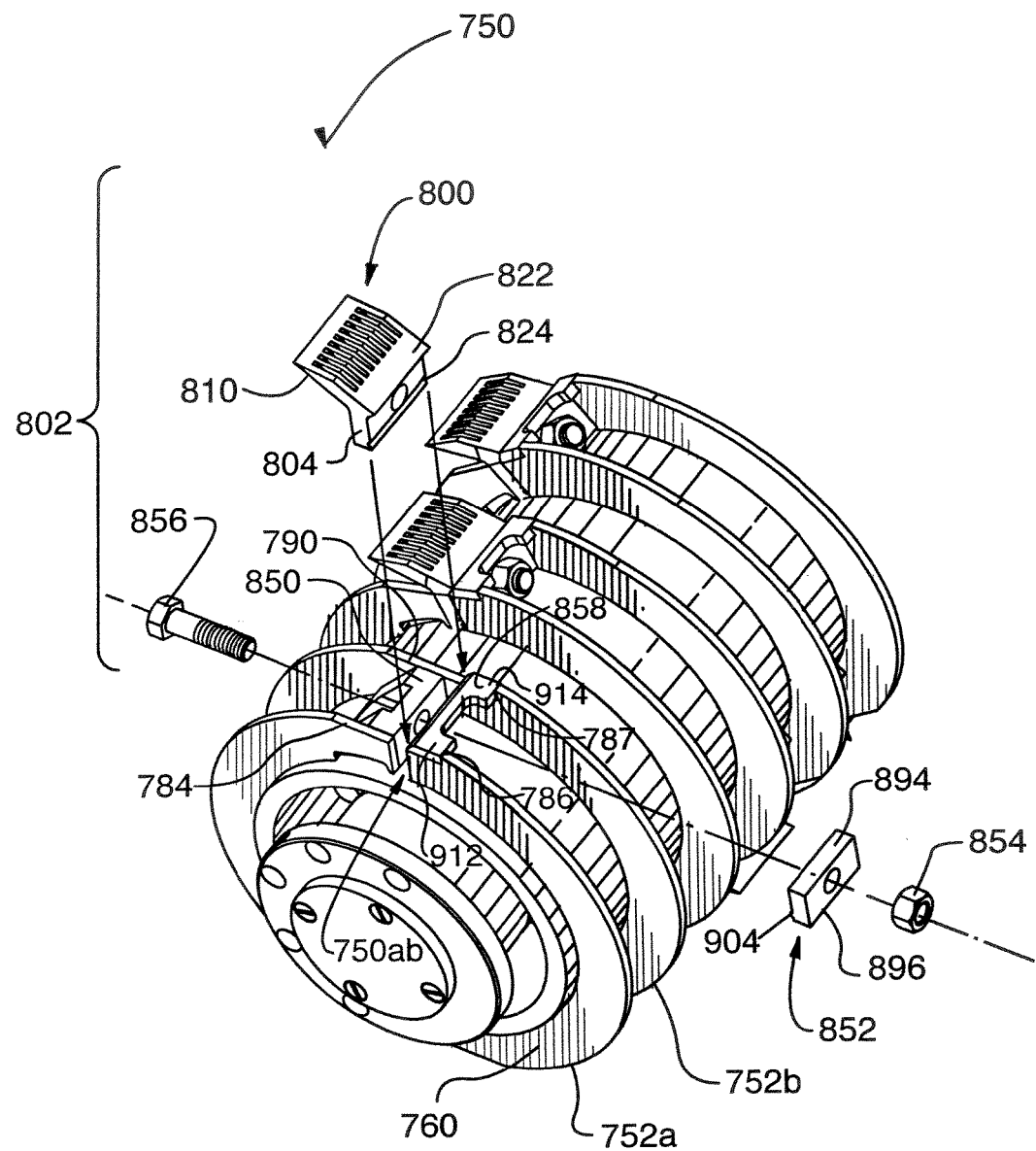
FIG. 49 is an enlarged perspective view taken from the opposite direction from that shown in FIG. 48 showing a cutting tooth and a portion of its corresponding mounting assembly exploded.

Each collar 752 is radially offset from its adjacent collar 752 such that the cutouts 780 of adjacent collars are staggered relative to each other. In this embodiment, each station 754 is defined between the cutout 780 formed in a given collar 752 and that portion of the sidewall 760 of the adjacent collar 752 that is disposed opposite the cutout 780. Referring to FIG. 49, the station 754*ab* (previously identified generically as "station 754") can be seen to be defined between the cutout 780 in collar 752*a* and the portion of sidewall 760 of collar 752*b* located opposite the first cutout 780. Each of the other stations 754, identified in FIG. 45 is similarly defined between the cutout 780 of one collar 752 and a portion of sidewall 760 of an adjacent collar 752. As best shown in FIGS. 45 and 49, each station 754 is circumferentially staggered from its adjacent station.

As in the brush cutting head 20, in this embodiment, the staggered arrangement of the collars 752 allows the plurality of cutting tooth assemblies 756 to be disposed along the support body 22 in a generally double helix pattern thereby permitting cutting across the entire length of the support body 22 when the brush cutting head 750 is rotated about axis 'A-A'. It will however be appreciated that the cutting tooth assemblies 756 could be disposed differently along the support body 22.

Turning now to FIGS. 46,47 and 51 to 55, the cutting tooth assembly 756 is now described in greater detail. The cutting tooth assembly 756 includes a cutting tooth 800 and a mounting assembly 802 for securely fixing the cutting tooth 800 within a respective station 754. The cutting tooth 800 is generally similar to cutting tooth 70 in that it has a base portion 804 having a first end 806 and a second end 808, and a cutting portion 810 mounted to the second end 808 of the base portion 804.

The base portion 804 has a generally planar, leading face 812, an opposing trailing face 814 and two, spaced apart, lateral faces 816 and 818. Defined in the base portion 804 is a bore 820 that extends between the leading face 812 and the trailing face 814. The bore 820 is adapted to receive a fastener therethrough to permit fastening of the cutting tooth 800 to the mounting assembly 802. The base portion 804 however differs from base portion 74 in two respects. First, the base portion 804 has, adjacent its first end 806, a V-shaped groove 824 defined in its trailing face 814. The groove 824 extends between the lateral faces 816 and 818 of the base portion 804 and is adapted for mating engagement with a portion of the mounting assembly 802. Second, adjacent the second end 808, the trailing face 814 of the base portion 804 flares outwardly to partially define a wedge-shaped abutment shoulder 822. While generally similar to abutment flange 672 of cutting tooth 650, the abutment shoulder 822 is relatively smaller and less prominent in the cutting tooth 800. The abutment shoulder 822 serves a similar purpose to that of abutment flange 672—it reinforces the cutting tooth 800 and enables it to better resist the high impact forces to which it may be subjected during operation of the brush cutting head 750. As a result, the cutting tooth 750 tends to be less vulnerable to cracking failures along the area where the cutting portion 810 meets the base portion 804. As will be explained in greater detail below, when the cutting tooth 800 is mounted within the station 754, the abutment shoulder 822 will rest on a portion of the mounting assembly 802.

As in the cutting tooth 70, the cutting portion 810 is carried on the second end 808 of the base portion 804 in a generally, forwardly leaning or canted fashion, and is integrally formed with the base portion 804. However, in like fashion to cutting tooth 650, the cutting tooth 800 is fabricated by forging and machining.

Figure 52:
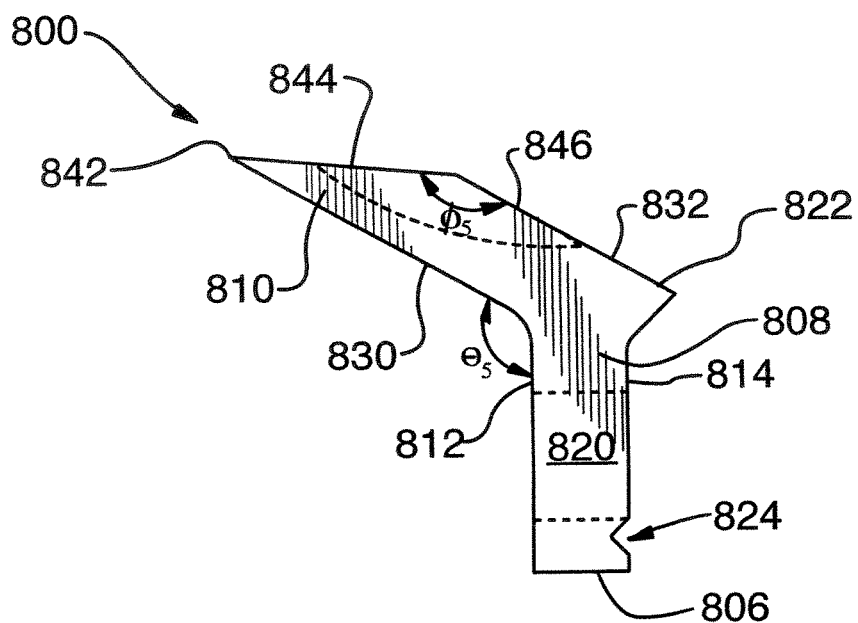
FIG. 52 is a side elevation view of the cutting tooth shown in FIG. 51.

The cutting portion 810 resembles the cutting portion 80 in that it also has a leading face 830, an opposed trailing face 832 and two spaced-apart lateral faces 834 and 836. The leading face 830 of the cutting portion 810 joins the leading face 812 of the base portion 804 while the trailing face 832 joins the trailing face 814 to define the abutment shoulder 822 of the base portion 804. As best shown in FIG. 52, an external obtuse angle $\theta_5$ is formed between the leading face 830 and the leading face 812. In this embodiment, the angle $\theta_5$ measures 120 degrees.

In like fashion to leading and trailing faces 100 and 102 in cutting tooth 70, the leading and trailing faces 830 and 832 cooperate with each other to define a tapering, wedge-like, profile 840 that terminates in a cutting edge 842. The cutting edge 842 is carried forwardly of the leading face 812 of the base portion 804 such that it tends to be the first element of cutting tooth 800 to make contact with the brush. The cutting edge 842 extends generally linearly between the lateral faces 834 and 836 and substantially parallel to the rotational axis A-A of the brush cutting head 750. When the cutting tooth 800 is mounted within the station 754, the cutting edge 842 extends beyond the first and second edges 784 and 790 of the sidewall 760 (of adjacent collars 752) to facilitate the cutting action of the tooth. The reduced profile of the sidewall 760 at the edges 784 and 790 tends to facilitate evacuation of the cutting debris away from the station 754 and the cutting tooth 800.

Returning to FIG. 52, the trailing face 832 of the cutting portion 810 has an upper portion 844 and a lower portion 846 joined to the upper portion 844. The upper portion 844 extends between the cutting edge 842 and the lower portion 846. The lower portion 846 partially defines the abutment shoulder 822. The upper portion 844 is bent relative to the lower portion 846 such that an internal obtuse angle $\Phi_5$ is defined therebetween. In the present embodiment, the angle $\Phi_5$ measures 155 degrees. The cutting portion trailing face 832 is configured with corrugations 848 that are similar to the corrugations 124 formed on cutting tooth 70 such that no further description is required.

Referring to FIGS. 45 to 48, the mounting assembly 802 includes a mounting block 850 disposed forwardly of the cutting tooth 750, a plate 852 disposed rearwardly of the cutting tooth 750, a fastener in the nature of a nut 854 and bolt 856, and a support plate 858 for placement on the substantially planar edges 784 and 790 of adjacent collars 752. In contrast to the mounting assembly 72 which has a deflector member 138 and first and second plates 130 and 132 between which the cutting tooth 70 is mounted, in mounting assembly 802, the first plate and deflector member are combined into a single component mounting block 850.

Figure 53:
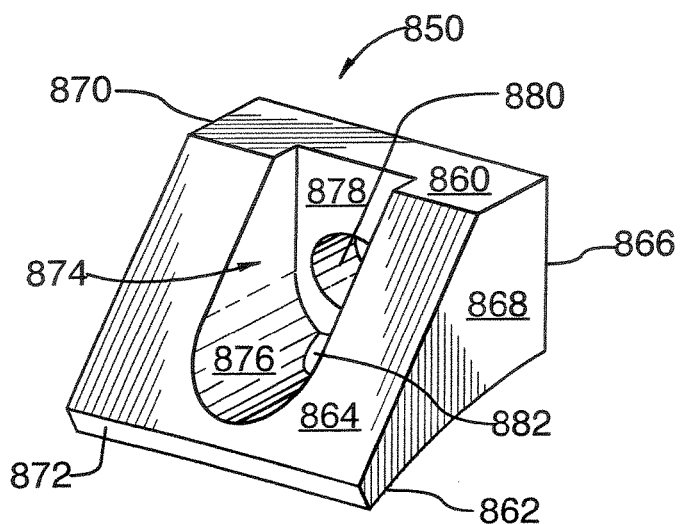
FIG. 53 is a perspective view of the mounting block shown in FIG. 49.

Referring to FIG. 53, the mounting block 850 is defined by a top face 860, a bottom face 862 disposed opposite the top face 860, leading and trailing faces 864 and 866 which extend between the top and bottom faces 860 and 862 and a pair of spaced apart lateral faces 868, 870. The bottom face 862 is generally arcuate its radius of curvature matching that of the curved surface 28 to thereby facilitate welding of the mounting block 850 to the support body 22. The trailing face 866 extends generally upwardly from the bottom face 862 to join the top face 860. As compared to the bottom face 862, the top face 860 is relatively short. The leading face 864 extends away from the top face 860 at a downward angle toward the bottom face 862. A narrow band 872 joins the leading face 864 to the bottom face 862. The leading face 864, the narrow band 872 and the bottom face 862 cooperate with each other to impart to the mounting block 850 a generally tapering (wedge-like) profile. It will be appreciated that the configuration of the mounting block 850 with its sloped leading face 864 tends to encourage the deflection of debris away from the cutting tooth 750 much in the same way as deflection member 138 of mounting assembly 72.

Formed centrally in the leading face 864 and extending partially into the top face 860, is a relatively large rebate 874. The rebate 874 defines a generally curved bottom wall 876 and a leading wall 878 that is generally parallel to and spaced apart from the trailing face 866. The rebate 874 communicates with a bore 880 that extends between the trailing face 866 and the leading wall 876. The rebate 874 and the bore 880 are sized to accommodate the bolt 856 extending therethrough.

Figure 54:
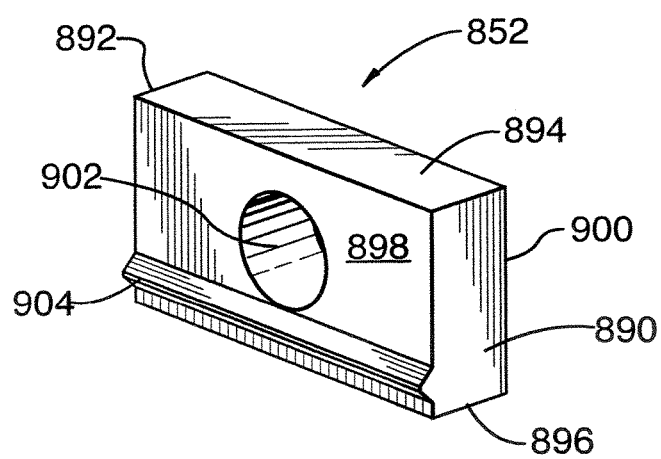
FIG. 54 is a perspective view of the mounting plate shown in FIG. 49.

With reference to FIG. 54, the plate 852 is now described in greater detail. The plate 852 is generally rectangular and is defined by a pair of opposed, relatively short, sides 890 and 892 and a pair of opposed, relatively long sides 894 and 896 that extend between the short sides 890 and 892. Moreover, the second plate 852 has a leading face 898, an opposed trailing face 900 and an aperture 902 defined therein between the leading and trailing faces 898 and 900. The aperture 902 is adapted to receive the bolt 856 therethrough. Disposed between the aperture 902 and the long side 896 is a V-shaped tongue 904 that ext longitudinally between the short sides 890 and 892. The tongue 904 is configured for mating engagement with groove 824 formed in the cutting tooth base portion 804.

Figure 55:
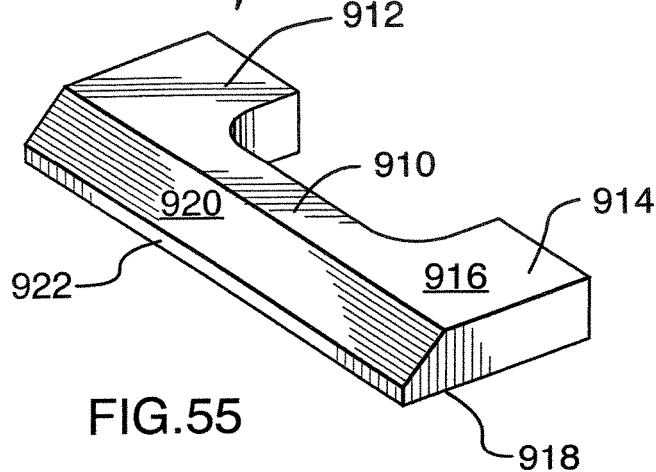
FIG. 55 is a perspective view of the abutment member shown in FIG. 49.

Referring now to FIG. 55, there is shown the support plate 858. Support plate 858 is generally C-shaped when viewed in top plan. It has a back portion 910 and a pair of spaced apart arms 912 and 914 joined to the back portion 910 and extending away therefrom. The support plate 858 further includes a top face 916, an opposed bottom face 918 and a leading face 920 spanning the back portion 910. The leading face 920 extends downwardly from the top face 916 toward the bottom face 918. A narrow band 922 joins the leading face 920 to the bottom face 918. The leading face 920, the narrow band 922 and the bottom face 918 cooperate with each other to impart to the support plate 858 a generally tapering (wedge-like) profile.

As best shown in FIG. 49, during fabrication of the brush cutting head 750, the mounting block 850 and the support plate 858 are fixed to adjacent collars 752a and 752b (as the case may be). More specifically, the mounting block 850 is positioned between adjacent collars 752a and 752b with its bottom face 862 abutting the curved surface 28 of the support body 22 and its trailing face 864 disposed flush with the sidewall end 766 of collar 752a so as to allow unobstructed access to the cutout 780 during tooling. The mounting block 850 is then welded to the adjacent collars 752 about the first and second rebates 792 and 794. The support plate 858 is mounted to span the space between adjacent collars 752a and 752b. The first arm 912 of the plate 858 is supported on the first substantially planar edge 784, while the second arm 914 rests on the second substantially planar edge 790. At their terminal extremities the arms 912 and 914 abut the shoulders 786 and 787 defined on the outer edges of the collars 752a and 752b. Thus disposed, the support plate 858 is welded in place.

Figure 48:
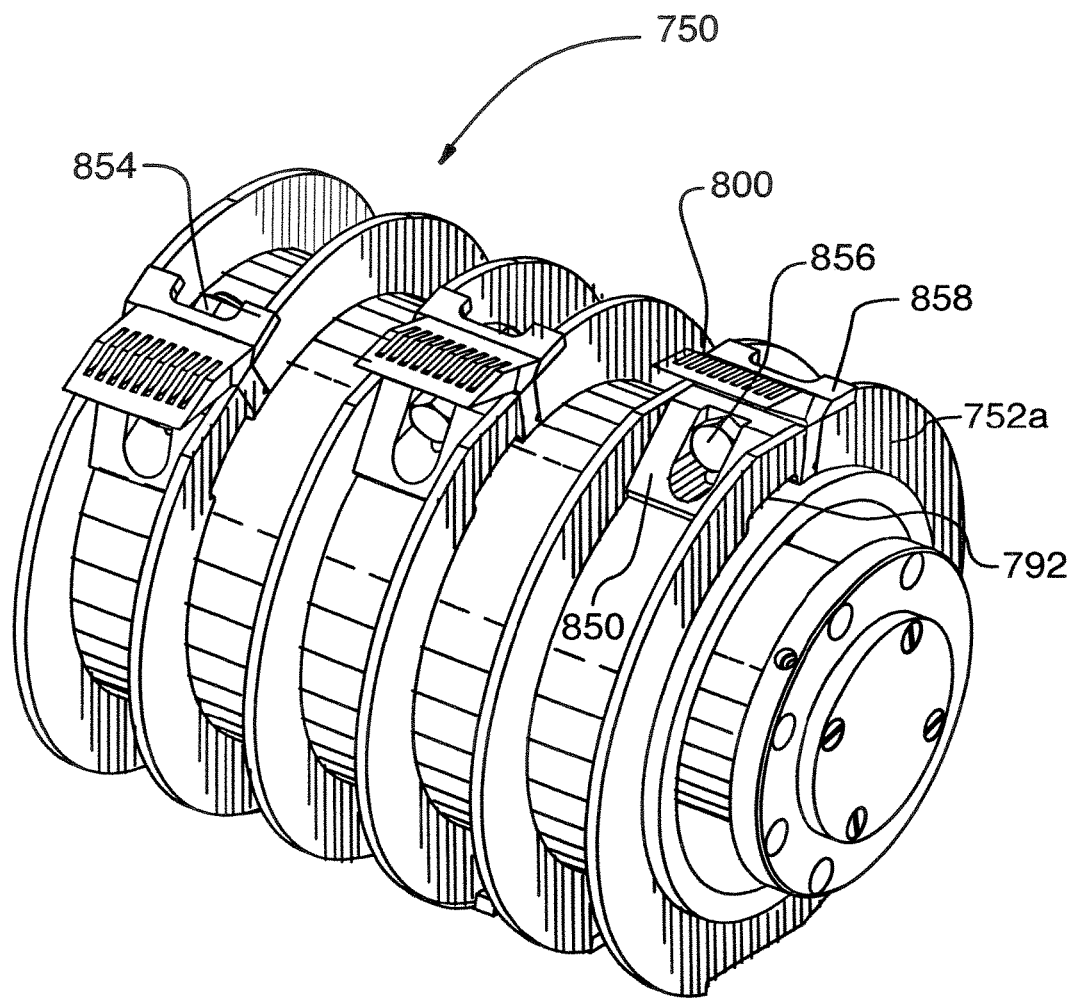
FIG. 48 is an enlarged perspective view of one end of the brush cutting head of FIG. 45.

Referring now to FIGS. 48 and 49, the attachment of the cutting tooth 800 to the brush cutting head 750 is now described in greater detail in the context of station 754b. The cutting tooth base portion 804 is placed between the mounting block 850 and the support plate 858 with its leading face 812 abutting the trailing face 866 of the mounting block 850 and its abutment shoulder 822 bearing on the leading face 920 of the support plate 858. The plate 852 is then placed between the collars 752a and 752b with its long edge 896 abutting the curved surface 28 and its opposed long edge 894 abutting the bottom of the support plate 858. The tongue 904 formed on the trailing face 898 of the plate 852 is urged to mate with the groove 824 defined in the cutting tooth base portion 804. This arrangement tends to prevent the cutting tooth 750 from moving within the station 754 and also tends to minimize shear forces in the bolt 856 during use. Thereafter, the bolt 856 is inserted into the aligned apertures of the mounting block 850, the cutting tooth 800 and the plate 852 and securely fastened with the nut 854. The space between the arms 912 and 914 facilitates the use of a tool to tighten or loosen (as the case may be) the nut 854. In like fashion to station 604ab of brush cutting head 600, the station 754ab receives only the cutting tooth 750.

While in this embodiment, the second plate 852 has tongue 904 and the cutting tooth 750 has groove 824 formed therein. It will be appreciated that in an alternative embodiment, the tongue could be provided on the trailing face of the cutting tooth whereas the groove could be defined in the second plate. In other embodiments, different male and female mating elements could be used to similar advantage. Alternatively, the cutting tooth and second plate could be configured without mating elements at all.

While cutting tooth 750 has been described in connection with the embodiment shown in FIGS. 45 to 55, it will be appreciated that with appropriate modifications, this type of cutting tooth could be also be successfully used in alternative brush cutting heads.

Although the foregoing description and accompanying drawings relate to specific preferred embodiments of the present invention as presently contemplated by the inventor, it will be understood that various changes, modifications and adaptations, may be made without departing from the spirit of the invention.

I claim:

1. A brush cutting head comprising:
a support body having a first end, an opposed second end and an intermediate portion extending therebetween; the intermediate portion having an outer surface;
a plurality of collars mounted to the support body at spaced intervals along the intermediate portion, each collar extending outwardly from the outer surface, each collar cooperating with an adjacent collar to define a mounting station between the adjacent collars; and
a plurality of cutting tooth assemblies carried on the outer surface of the support body, each cutting tooth assembly having a cutting tooth for placement within the mounting station and a mounting assembly engageable with the adjacent collars for securing the cutting tooth in the mounting station, wherein each said cutting tooth includes a leading face, and wherein each said leading face is oriented at a fixed angle with respect to said outer surface.

2. The brush cutting head of claim 1 wherein:
the support body is a cylindrical support body;
the outer surface of the support body is a curved surface defining the circular cross-section of the support body; and
each collar extends radially from the curved surface.

3. The brush cutting head of claim 2 wherein each collar includes a circumferentially extending sidewall defining a substantially penannular structure, the sidewall having a first end and a second end spaced part from the first end thereof, the space between the first and second ends of the sidewall defining a cutout in each collar, the cutout being sized to receive therein a portion of the cutting tooth assembly.

4. The brush cutting head of claim 3 wherein the cutout defined in each collar is circumferentially spaced from the cutout defined in the adjacent collar.

5. The brush cutting head of claim 4 wherein each mounting station extends between the cutout in each collar and the portion of the sidewall of the adjacent collar opposite the cutout.

6. The brush cutting head of claim 5 wherein each cutting tooth has a base portion and a cutting portion supported on the base portion; the base portion having a first side and a second side, the cutting portion extending longitudinally between the first side and the second side, the first side of the base portion being retained between the ends of the sidewall of each collar and the second side of the base portion abutting a portion of the sidewall of the adjacent collar when the cutting tooth is secured within the mounting station.

7. The brush cutting head of claim 5 wherein each mounting assembly includes first and second plate members for holding therebetween the cutting tooth and a fastener for attaching the cutting tooth to the first and second plate members, the first and second plate members each being mountable to extend between adjacent collars, the first plate member being disposed rearwardly of the cutting tooth when the cutting tooth is secured within the mounting station.

8. The brush cutting head of claim 7 wherein:
each cutting tooth has a base portion and a cutting portion supported on the base portion; and
each of the plate members and the base portion has an aperture defined therein, the apertures defined in the plate members and the base portion being alignable to permit the fastener to be inserted therethrough.

9. The brush cutting head of claim 8 wherein:
the fastener is a threaded fastener; and
the aperture defined in the first plate member is adapted to threadingly engage the fastener to thereby fasten the second plate member and the cutting tooth to the first plate member.

* * * * *

UNITED STATES PATENT AND TRADEMARK OFFICE
CERTIFICATE OF CORRECTION

PATENT NO. : 9,839,914 B2  
APPLICATION NO. : 14/146077  
DATED : December 12, 2017  
INVENTOR(S) : Etienne Labbe Page 1 of 1

It is certified that error appears in the above-identified patent and that said Letters Patent is hereby corrected as shown below:

In the Specification

In the first column, above FIELD OF THE INVENTION, the following should be added:
CROSS REFERENCE TO RELATED APPLICATIONS
This application is a Continuation of U.S. Application No. 12/870,170, filed August 27, 2010, entitled Brush Cutting Head, which is a Continuation of U.S. Application No. 11/431,748, filed May 11, 2006, entitled Brush Cutting Head. All of the foregoing applications are hereby incorporated by reference in their entireties.

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*